(12) United States Patent
Mochizuki et al.

(10) Patent No.: US 12,252,066 B2
(45) Date of Patent: Mar. 18, 2025

(54) LAMP SYSTEM AND AUTOMOTIVE LAMP

(71) Applicant: KOITO MANUFACTURING CO., LTD., Tokyo (JP)

(72) Inventors: Kiyotaka Mochizuki, Shizuoka (JP); Naoki Tatara, Shizuoka (JP); Norihiko Kobayashi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/341,020

(22) Filed: Jun. 26, 2023

(65) Prior Publication Data

US 2023/0331143 A1 Oct. 19, 2023

Related U.S. Application Data

(60) Division of application No. 17/212,294, filed on Mar. 25, 2021, now Pat. No. 12,017,576, which is a
(Continued)

(30) Foreign Application Priority Data

Sep. 25, 2018 (JP) ................................. 2018-179033
Sep. 27, 2018 (JP) ................................. 2018-182198

(Continued)

(51) Int. Cl.
*B60Q 1/50* (2006.01)
*B60Q 1/08* (2006.01)
(Continued)

(52) U.S. Cl.
CPC ............... *B60Q 1/085* (2013.01); *B60Q 1/50* (2013.01); *B60Q 1/525* (2013.01); *H05B 47/115* (2020.01); *B60Q 2400/50* (2013.01); *G08G 1/16* (2013.01)

(58) Field of Classification Search
CPC ........ B60Q 1/143; B60Q 1/507; B60Q 1/545; B60Q 1/547; B60Q 1/549; B60Q 1/1423; B60Q 1/5037
See application file for complete search history.

(56) References Cited

U.S. PATENT DOCUMENTS 9,616,750 B2    4/2017  Shibata et al.
10,071,675 B2 *  9/2018  Dudar ..................... B60Q 1/08
(Continued)

FOREIGN PATENT DOCUMENTS

CN    105976642 A    9/2016
CN    106573573 A    4/2017
(Continued)

OTHER PUBLICATIONS

Office Action (Notification of Reasons for Refusal) issued on Apr. 16, 2024, in corresponding Japanese Patent Application No. 2023-086418 and machine English translation of the Office Action. (6 pages).

(Continued)

*Primary Examiner* — Tung X Le
(74) *Attorney, Agent, or Firm* — BUCHANAN, INGERSOLL & ROONEY PC

(57) ABSTRACT

A lamp system includes a variable light distribution lamp. The variable light distribution lamp 110 irradiates a beam having a variable light intensity distribution to a road surface. A light distribution controller controls the variable light distribution lamp. In response to the start of a predetermined event, the light distribution controller draws a pattern that corresponds to the event. In response to the end of the event, the light distribution controller extinguishes the pattern.

19 Claims, 48 Drawing Sheets

Related U.S. Application Data continuation of application No. PCT/JP2019/037497, filed on Sep. 25, 2019.

(30) Foreign Application Priority Data

| Sep. 28, 2018 | (JP) | 2018-185195 |
|---|---|---|
| Sep. 28, 2018 | (JP) | 2018-185196 |
| Sep. 28, 2018 | (JP) | 2018-185197 |
| Sep. 24, 2019 | (JP) | 2019-173060 |

(51) Int. Cl.
    *H05B 47/115*     (2020.01)
    *G08G 1/16*     (2006.01)

(56) References Cited

U.S. PATENT DOCUMENTS

| | | | |
|---|---|---|---|
| 11,465,553 B2* | 10/2022 | Mochizuki | B60Q 1/085 |
| 2006/0114125 A1 | 6/2006 | Kubota et al. | |
| 2015/0224926 A1* | 8/2015 | Mochizuki | G06V 20/588 |
| | | | 701/36 |
| 2017/0067609 A1 | 3/2017 | Ichikawa et al. | |
| 2017/0106793 A1 | 4/2017 | Kumar et al. | |
| 2017/0158112 A1 | 6/2017 | Mouri et al. | |
| 2017/0182934 A1 | 6/2017 | Arita et al. | |
| 2017/0203685 A1 | 7/2017 | Hirai et al. | |
| 2017/0337821 A1 | 11/2017 | Masuda et al. | |
| 2018/0009374 A1* | 1/2018 | Kim | B60Q 1/085 |
| 2018/0056851 A1 | 3/2018 | Kim et al. | |
| 2018/0297511 A1 | 10/2018 | Park et al. | |
| 2018/0361919 A1 | 12/2018 | Sorokin | |
| 2020/0063933 A1* | 2/2020 | Nishio | G02B 5/1861 |
| 2020/0063938 A1* | 2/2020 | Kurashige | G02B 27/30 |
| 2020/0215963 A1 | 7/2020 | Lahmer | |

FOREIGN PATENT DOCUMENTS

| | | |
|---|---|---|
| CN | 106585481 A | 4/2017 |
| CN | 106794797 A | 5/2017 |
| CN | 106945598 A | 7/2017 |
| CN | 107776472 A | 3/2018 |
| DE | 102013222467 A1 | 5/2015 |
| DE | 102015201764 A1 | 8/2016 |
| DE | 102015201766 A1 | 8/2016 |
| DE | 102015225409 A1 | 6/2017 |
| DE | 102016122043 A1 | 6/2017 |
| EP | 2420986 A1 | 2/2012 |
| EP | 3118515 A1 | 1/2017 |
| EP | 3170698 A1 | 5/2017 |
| JP | 2006142888 A | 6/2006 |
| JP | 2008143505 A | 6/2008 |
| JP | 2009283443 A | 12/2009 |
| JP | 2010211404 A | 9/2010 |
| JP | 2012040950 A | 3/2012 |
| JP | 2014144725 A | 8/2014 |
| JP | 2015164828 A | 9/2015 |
| JP | 2015221659 A | 12/2015 |
| JP | 2016004641 A | 1/2016 |
| JP | 2016030515 A | 3/2016 |
| JP | 2016030527 A | 3/2016 |
| JP | 2016049891 A | 4/2016 |
| JP | 2016055691 A | 4/2016 |
| JP | 2016142888 A | 8/2016 |
| JP | 2016166009 A | 9/2016 |
| JP | 2016188539 A | 11/2016 |
| JP | 2017030686 A | 2/2017 |
| JP | 2017037806 A | 2/2017 |
| JP | 2017107690 A | 6/2017 |
| WO | 2013136374 A1 | 9/2013 |
| WO | 2016027315 A1 | 2/2016 |
| WO | 2016125909 A1 | 8/2016 |

OTHER PUBLICATIONS

Extended European Search Report dated Oct. 12, 2021, issued in corresponding European Application No. 19867495.4. (8 pages).
International Preliminary Report on Patentability (Form PCT/IB/373) and the Written Opinion of the International Searching Authority (Form PCT/ISA/237) issued on Mar. 23, 2021, in corresponding International Application No. PCT/JP2019/037497. (39 pages).
International Search Report (PCT/ISA/210) mailed on Dec. 17, 2019, by the Japan Patent Office as the International Searching Authority for International Application No. PCT/JP2019/037497. (10 pages).
Office Action (Notice of Reasons for Refusal) issued on Feb. 14, 2023, in corresponding Japanese Patent Application No. 2020-549268 and English translation of the Office Action. (8 pages).
Office Action issued by the U.S. Patent and Trademark Office in the U.S. Appl. No. 17/212,294, mailed Aug. 2, 2023, U.S. Patent and Trademark Office, Alexandria, VA. (26 pages).
Communication pursuant to Article 94(3) EPC dated Nov. 3, 2023, issued in the corresponding European Patent Application No. 19867495.4, 6 pages.
Office Action/Search Report (Notification of the Second Office Action) issued on Aug. 6, 2024, in corresponding Chinese Patent Application No. 201980063017.2 and English translation of the Office Action/Search Report. (27 pages).

\* cited by examiner

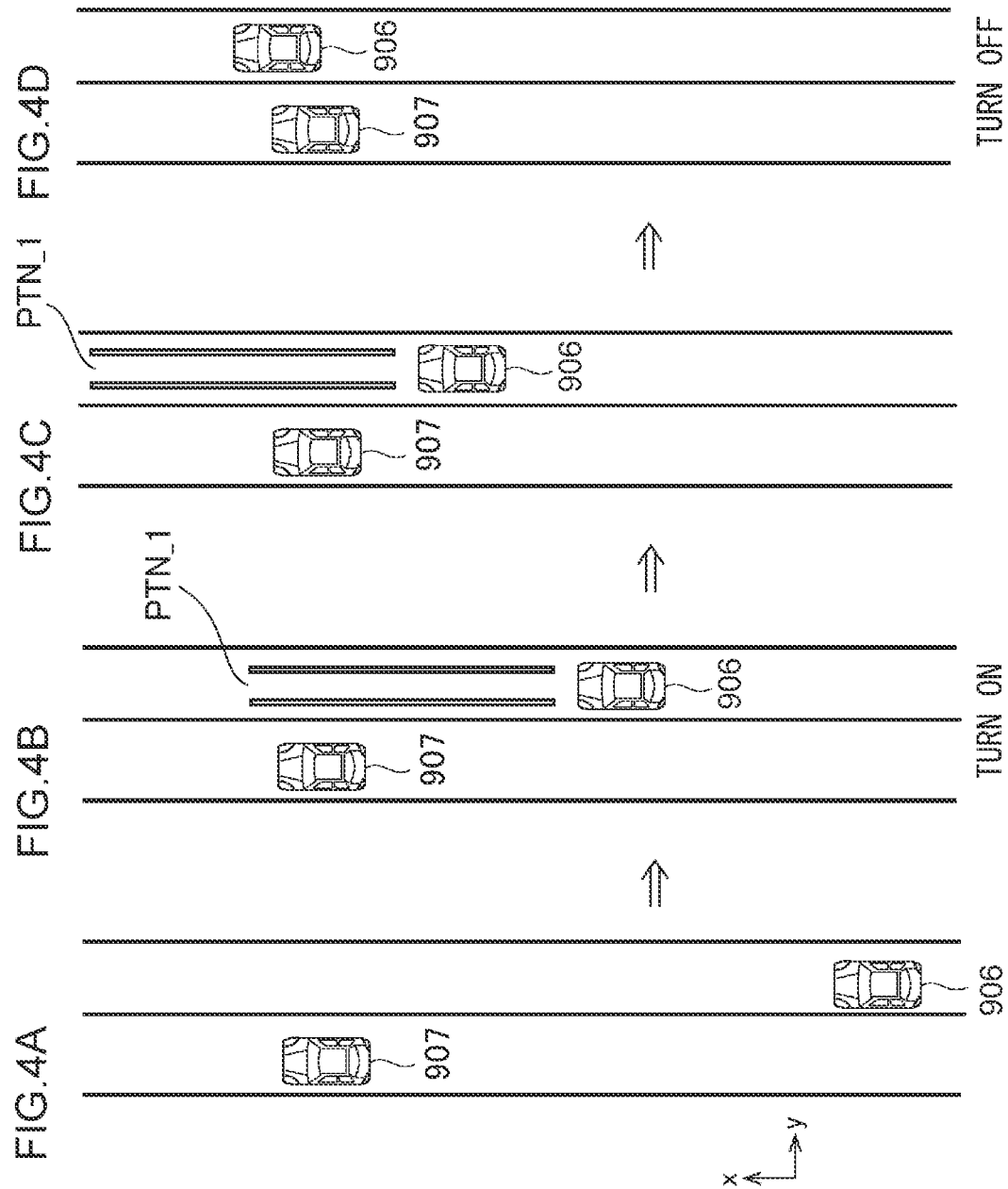

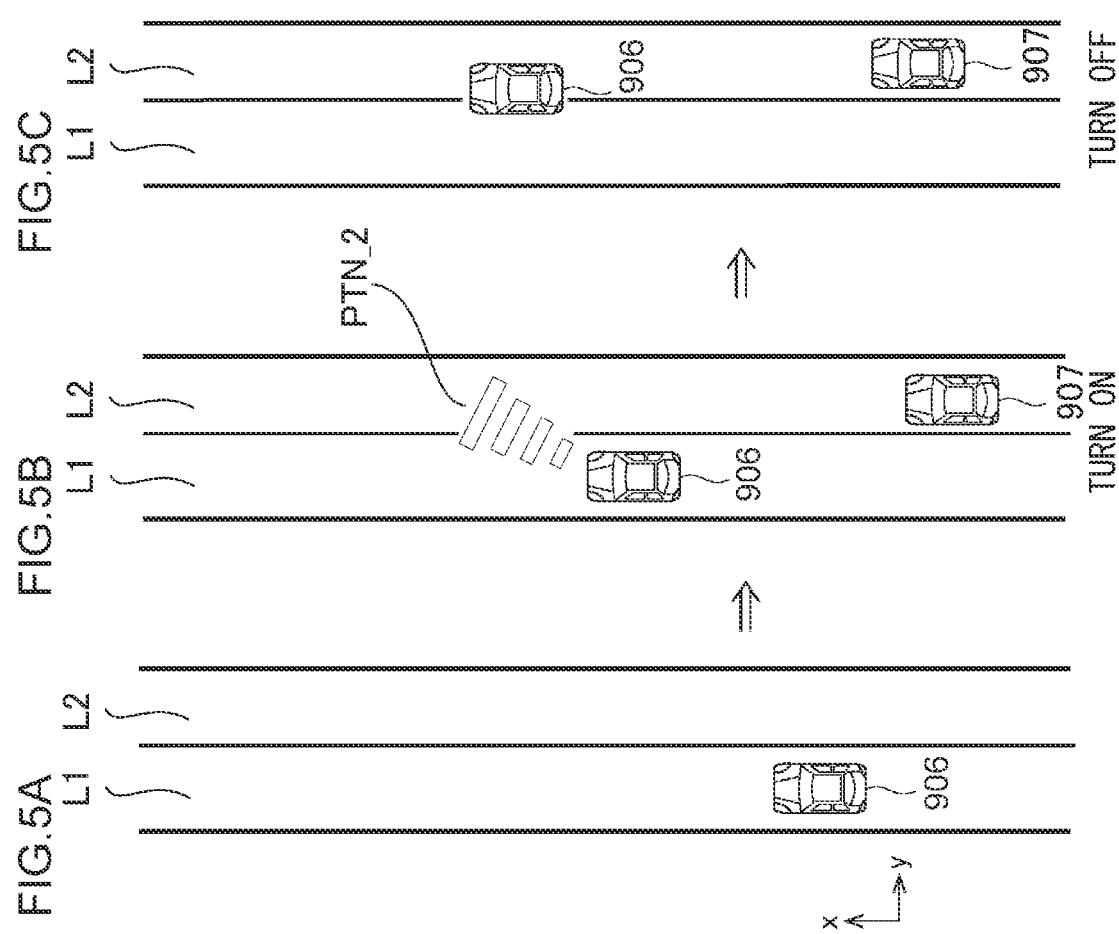

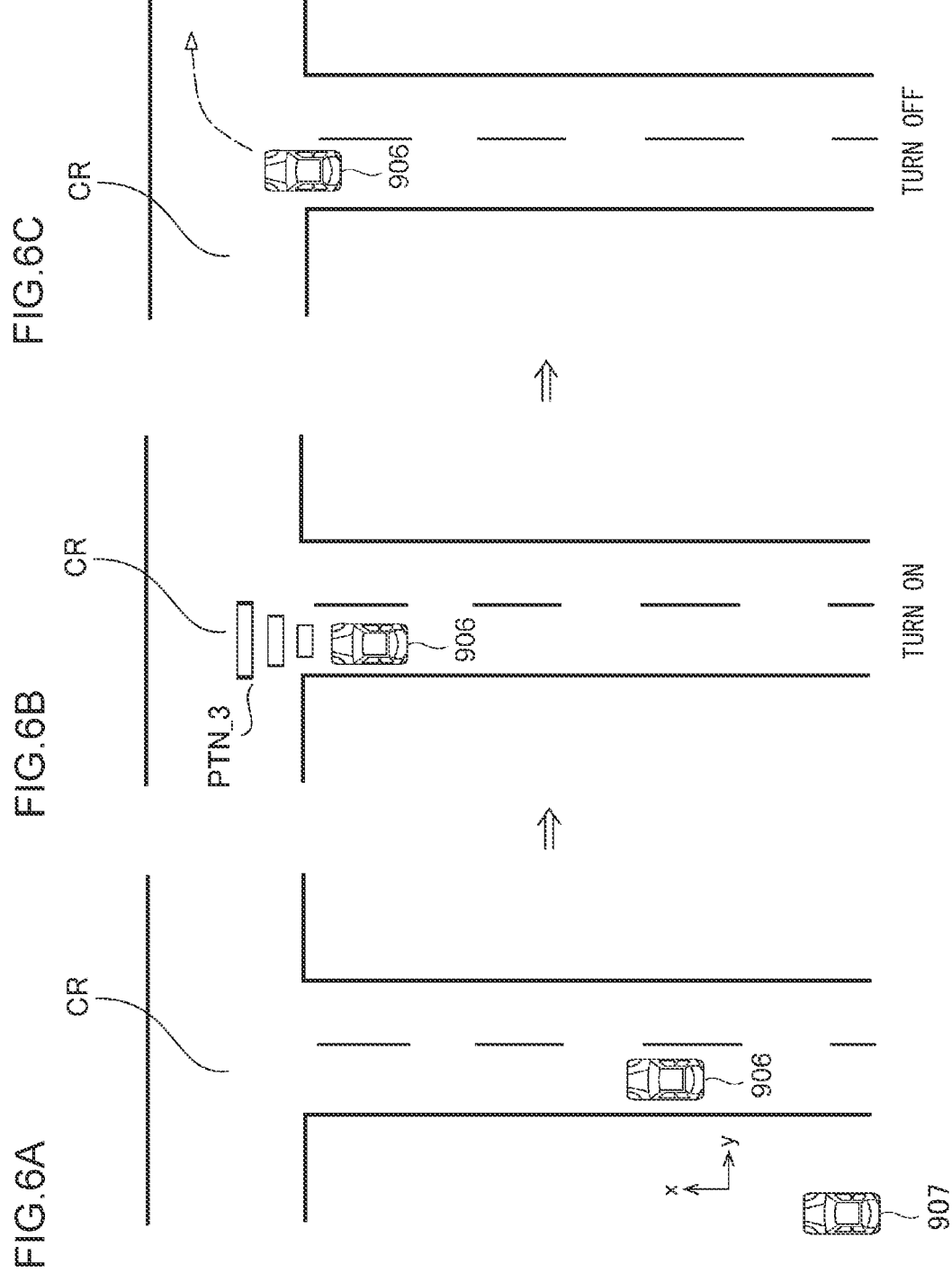

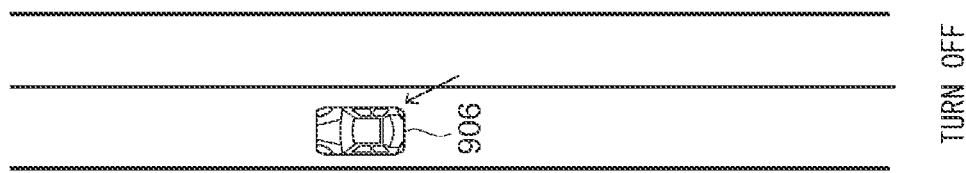
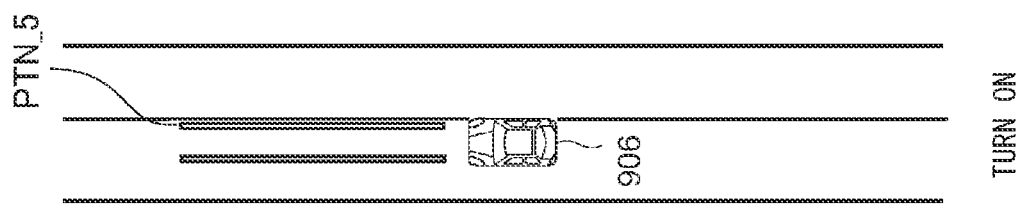
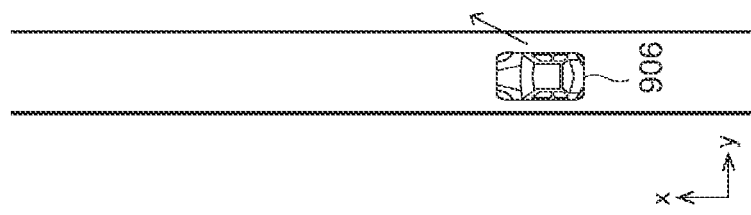

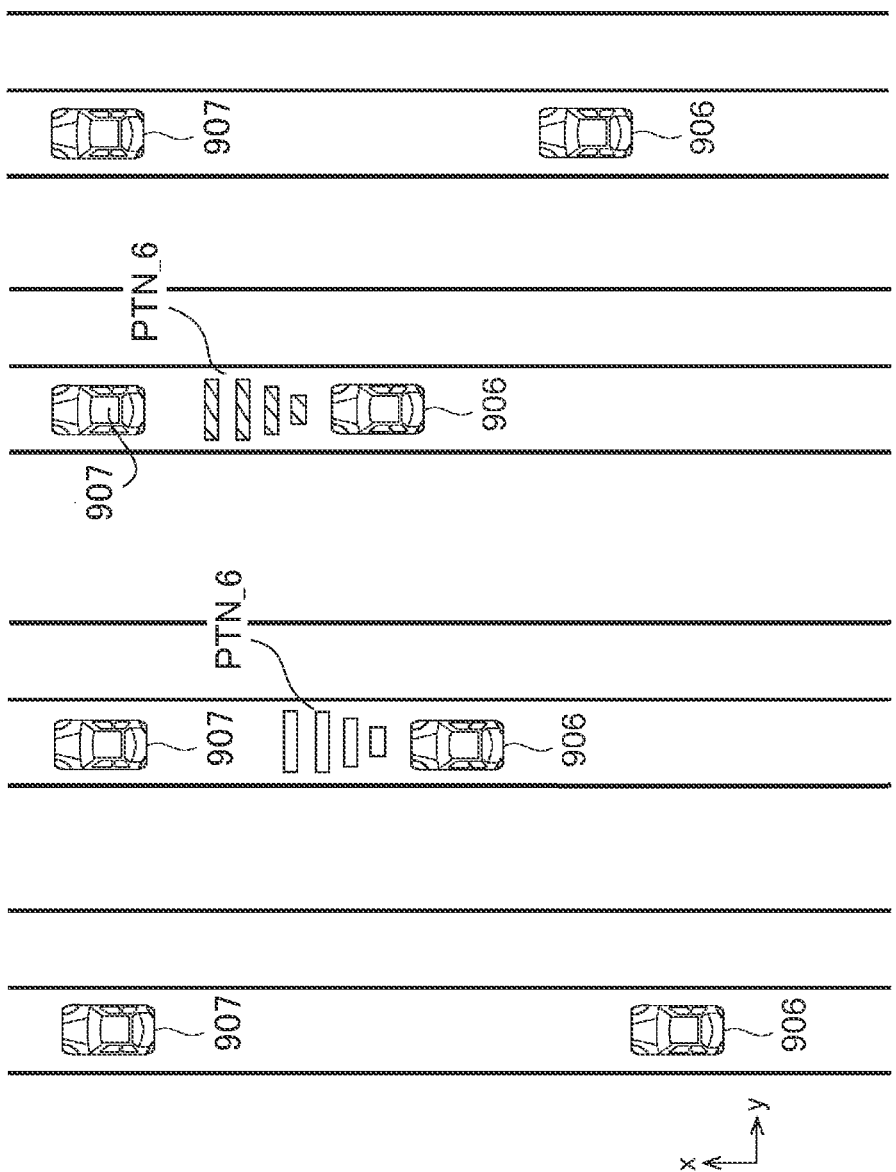

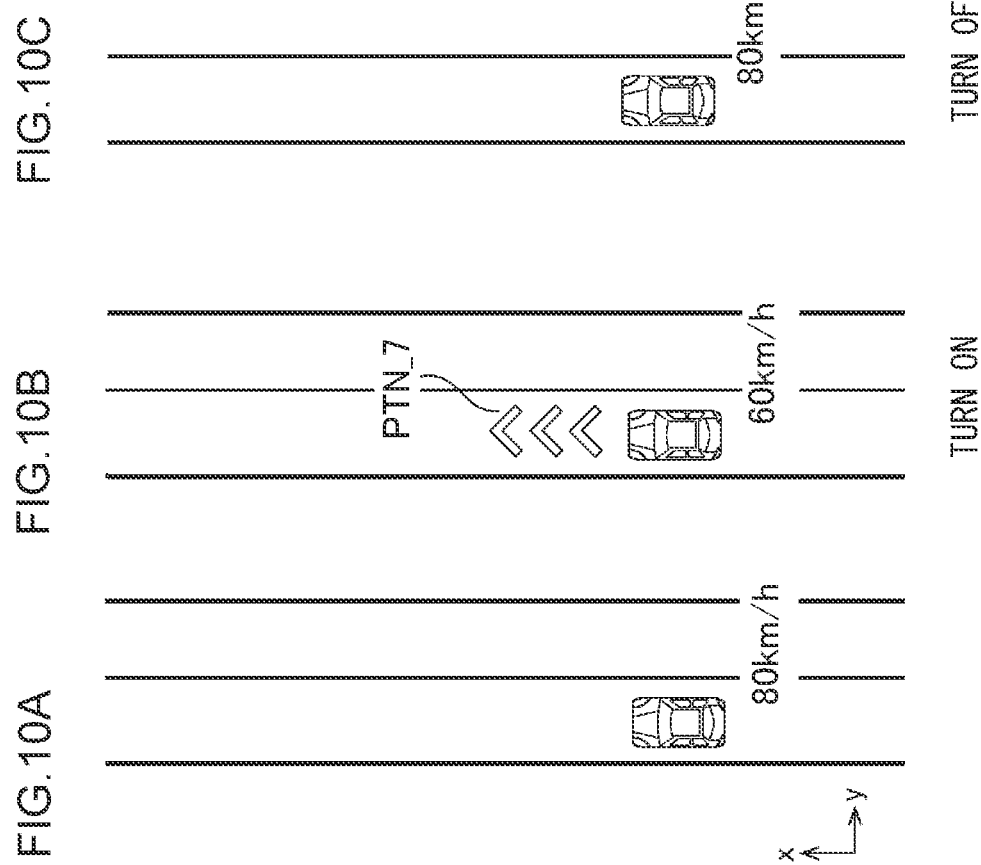

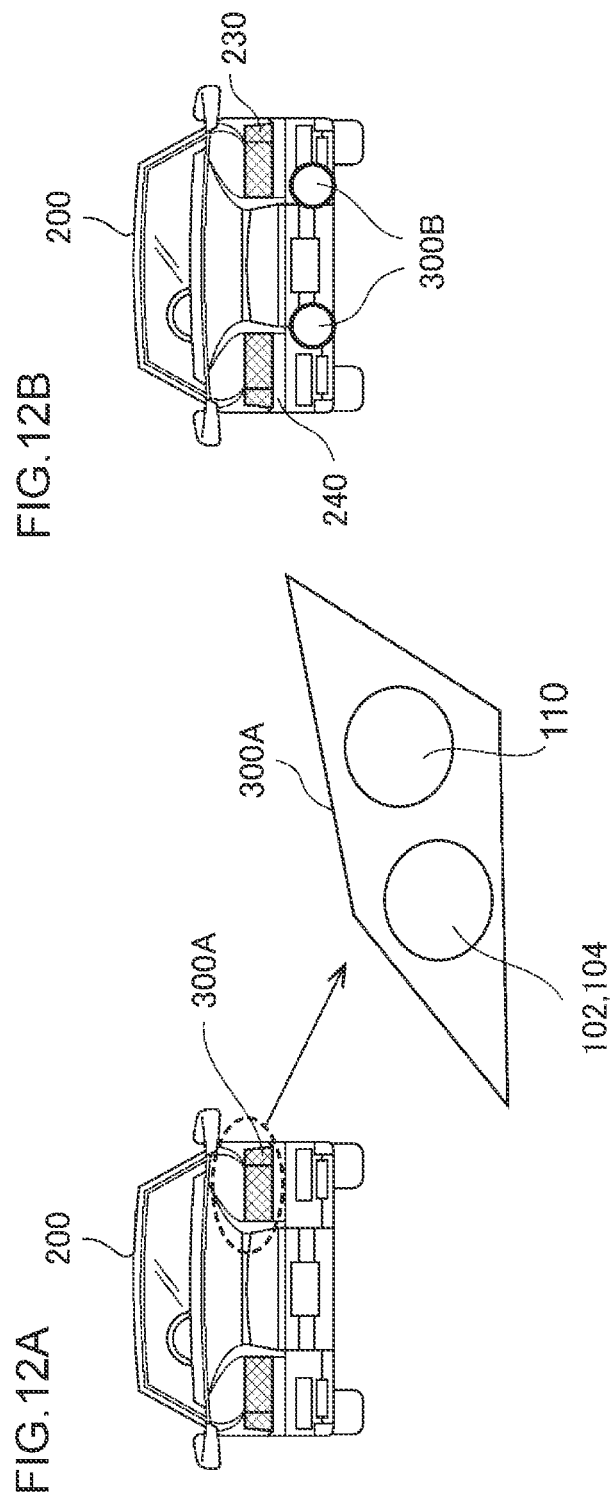

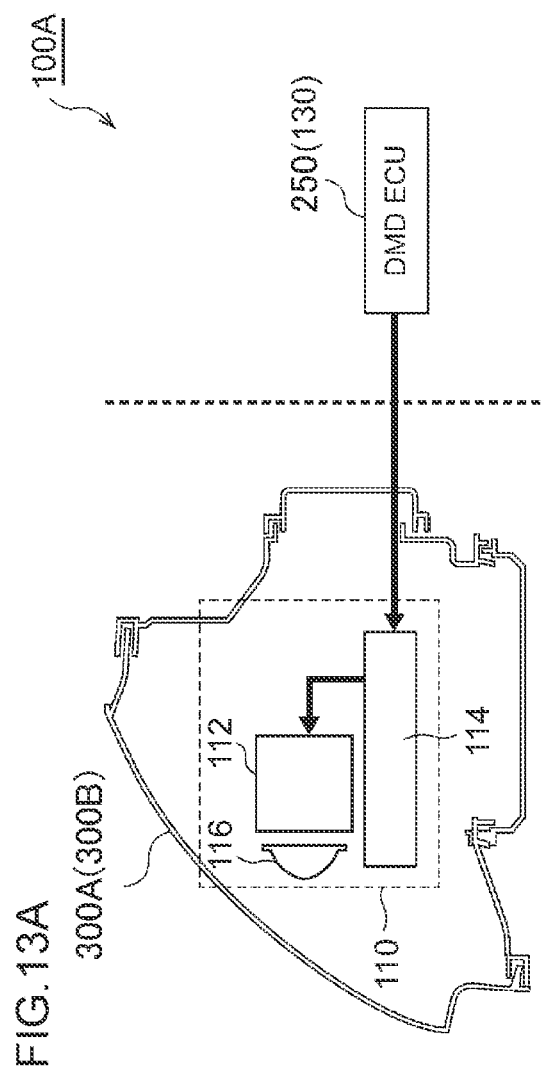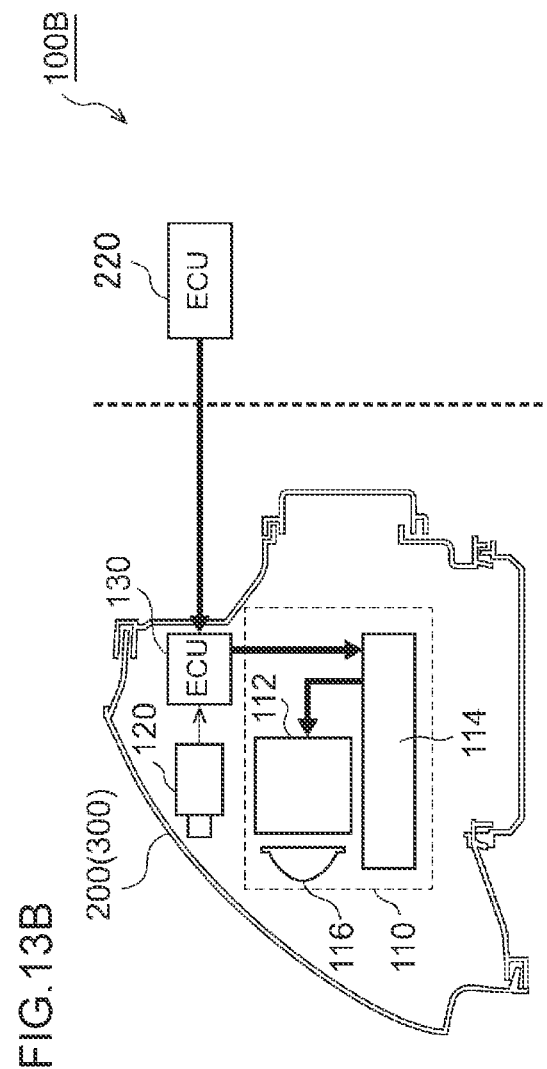

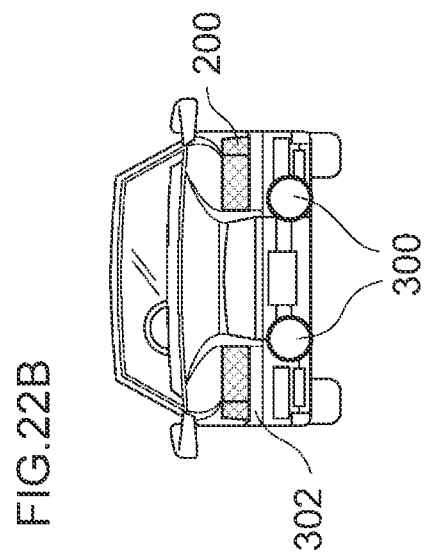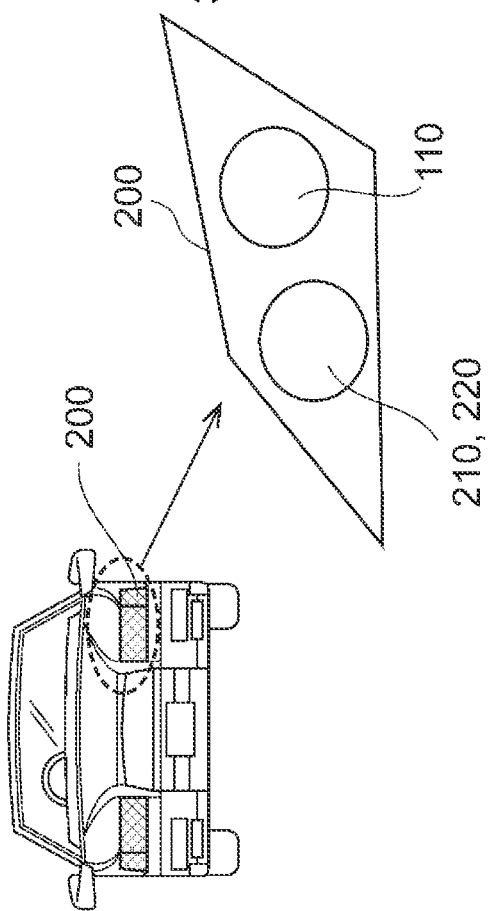

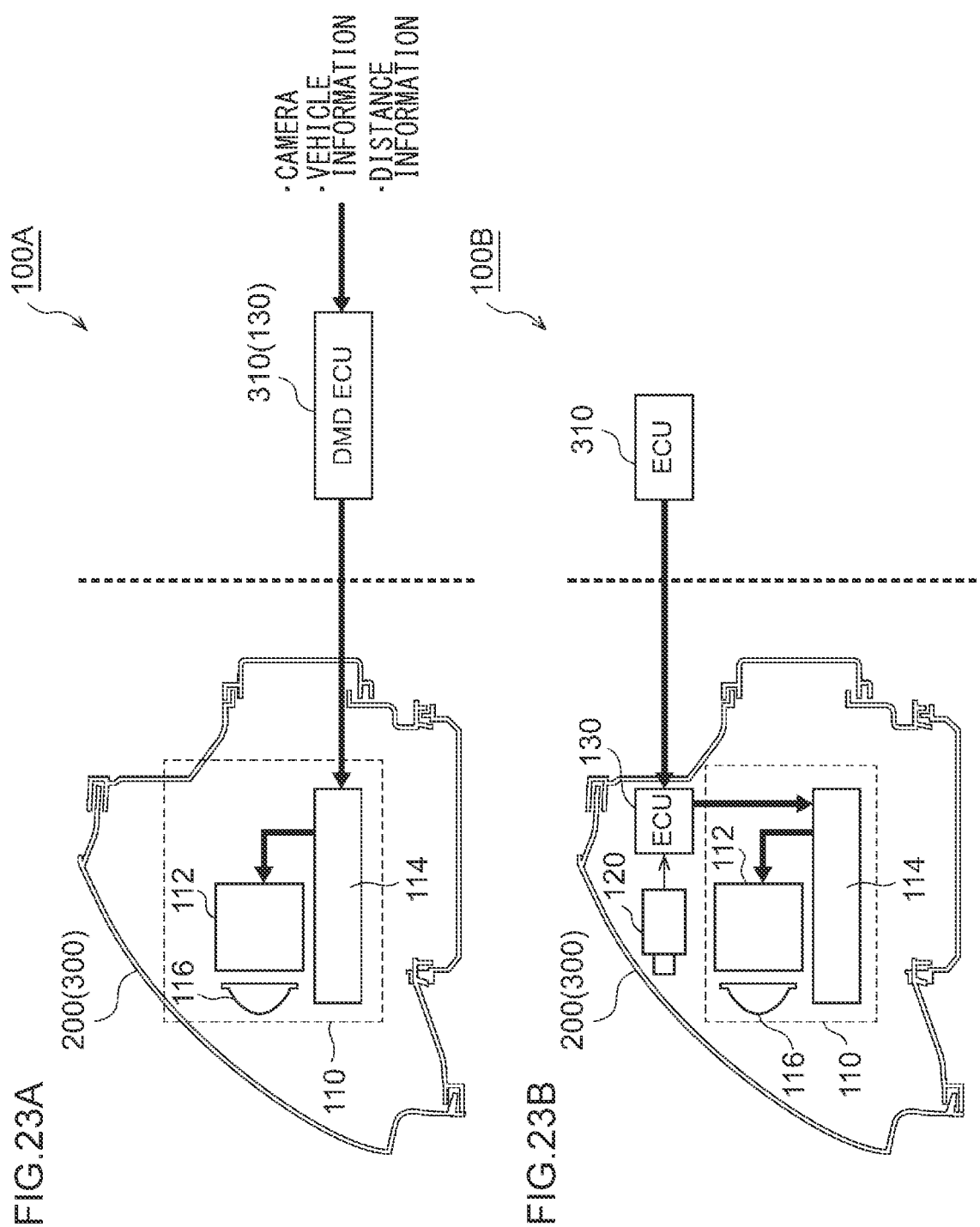

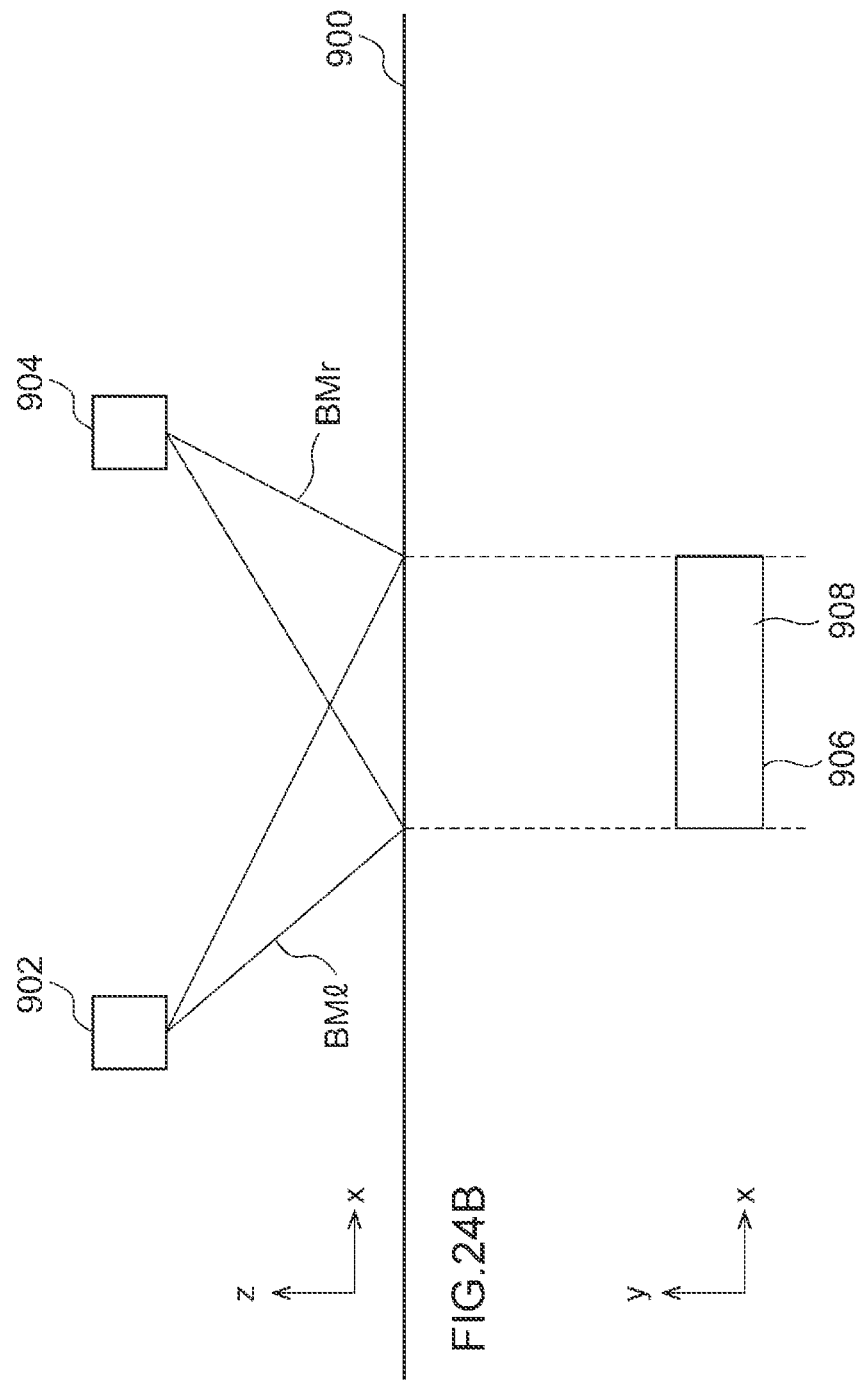

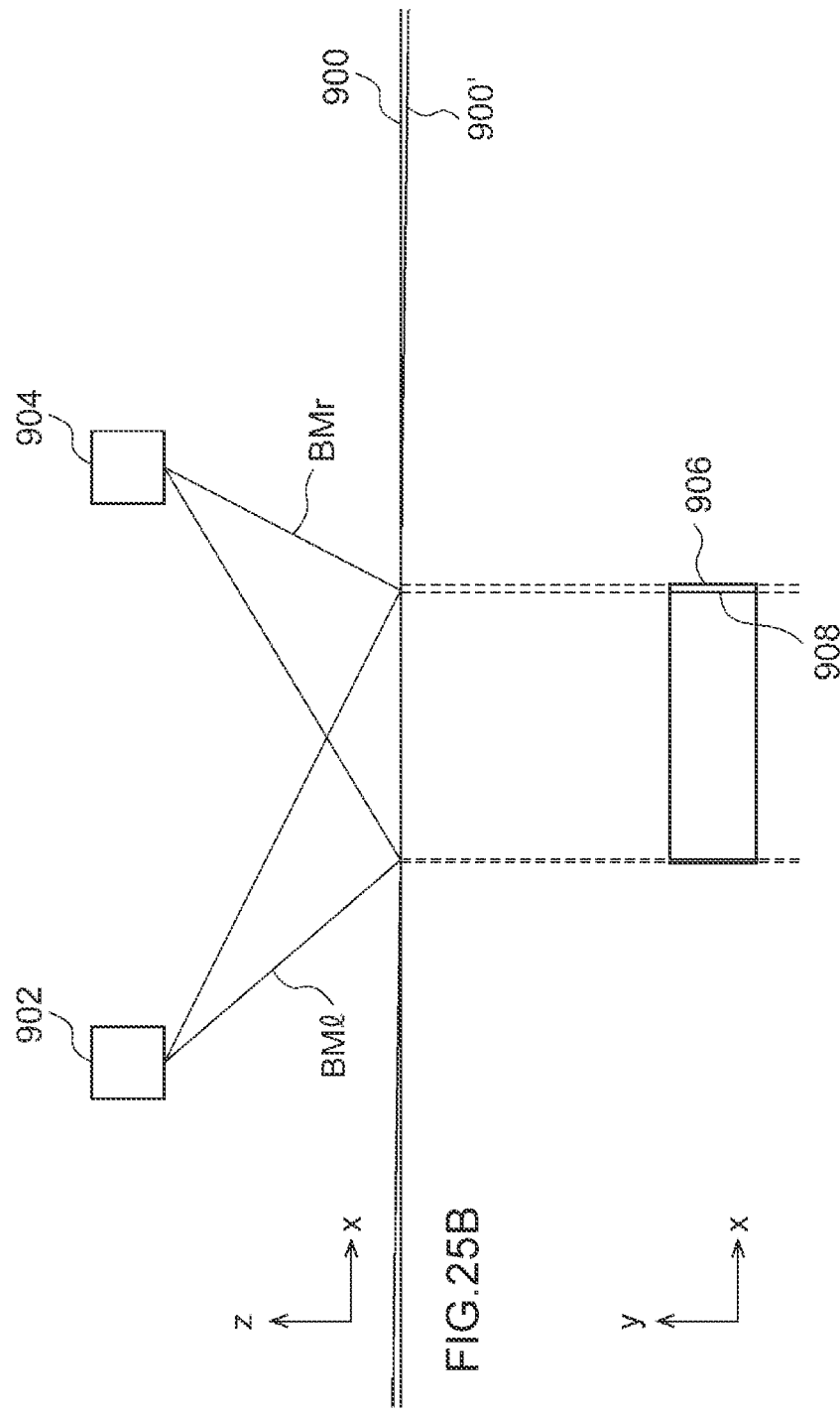

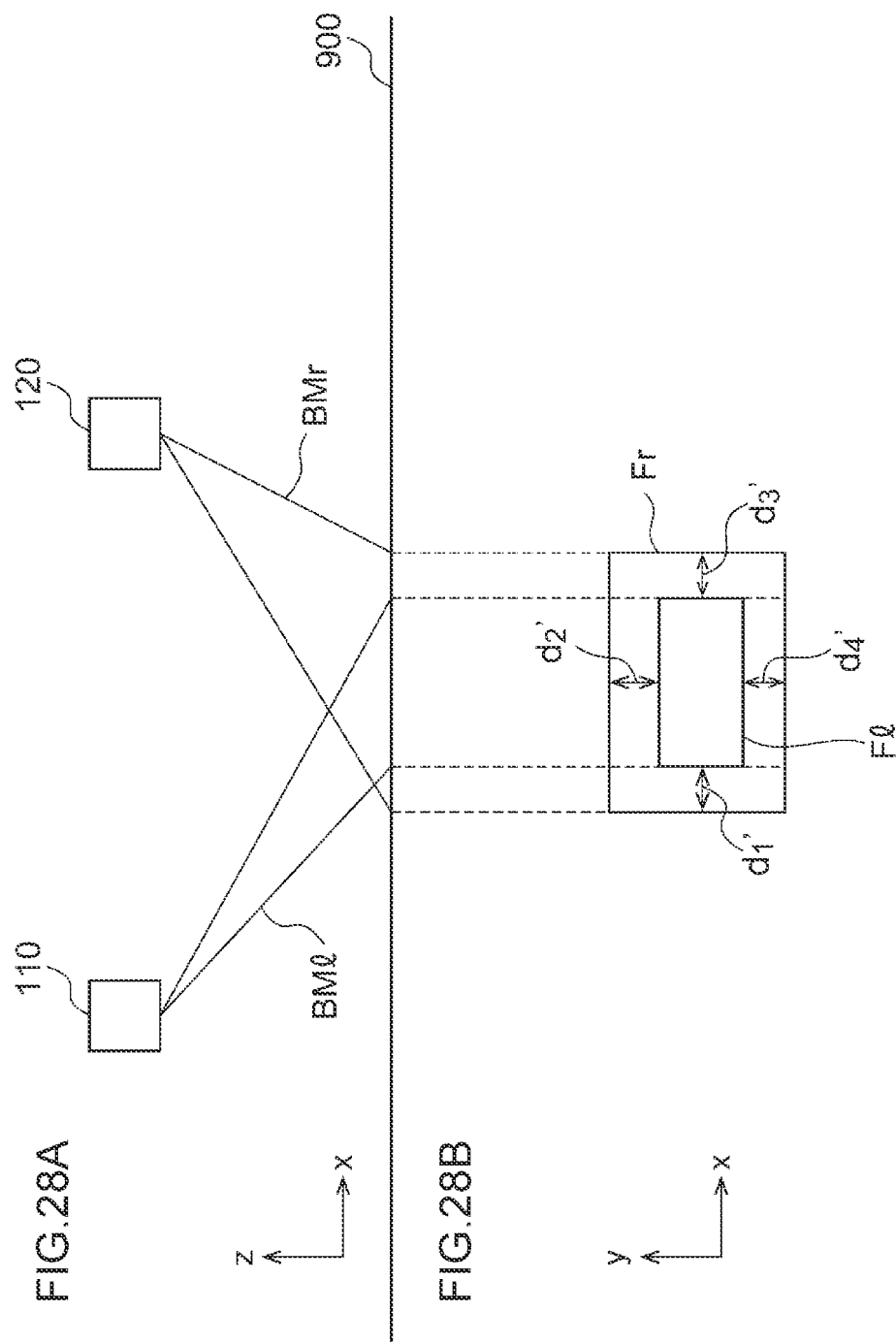

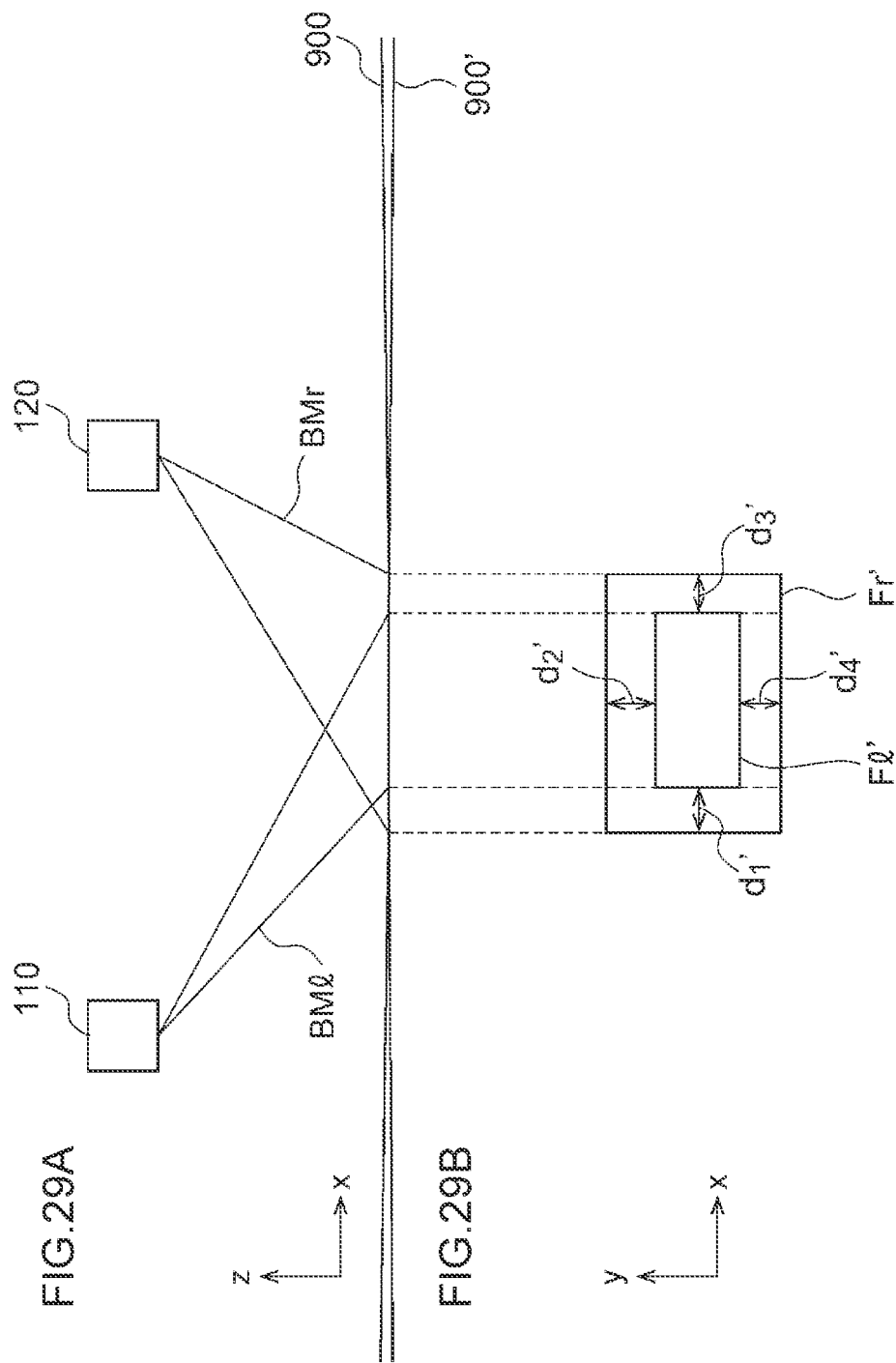

FIG.31A
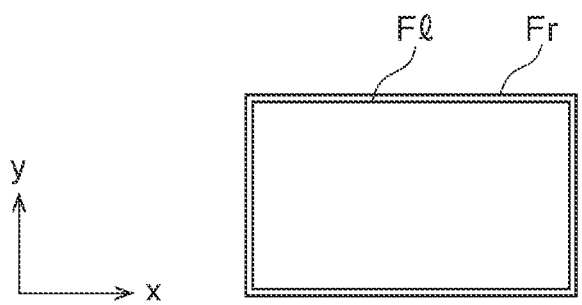
FIG.31B
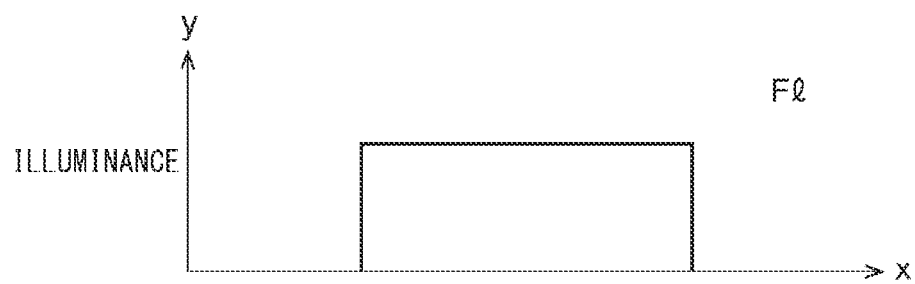
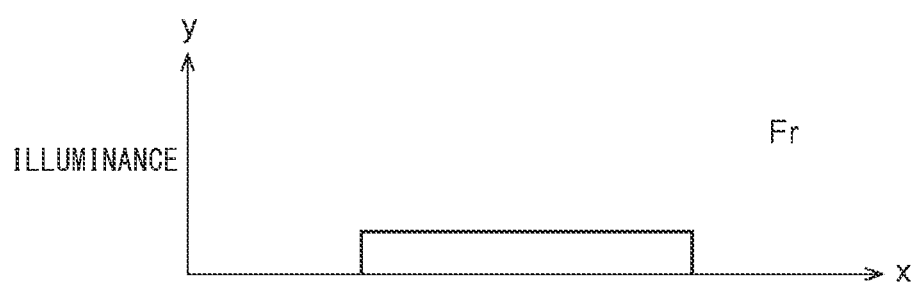
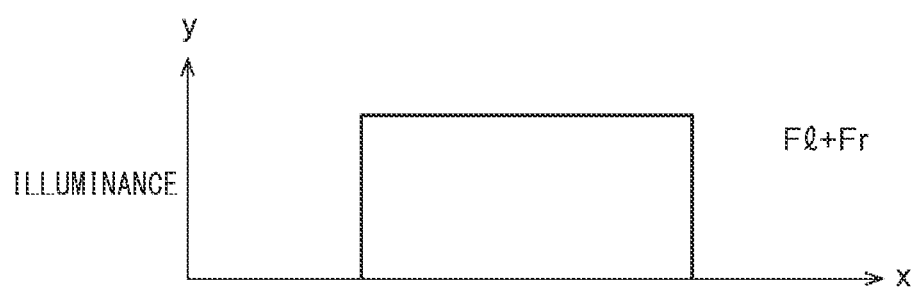

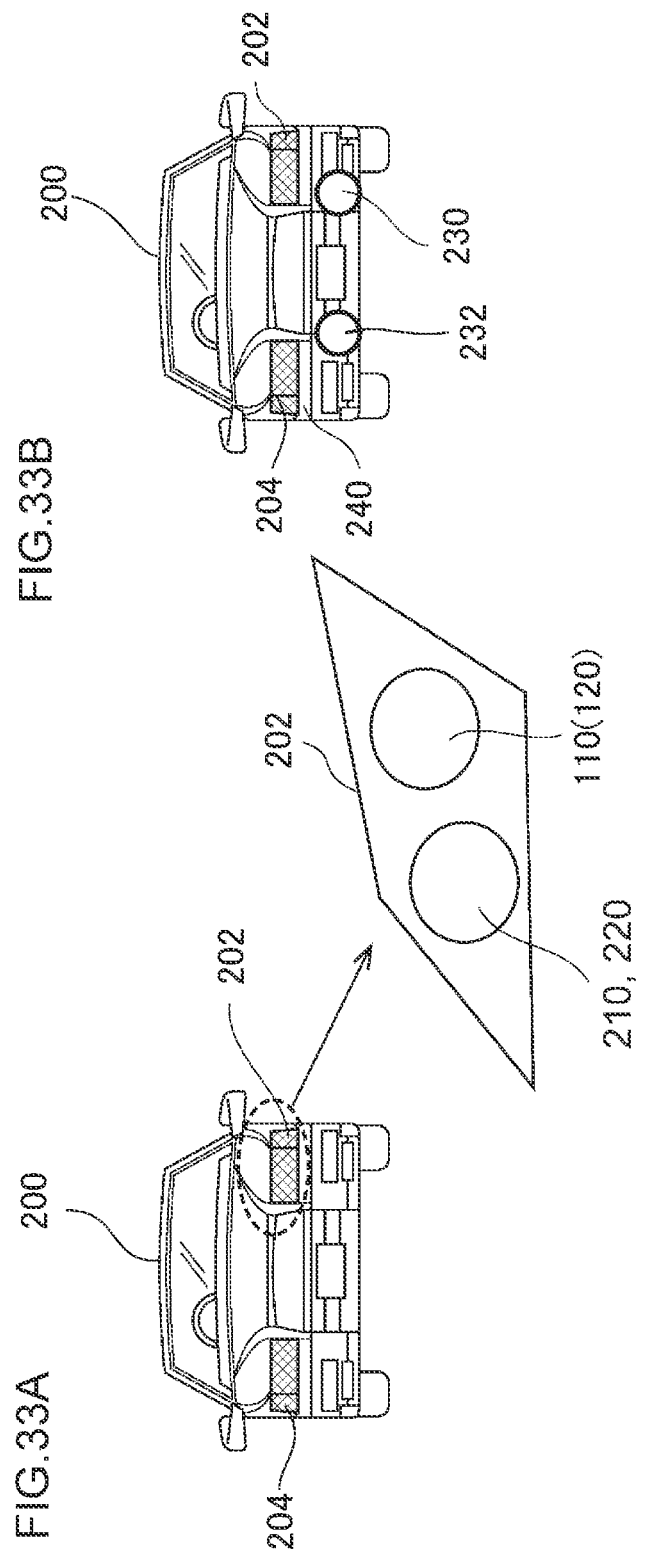

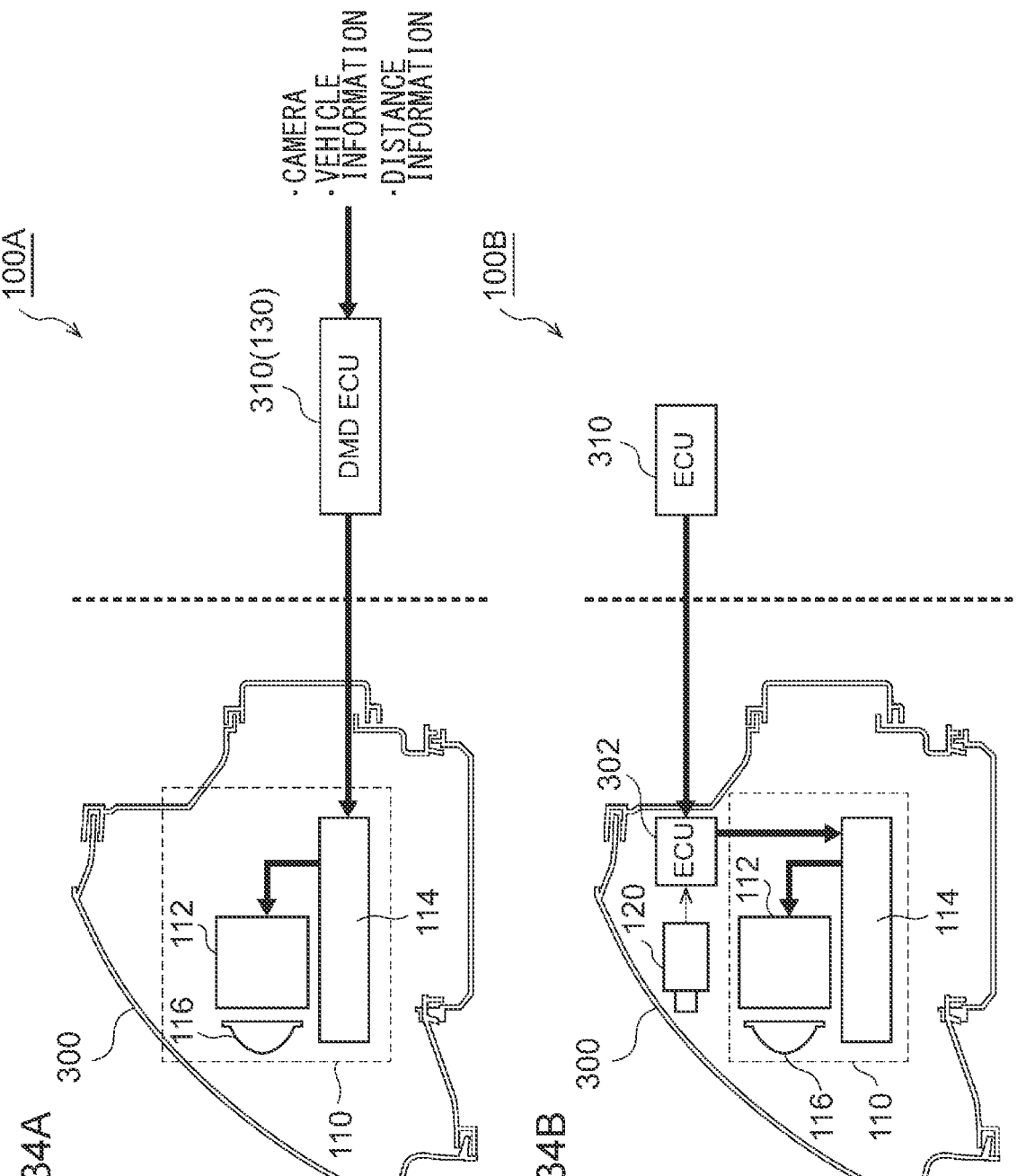

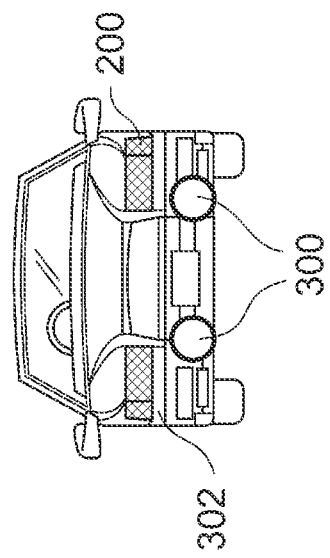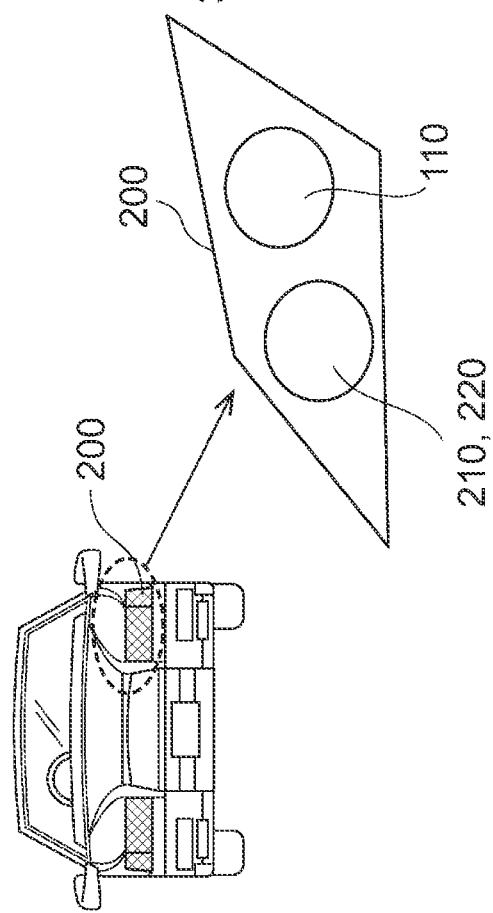

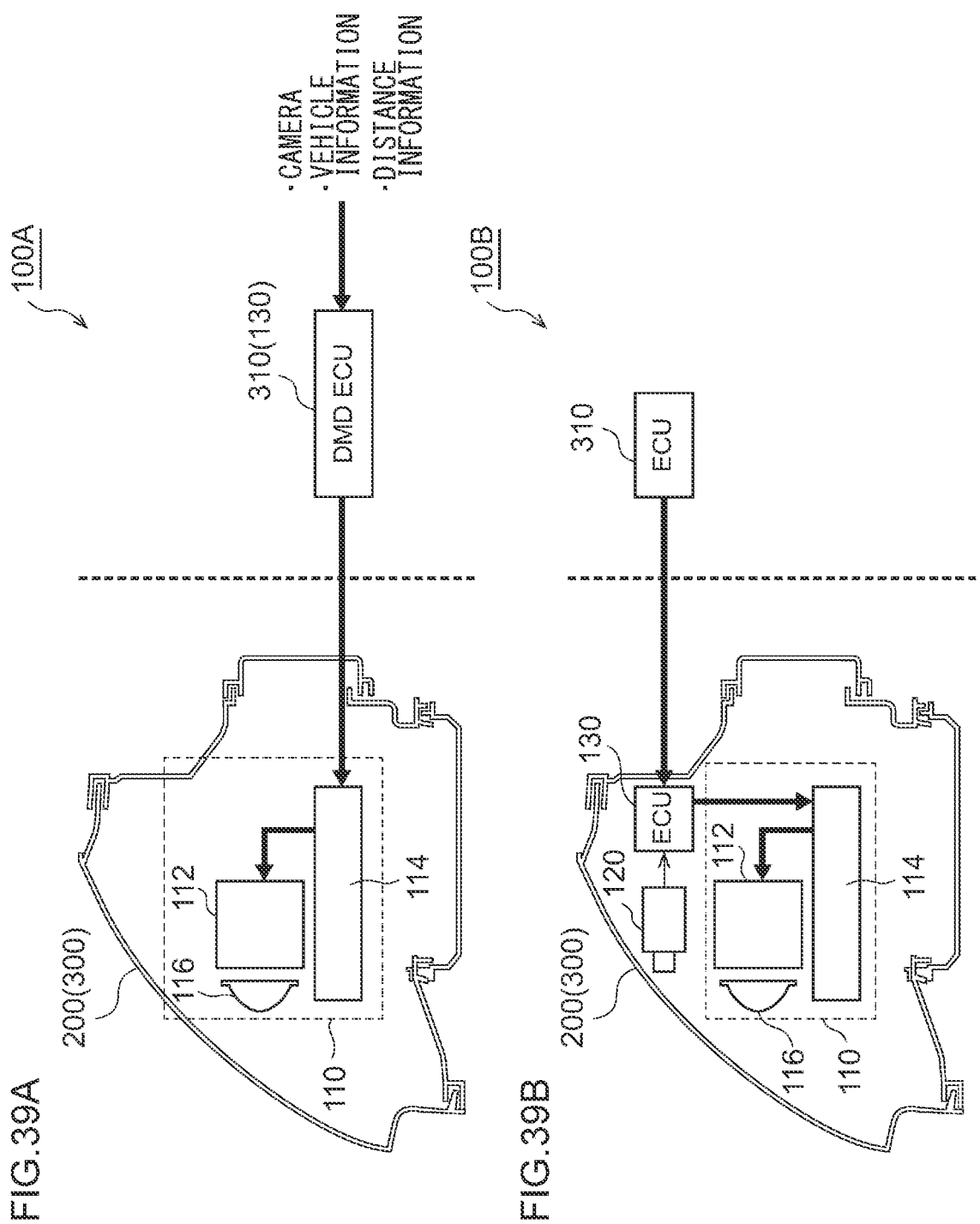

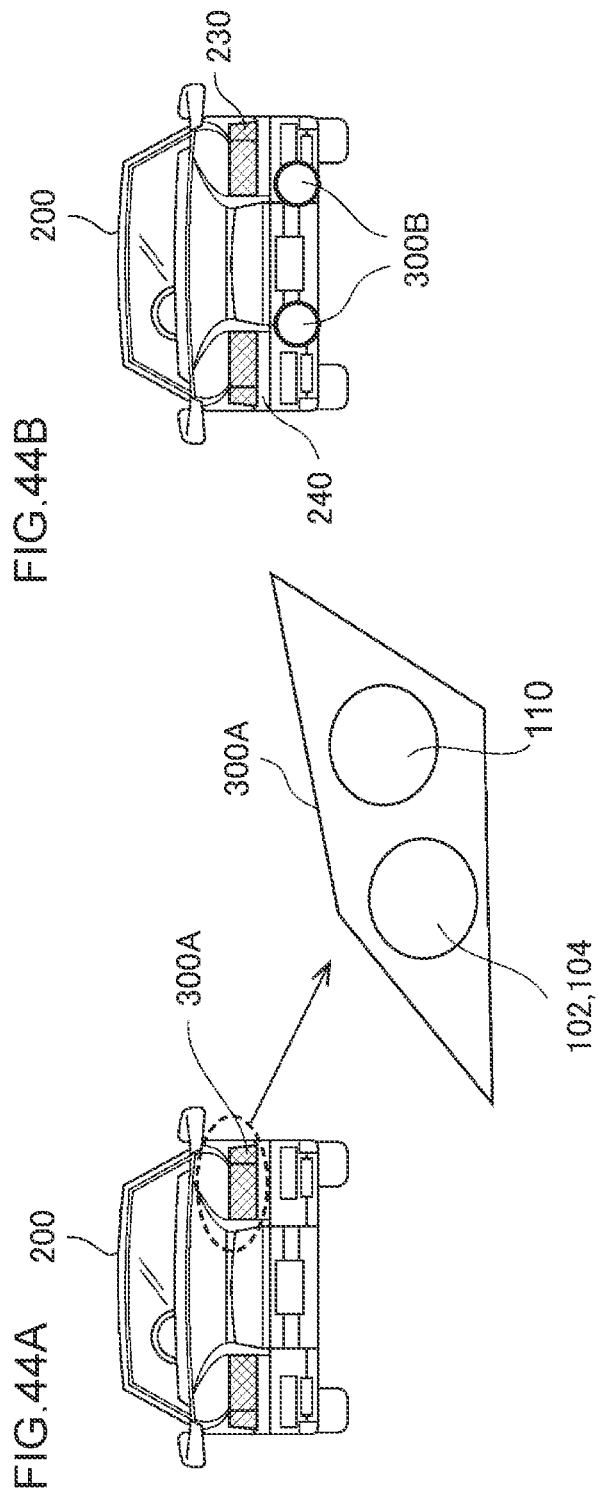

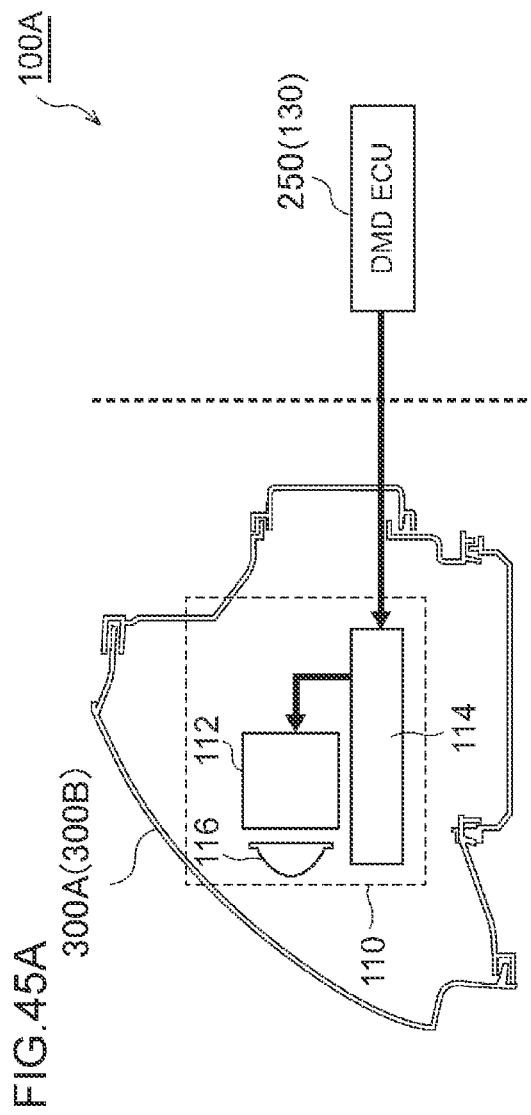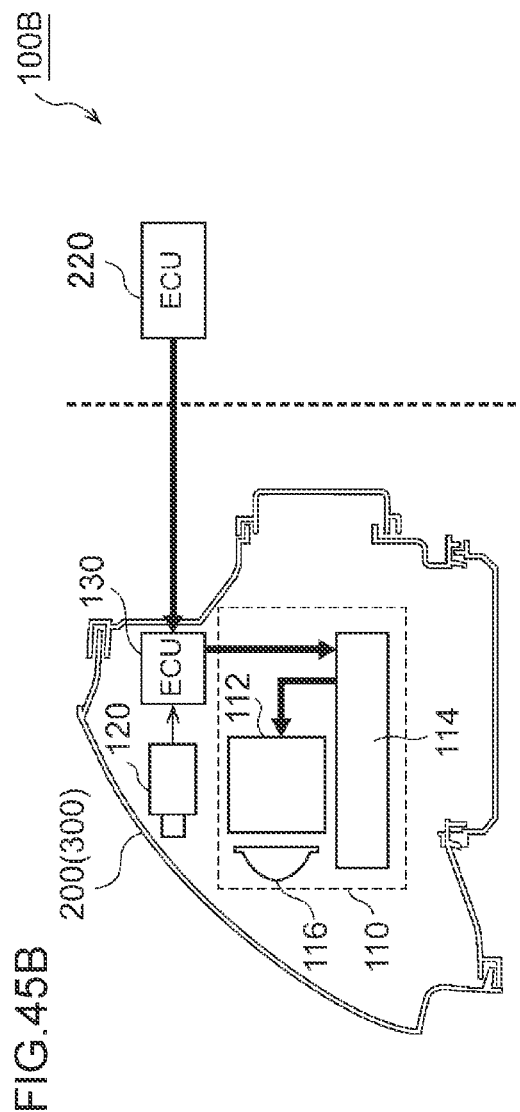

LAMP SYSTEM AND AUTOMOTIVE LAMP

BACKGROUND

1. Technical Field

The present invention relates to an automotive lamp.

2. Description of the Related Art

When driving at night or through a tunnel, an automotive lamp plays an important role in supporting safe driving. In recent years, the use of adaptive driving beam (ADB) lamps has been advancing in order to dynamically and adaptively control a light distribution pattern based on the state of the surroundings of a vehicle. With an ADB lamp, the presence or absence of a forward vehicle or a pedestrian in front of the vehicle is detected, and the illumination is reduced or turned off for a region that corresponds to such a forward vehicle or pedestrian thus detected, thereby reducing glare imparted to a driver of the forward vehicle or a pedestrian.

Also, a technique has been proposed in which figures, characters, or the like are drawn on a road surface for driving assistance using an ADB light source having a high spatial resolution. At the same time, the road surface is also illuminated by an ordinary headlamp. Accordingly, in order to allow the driver and other traffic participants to view such figures or characters drawn on the road surface, such a technique requires a sufficiently high contrast ratio. This requires a high-luminance light source for drawing on the road surface.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "one embodiment" may be used herein to refer to a single embodiment or multiple embodiments of the disclosure.

(1) One embodiment of the present disclosure has been made in view of such a situation. Accordingly, it is an exemplary purpose of one embodiment of the present disclosure to provide a lamp that contributes to traffic safety.

One embodiment of the present disclosure relates to a lamp system. The lamp system includes: a variable light distribution lamp structured to irradiate a beam with a variable light intensity distribution to the road surface; and a controller structured to control the variable light distribution lamp, to draw a pattern that corresponds to a predetermined event on the road surface in response to a start of the predetermined event, and to extinguish the pattern in response to an end of the predetermined event.

The road surface drawing may be executed as an event-driven operation. With the patterns each defined for a corresponding event, such an arrangement is capable of notifying a traffic participant in the vicinity of the user's vehicle of the presence of the user's vehicle or the intentions of the driver in an appropriate form at an appropriate timing without troubling the driver.

Also, as the predetermined event, overtaking a leading vehicle may be employed. Also, the variable light distribution lamp may draw a first pattern on the road surface in front of the vehicle over a predetermined first range defined with the traveling direction as the longitudinal direction thereof with a light intensity that is brighter or dimmer than the low beam. This allows the leading vehicle to be notified that the user's vehicle is overtaking.

Also, the first range may be generated such that it extends beyond the front edge of the leading vehicle. This arrangement irradiates a first pattern to a range that does not overlap a blind spot of the driver of the leading vehicle. This allows the driver of the leading vehicle to be notified in a surer manner that the user's vehicle is overtaking.

Also, as the predetermined event, the lane change may be employed. Also, the variable light distribution lamp may draw a second pattern on the road surface in front of the vehicle such that the front edge thereof extends up to the inner side of an adjacent lane with a light intensity that is brighter or dimmer than that of the low beam. This allows a following vehicle in an adjacent lane to be notified of the intention to change lanes.

Also, as the predetermined event, entering an intersection may be employed. Also, the variable light distribution lamp may draw a third pattern on the road surface in front of the vehicle such that the front edge thereof extends up to the inner side of an intersection with a light intensity that is brighter or dimmer than that of the low beam. This allows a vehicle in the intersection area to be notified of the intention to enter the intersection.

Also, as the predetermined event, vehicle merging in traffic congestion may be employed. Also, the variable light distribution lamp may draw a fourth pattern on the road surface in front of the vehicle such that the front edge thereof extends up to the inner side of a merging lane with a light intensity that is brighter or dimmer than that of the low beam. This allows a vehicle in the merging lane to be notified of the intention to merge.

Also, as the predetermined event, lane deviation may be employed. Also, the variable light distribution lamp may draw a fifth pattern including at least one from among two lines that indicate the vehicle width (left edge and the right edge) on the road surface in front of the vehicle with a light intensity that is brighter or dimmer than that of the low beam. This allows the driver of the user's vehicle to be warned.

Also, as the predetermined event, approaching a leading vehicle may be employed. Also, the variable light distribution lamp may draw a sixth pattern on the road surface between the leading vehicle and the user's vehicle with a light intensity that is brighter or dimmer than that of the low beam. This allows the driver of the user's vehicle to be warned.

Also, as the predetermined event, deviation from the minimum legal speed may be employed. Also, the variable light distribution lamp may draw a seventh pattern on the road surface in front of the vehicle with a light intensity that is brighter or dimmer than that of the low beam in order to prompt acceleration. This allows the driver of the user's vehicle to be warned.

Another embodiment of the present disclosure relates to an automotive lamp. The automotive lamp includes a variable light distribution lamp structured to irradiate a beam with a variable light intensity distribution to the road surface. When overtaking a leading vehicle, the variable light distribution lamp draws a pattern on the road surface in front of the vehicle over a predetermined range with the traveling direction as the longitudinal direction thereof with a light intensity that is brighter or dimmer than that of the low beam.

(2) In order to prevent collisions or minor accidents with pedestrians, it is important to allow a pedestrian to notice the vehicle in addition to the driver immediately noticing the pedestrian, so as to allow them both to perform avoidance actions.

One embodiment of the present disclosure has been made in view of such a situation. Accordingly, it is an exemplary purpose of one embodiment of the present disclosure to provide an automotive lamp that contributes to traffic safety.

One embodiment of the present disclosure also relates to a lamp system. The lamp system include: a variable light distribution lamp structured to be capable of generating a beam with a variable light intensity distribution; and a light distribution controller structured to control the variable light distribution lamp. Upon detecting a pedestrian, the light distribution controller temporarily changes the light intensity of a part of the beam irradiated to a face of the pedestrian.

This provides the same effects as those provided by applying flashing to only a pedestrian, thereby allowing the pedestrian to notice the presence of the vehicle. This prompts the pedestrian to retreat away from the vehicle. Furthermore, a local front-side portion of the user's vehicle flashes, thereby attracting the driver's attention. This allows the driver to notice the presence of the pedestrian.

The method for detecting a pedestrian is not restricted in particular. The pedestrian may be detected based on the output of a camera, LiDAR, stereo camera, ToF camera, or the like.

Upon detecting a pedestrian, the light distribution controller may further draw a predetermined pattern on the road surface. In a case in which the pedestrian walks while looking down at the ground, the pedestrian is able to notice the pattern drawn on the road surface, thereby allowing the pedestrian to notice the presence of the vehicle.

The pattern may be drawn such that it extends toward the pedestrian or the feet of the pedestrian from the vehicle mounting the lamp system. This allows the pedestrian to easily understand that the pattern is drawn for the pedestrian as a notice or a warning. Furthermore, this allows the driver of the user's vehicle to be notified of the direction of the pedestrian.

The road surface drawing may be enabled when a predetermined condition is satisfied. The predetermined condition may be defined with the vehicle speed as a parameter. Also, the predetermined condition may be defined with the distance up to a pedestrian as a parameter.

When multiple pedestrians are detected, a predetermined number of pedestrians judged to involve a highest risk may be selected as an irradiation target. If the face portions are illuminated or the patterns are drawn on the road surface for all the multiple pedestrians, this has the potential to actually confuse the driver. In order to solve such a problem, the number of the irradiation target persons is limited, thereby providing improved safety.

(3) Progress is being made in making automotive lamps more sophisticated. As an example, a sophisticated automotive lamp has been proposed, configured to have a function of irradiating a light beam pattern to the road surface so as to draw figures or characters.

At the same time, the road surface is also illuminated by an ordinary headlamp. Accordingly, in order to allow the driver and other traffic participants to view such figures or characters drawn on the road surface, such a technique requires a sufficiently high contrast ratio. This requires a high-luminance light source for drawing on the road.

Examples of light sources that can be employed to support such a function of high-resolution drawing on the road surface include Digital Micromirror Devices (DMDs), micro light-emitting diodes (μ-LEDs), etc. However, in some cases, it is difficult for such a single light source alone to provide sufficient luminance.

The present inventor has investigated an arrangement in which a pair of light sources are arranged on the left side and the right side of the vehicle, and the beams generated by the left and right light sources are superimposed so as to draw figures or characters. However, the present inventor has recognized the following problem. Description will be made below with reference to FIGS. 24 and 25 regarding the problem.

FIGS. 24A and 24B are diagrams showing an ideal state in which beams BMl and BMr are irradiated to a road surface 900 that functions as a screen from left and right light sources 902 and 904. FIG. 24A is a diagram showing the road surface 900 that functions as a screen as viewed from the side. FIG. 24B is a diagram showing the road surface 900 as viewed from above. In the following description, "figures" include characters.

In such an ideal state, a figure 906 drawn by the left beam BMl and a figure 908 drawn by the right beam BMr are completely overlaid. This allows a sharp figure to be presented to the driver and the traffic participants.

However, in many cases, such an ideal state cannot be provided during the actual driving of the vehicle. In actuality, the state deviates from such an ideal state due to the change of the irradiation angles of the left and right beams due to pitching or an inclination of the road surface. FIGS. 25A and 25B are diagrams showing a realistic state in which the left and right beams are irradiated to the road surface. In such a realistic state, a road surface 900' that functions as a screen has an inclination as compared with an ideal state. As a result, a position gap occurs between the figure 906' drawn by the left beam BMl and the figure 908' drawn by the right beam. This leads to the occurrence of a double outline of the figure, leading to the occurrence of a blurred figure. The occurrence of such a blurred figure drastically reduces the visibility to the driver and traffic participants.

One embodiment of the present disclosure has been made in order to solve such a problem. Accordingly it is an exemplary purpose of one embodiment of the present disclosure to provide improved visibility of figures to be drawn on the road surface.

A lamp system according to one embodiment of the present disclosure includes: a first variable light distribution lamp provided on the front-left side of the vehicle, and structured to irradiate a first beam with a variable light intensity distribution to the road surface so as to draw a first pattern; and a second variable light distribution lamp provided on the front-right side of the vehicle, and structured to irradiate a second beam with a variable light intensity distribution to the road surface so as to draw a second pattern. The first pattern and the second pattern respectively include a first figure and a second figure to be superimposed on the road surface. There is an intentional difference between the first figure and the second figure drawn on the road surface in a reference state.

By applying an intentional difference to the first figure and the second figure beforehand, this allows the blurring that occurs in the outline due to the position deviation to become inconspicuous even if position deviation occurs in drawing the first figure and the second figure on the road surface. This suppresses degradation of visibility.

One from among the first figure and the second figure may be drawn with an inset (outset) with respect to the other.

Also, the first figure and the second figure may be drawn with an inset amount or an offset amount in the front-rear direction that is larger than that in the left-right direction.

Also, the first figure and the second figure may be drawn with different brightness levels.

Also, the first beam and the second beam may be irradiated with different light intensities.

(4) In order to provide vehicles with improved added value, an increasing number of vehicles mount a courtesy lamp. The courtesy lamp has a function of illuminating an area under a passenger's feet so as to assist the passenger in getting into or out of the vehicle, and a function of notifying a following vehicle that the door is in the open state.

One embodiment of the present disclosure has been made in view of such a situation. Accordingly, it is an exemplary purpose of one embodiment of the present disclosure to provide a lamp system that provides the vehicle with improved added value.

One embodiment of the present disclosure also relates to a lamp system. The lamp system includes: a variable light distribution lamp structured to irradiate a beam with a variable light intensity distribution to the road surface; a light distribution controller structured to control the variable light distribution lamp when the vehicle mounting the lamp system is traveling, and to draw a figure for driving assistance on the road surface using the beam. When a person who satisfies a predetermined condition approaches the vehicle while the vehicle is parked, the light distribution controller draws a predetermined pattern on a ground surface using the beam.

(5) Traffic participants such as pedestrians, bicycle riders, etc., are able to immediately notice the approach of the vehicle from the front with the headlamp as a clue. However, it is difficult for such traffic participants to notice the approach of the vehicle from behind even if the headlamp is turned on.

One embodiment of the present disclosure has been made in view of such a situation. Accordingly, it is an exemplary purpose of one embodiment of the present disclosure to provide a lamp that is capable of alerting the traffic participants in front of the vehicle of the approach of the vehicle from behind.

One embodiment of the present disclosure also relates to an automotive lamp. The automotive lamp includes a variable light distribution lamp structured to irradiate a beam with a variable light intensity distribution to the road surface. The variable light distribution lamp draws a pattern over a predetermined range in front of the vehicle with the traveling direction as the longitudinal direction thereof with a light intensity that is brighter or dimmer than that of the low beam.

With this embodiment, before the vehicle overtakes a traffic participant, the pattern drawn such that it occupies a predetermined range on the road surface passes by the traffic participant. The pattern is drawn with a light intensity that is brighter than that of the low beam. Accordingly, this arrangement allows a traffic participant in front of the vehicle to be warned of the approach of the vehicle from behind.

Also, the pattern may include multiple figures arranged in the traveling direction. With the multiple figures arranged in the traveling direction, when the vehicle is traveling, the multiple figures sequentially pass by a traffic participant. In this state, the road surface in the vicinity of the traffic participant is alternately illuminated in the order of "bright", "dark", "blight", "dark", . . . . This allows the traffic participant to be further warned as compared with an arrangement configured to irradiate a uniform pattern.

Also, the pattern may be drawn as an animation of multiple figures that slide in a direction away from the vehicle at the same speed. This allows a traffic participant to be notified in an intuitive manner of the approach of the vehicle from behind.

The multiple figures may be drawn such that they have a relative speed of 10 km/h to 165 km/h with respect to the vehicle.

Also, the multiple figures may be drawn such that they slide at a speed that is changed according to the distance up to a traffic participant in front of the vehicle. This allows a traffic participant to obtain information with respect to the distance up to the vehicle based on the animation speed. Also, the animation speed may be raised according to a reduction in the distance, thereby more strongly prompting the traffic participant to perform an appropriate action.

Also, the pattern may be drawn when the vehicle speed is equal to or smaller than a predetermined value. For example, the predetermined value may be established in a range between 20 km/h and 40 km/h.

Also, the pattern may be drawn when the vehicle is traveling on a road having a width that is smaller than a predetermined value. For example, the predetermined width is designed to be 4 m.

The pattern may be drawn on the satisfaction of a condition that the vehicle is traveling on a road having a width that is smaller than a predetermined width. For example, the predetermined width is designed to be 4 m. Also, the pattern may be drawn on the satisfaction of a condition that the vehicle is traveling on a road having no guardrail. Also, the pattern may be drawn on the satisfaction of a condition that the vehicle is passing an oncoming vehicle.

Also, the multiple figures may each be designed to have a width that is substantially equal to or larger than that of the vehicle.

Also, the pattern may include two lines that indicate the vehicle width. Also, the two lines may be drawn such that lengths thereof extend in the traveling direction with time.

Also, the pattern may include: two lines that indicate the vehicle width; and an animation figure drawn such that it extends in the traveling direction with time or such that it moves in the traveling direction with time.

It should be noted that any combination of the components described above or any manifestation thereof may be mutually substituted between a method, apparatus, system, and so forth, which are also effective as one embodiment of the present disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 4A through 4D are diagrams for explaining the drawing of the first pattern;

FIGS. 5A through 5C are diagrams for explaining the drawing of a second pattern according to one embodiment 2;

FIGS. 6A through 6C are diagrams for explaining the drawing of a third pattern according to one embodiment 3;

FIGS. 8A through 8C are diagrams for explaining the drawing of a fifth pattern according to one embodiment 5;

FIGS. 9A through 9D are diagrams for explaining the drawing of a sixth pattern according to one embodiment 6;

FIGS. 10A through 10C are diagrams for explaining the drawing of a seventh pattern according to one embodiment 7;

FIGS. 12A and 12B are diagrams each showing an example configuration of a lamp system;

FIGS. 13A and 13B are diagrams each showing an example configuration of a control system of a lamp system;

FIGS. 22A and 22B are diagrams each showing an example configuration of a lamp system;

FIGS. 23A and 23B are diagrams each showing an example configuration of a control system of a lamp system;

FIGS. 24A and 24B are diagrams each showing a situation in which beams are irradiated to the road surface that function as a screen by the left and right light sources in an ideal state;

FIGS. 25A and 25B are diagrams each showing a situation in which beams are irradiated to the road surface by the left and right light sources in a realistic state;

FIGS. 28A and 28B are diagrams for explaining the drawing of a pattern supported by the lamp system in a reference state;

FIGS. 29A and 29B are diagrams for explaining the drawing of a pattern supported by the lamp system in a realistic state;

FIGS. 31A and 31B are diagrams for explaining the drawing of a pattern in a reference state according to one embodiment 3-2;

FIGS. 33A and 33B are diagrams each showing an example configuration of a lamp system;

FIGS. 34A and 34B are diagrams each showing an example configuration of a control system of a lamp system;

FIGS. 38A and 38B are diagrams each showing an example configuration of a lamp system;

FIGS. 39A and 39B are diagrams each showing an example configuration of a control system of a lamp system;

FIGS. 44A and 44B are diagrams each showing an example configuration of a lamp system;

FIGS. 45A and 45B are diagrams each showing an example configuration of a control system of a lamp system;

DETAILED DESCRIPTION

Figure 1:
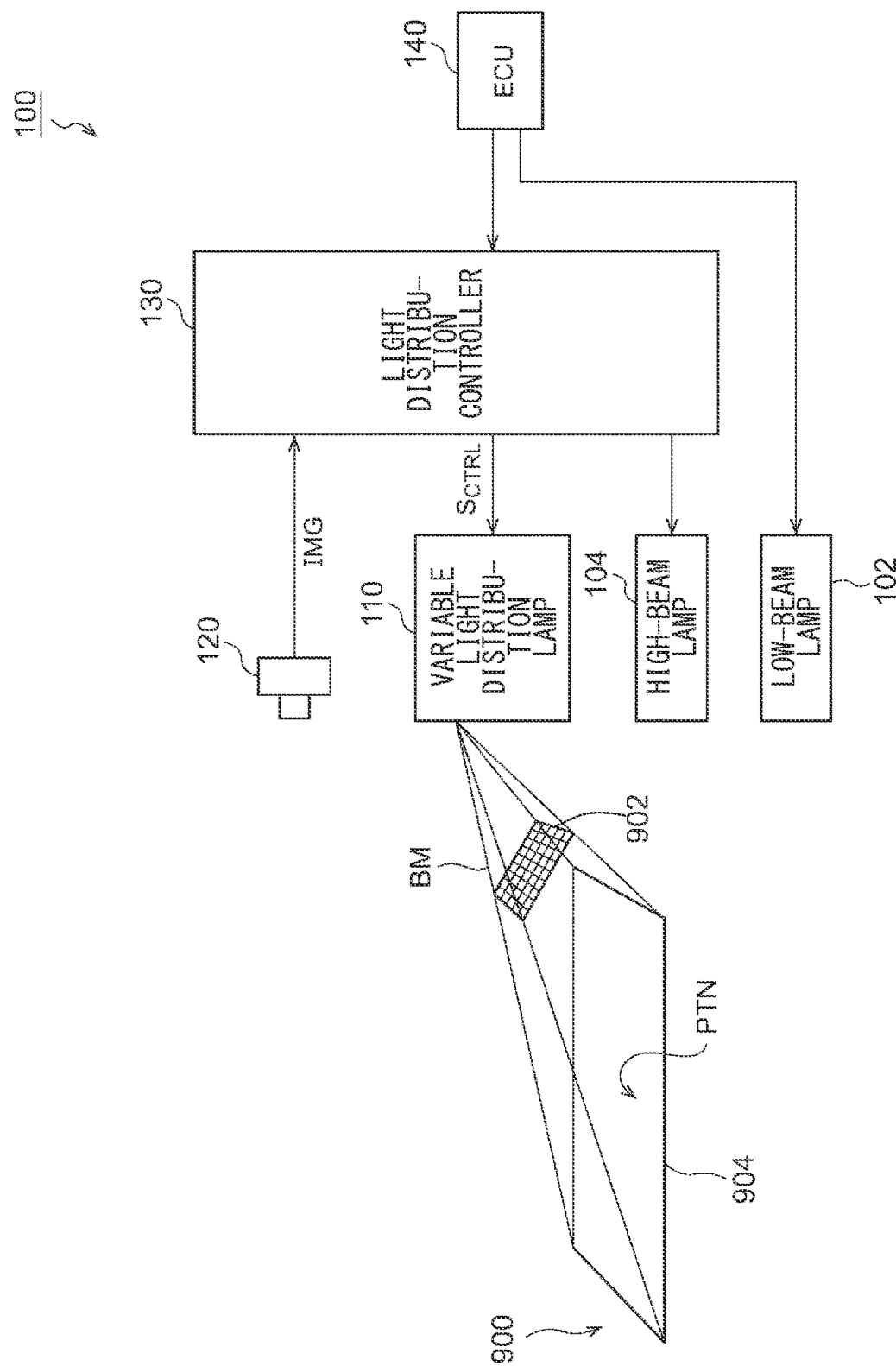
FIG. 1 is a block diagram showing a lamp system (or automotive lamp) according to one embodiment 1.

Description will be made below regarding the present invention based on preferred embodiments with reference to the drawings. The embodiments have been described for exemplary purposes only, and are by no means intended to restrict the present invention and the present disclosure. Also, it is not necessarily essential for the present invention or the present disclosure that all the features or a combination thereof be provided as described in the embodiments. The same or similar components, members, and processes shown in the drawings are denoted by the same reference numerals, and redundant description thereof will be omitted as appropriate.

First Embodiment

FIG. 1 is a block diagram showing a lamp system (or automotive lamp) 100 according to one embodiment 1. The lamp system 100 includes a variable light distribution lamp 110, a camera 120, a light distribution controller 130, a low-beam lamp 102, and a high-beam lamp 104. Such components may be built into the same housing. Also, several components may be provided as external components of the housing, i.e., may be provided on the vehicle side.

In the present embodiment, the variable light distribution lamp 110 is provided as an additional lamp separately from the low-beam lamp 102 and the high-beam lamp 104. Accordingly, the variable light distribution lamp 110 may be referred to as an "additional beam lamp".

The variable light distribution lamp 110 includes a white light source. The variable light distribution lamp 110 receives, from the light distribution controller 130, a control signal $S_{CTRL}$ that indicates a pattern PTN to be drawn on a road surface 900, and irradiates a beam BM having an intensity distribution 902 that corresponds to the control signal $S_{CTRL}$ to the road surface 900 in front of the vehicle, so as to draw the pattern PTN on the road surface 900. The pattern PTN is formed in an irradiation area 904 provided by the beam BM.

The configuration of the variable light distribution lamp 110 is not restricted in particular. For example, the variable light distribution lamp 110 may include a semiconductor light source such as a laser diode (LD), a light-emitting diode (LED), or the like, and a lighting circuit configured to drive and turn on the semiconductor light source. The variable light distribution lamp 110 may include a matrix-type pattern-forming device such as a digital mirror device (DMD), a liquid crystal device, or the like. Also, the variable light distribution lamp 110 may be configured as a light-emitting element array (which will be also referred to as a "μ-LED"). The variable light distribution lamp 110 may provide an irradiation area that overlaps a part of the irradiation area provided by the low-beam lamp.

The camera 120 captures an image of a region in front of the vehicle. The light distribution controller 130 may control the pattern PTN to be drawn by the variable light distribution lamp 110 on the road surface 900 based on the image captured by the camera 120 (which will be referred to as a "camera image IMG" hereafter).

The high-beam lamp 104 may be configured to support variable light distribution as with the variable light distribution lamp 110. In this case, the light distribution controller 130 may control the light distribution to be provided by the high-beam lamp 104 based on the camera image IMG. An electronic control unit (ECU) 40 integrally controls the lamp system 100. Specifically, the ECU 140 generates commands such as a turn-on command, turn-off command, etc., for the low-beam lamp 102, the high-beam lamp 104, and the variable light distribution lamp 110. Furthermore, the ECU 140 transmits information required for the light distribution control to the light distribution controller 130.

The light distribution controller 130 may be configured as a digital processor. For example, the light distribution controller 130 may be configured as a combination of a microcontroller including a CPU and a software program. Also, the light distribution controller 130 may be configured as a Field Programmable Gate Array (FPGA), Application Specified IC (ASIC), or the like.

More specifically, when the vehicle mounting the lamp system 100 is traveling, the light distribution controller 130 controls the variable light distribution lamp 110, so as to draw a figure on the road surface using the beam BM for driving assistance. The kinds of the figures are not restricted in particular. For example, legal speed information, road signs, or the like, may be drawn so as to allow the driver to easily view such information. Also, in order to assist other drivers in driving their vehicles, this arrangement may draw a figure that indicates the user's vehicle traveling direction.

Figure 2:
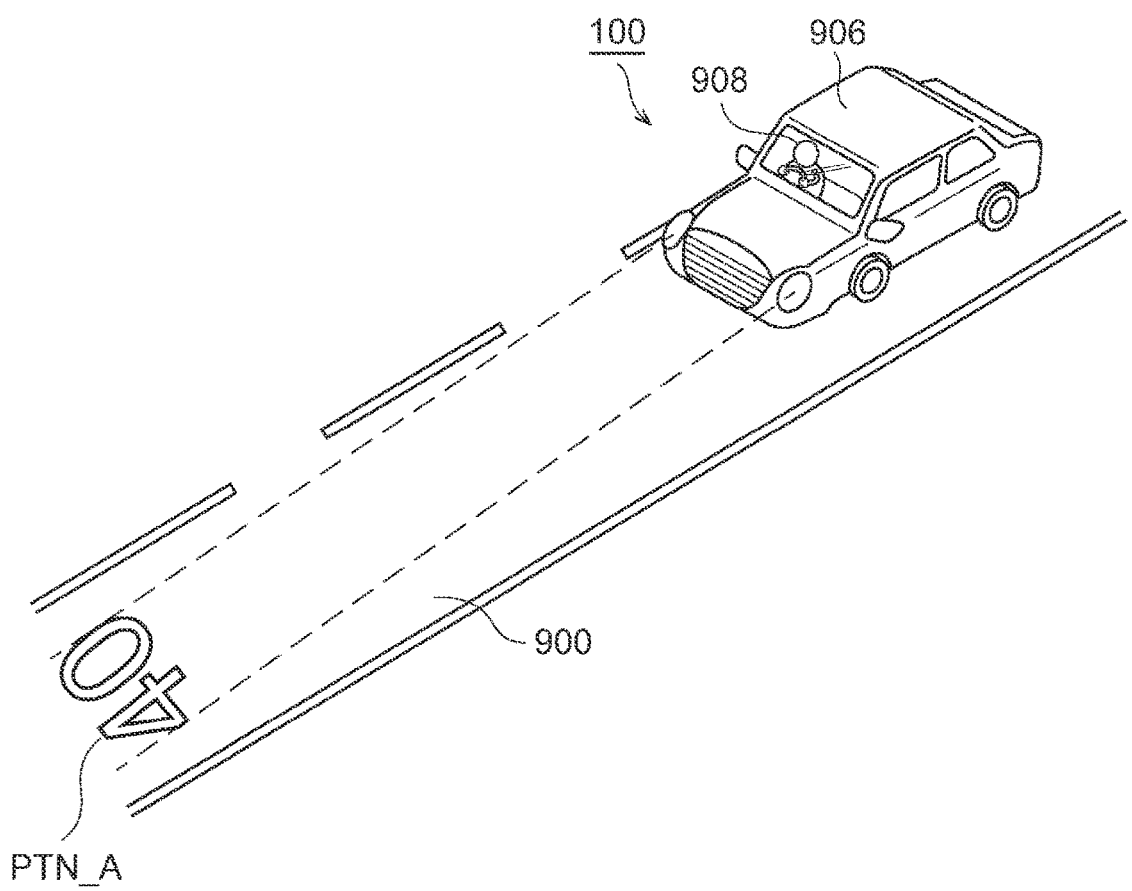
FIG. 2 is a diagram showing an example of a pattern drawn on a road surface by a variable light distribution lamp.

FIG. 2 is a diagram showing an example of a pattern PTN (PTN_A) to be drawn on the road surface 900 by means of the variable light distribution lamp 110. Various kinds and shapes of patterns PTN may be employed according to the traveling situation. FIG. 2 shows a given traveling situation. As the pattern PTN_A to be drawn on the road surface 900, a figure (character string) that indicates the speed limit may be employed. Also, examples of such a pattern PTN may include a figure or a character string that indicates information associated with a car navigation system. The pattern PTN is drawn with an appropriate size at a position that allows a driver 908 of a vehicle (which will be also referred to as the "user's vehicle") 906 mounting the lamp system 100 to easily view such information.

The light distribution controller 130 controls the variable light distribution lamp 110. Specifically, the light distribution controller 130 draws a pattern PTN #("#" that represents a symbol that indicates an event, e.g., "#"="1", "2", . . . , or the like) on the road surface 900 in response to the start of the corresponding event EVT_# defined beforehand. Furthermore, the light distribution controller 130 turns off the pattern PTN_# in response to the end of the event EVT_#.

Detection/judgement of the occurrence and end of each event may be supported by the light distribution controller 130 or by the ECU 140.

By supporting the road surface drawing operation of the variable light distribution lamp 110 as an event-driven operation, and by defining the pattern PTN_# for each event EVT_#, this arrangement allows the presence of the user's vehicle and the driver's intentions to be communicated to the traffic participants in the vicinity of the vehicle in an appropriate manner and at an appropriate timing without troubling the driver.

Description will be made below with reference to several examples regarding typical patterns PTN_#("#"=1, 2, . . . ) supported by the lamp system 100 according to the embodiment.

Example 1

Figure 3:
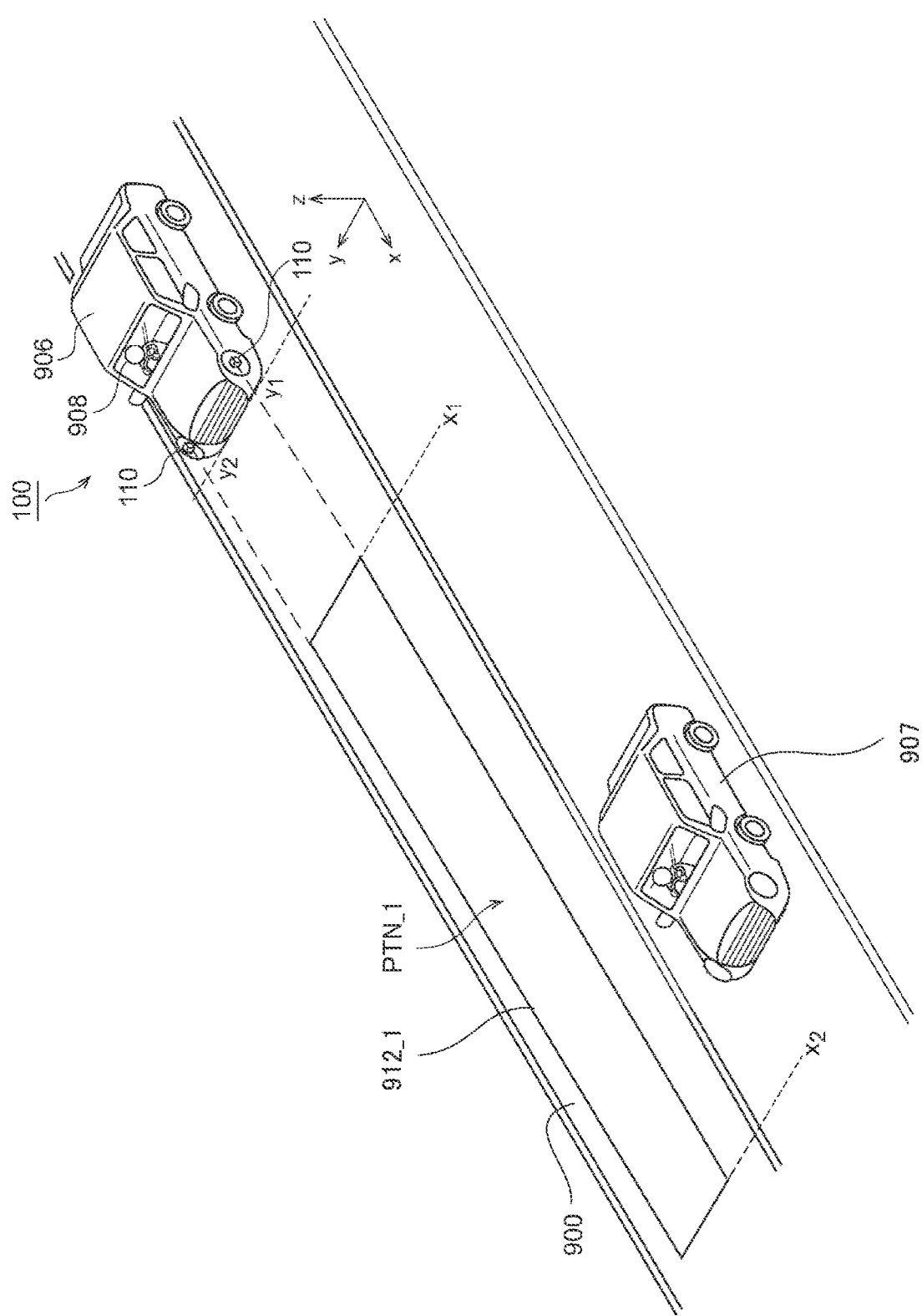
FIG. 3 is a diagram showing a first pattern according to an example 1.

In the example 1, a predetermined event EVT_1 is overtaking a leading vehicle. When the overtaking event EVT_1 has occurred, the first pattern PTN_1 is drawn on the road surface. FIG. 3 is a diagram showing a first pattern (overtaking notice pattern) PTN_1 according to the example 1. Description will be made below with the left-side lane in the traveling direction as a driving lane, and with the right-side lane in the traveling direction as an overtaking lane.

The occurrence of the overtaking event EVT_1 can be judged giving consideration to the distance between the user's vehicle 906 and the leading vehicle 907 and the relative speed difference between them, etc. For example, when the distance between them becomes 50 m or less, and when the relative speed difference between them becomes 20 km/h or more, the light distribution controller 130 (or the ECU 140) may judge that the overtaking event has occurred.

The end of the overtaking event EVT_1 may be judged based on the distance between the user's vehicle 906 and the leading vehicle 907. Alternatively, the end of the overtaking event EVT_1 may be judged based on an image captured by the camera. Examples of conditions based on which the end of the overtaking event EVT_1 may be judged include: the leading vehicle 907 disappearing from the field of view of the camera; and the leading vehicle 907 leaving from a predetermined region of the image captured by the camera.

The low beam can be irradiated to the road surface 900 in addition to the beam irradiated by the variable light distribution lamp 110. The variable light distribution lamp 110 irradiates the first pattern PTN_1 over a first range 912_1 ($x_1$ to $x_2$, $y_1$ to $y_2$) with the traveling direction (the x-axis direction) as the longitudinal direction with a light intensity that is brighter or dimmer than that of the low beam BML. In a case in which the origin of the x axis is defined to be the front edge of the vehicle, the first range 912_1 may be designed with $x_1$=1 m to 15 m and $x_2$=30 m to 60 m. An example may be made in which $x_1$=7 m and $x_2$=45 m. As a simplest example, the first pattern PTN_1 may be designed as a uniform irradiation pattern. However, the present invention is not restricted to such an example as described later.

The first pattern PTN_1 thus drawn allows the leading vehicle 907 to be notified that the user's vehicle is overtaking. This arrangement is capable of preventing the leading vehicle 907 from changing lanes to the overtaking lane without noticing the presence of the user's vehicle 906.

The first range 912_1 is preferably designed such that it extends in front of the front edge of the leading vehicle 907. With this, the first pattern PTN_1 is irradiated to the road surface without involving a blind spot of the driver of the leading vehicle 907. This arrangement is capable of notifying the leading vehicle 907 of the overtaking by the user's vehicle in a surer manner.

FIGS. 4A through 4D are diagrams for explaining the drawing of the first pattern PTN_1. Specifically, FIGS. 4A through 4D show overtaking situations in a time series manner. It should be noted that, in actuality, both the vehicle 906 and the leading vehicle 907 are traveling. However, for simplification of description, FIGS. 4A through 4D show the leading vehicle 907 at the same position.

In FIG. 4A, the leading vehicle 907 is in front of the user's vehicle 906. As shown in FIG. 4B, when the distance between the user's vehicle 906 and the leading vehicle 907 is reduced to some extent, judgement is made that the overtaking event EVT_1 has occurred. As a result, the lamp system 100 of the user's vehicle 906 draws the first pattern PTN_1 on the road surface. The first pattern PTN_1 is preferably drawn such that it extends in front of the front edge of the leading vehicle 907 at a turn-on timing, i.e., at a timing at which judgment is made that the event EVT_1 has occurred. For example, the first pattern PTN1 may include multiple (e.g., two) rectangular patterns arranged such that they are adjacent in the vehicle width direction and such that each rectangular pattern extends in front of the vehicle.

The distance between the vehicle 906 and the leading vehicle 907 is reduced with time. This is an intermediate state in the overtaking event. Accordingly, the first pattern PTN_1 is drawn.

As shown in FIG. 4D, after the user's vehicle 906 overtakes the leading vehicle 907, judgment is made that the overtaking event EVT_1 has ended. In response to the judgment of the end of the overtaking event EVT_1, the first pattern PTN_1 is turned off.

Example 2

In an example 2, a predetermined event EVT 2 is a lane change. When the lane change event EVT 2 has occurred, a second pattern PTN_2 is drawn on the road surface. FIGS. 5A through 5C are diagrams for explaining the drawing of the second pattern (lane change notice pattern) PTN_2 according to the example 2. FIGS. 5A through 5C show the situations of the lane change in a time series manner.

In FIG. 5A, the vehicle 906 travels in the lane L1. In FIG. 5B, when the occurrence of the lane change event EVT 2 has been detected, the second pattern PTN_2 is drawn. The second pattern PTN_2 is also irradiated to the road surface with a light intensity that is brighter than that of the low beam such that its end extends up to a portion within the adjacent traffic lane L2. This allows the following vehicle 907 traveling in the adjacent lane L2 to be notified of the intention to change lanes.

For example, the second pattern PTN_2 may be designed such that it includes multiple rectangular patterns arranged in the traveling direction and such that each rectangular pattern extends in the vehicle width direction. In an example shown in FIG. 5, as the distance in front of the user's vehicle 906 becomes longer, the rectangular pattern is drawn with a longer length in the vehicle width direction.

The occurrence of the lane change event EVT 2 may be detected based on the operation of a direction indicator (turning indicator). Alternatively, the occurrence of the lane change event EVT 2 may be detected based on a combination of the operation of the direction indicator and the actual steering. As shown in FIG. 5C, when judgment has been made that the lane change event EVT 2 has ended, the second pattern PTN_2 is turned off.

Example 3

In an example 3, a predetermined event EVT_3 is entry into an intersection. When the intersection entry event EVT_3 has occurred, a third pattern PTN_3 is drawn on the road surface. FIGS. 6A through 6C are diagrams for explaining the drawing of the third pattern (intersection entry notice pattern) PTN_3 according to the example 3. FIGS. 6A through 6C show the situations of the entry into the intersection in a time series manner. In this example, entry into a T-shaped intersection is shown.

In FIG. 6A, the vehicle 906 approaches an intersection CR. In FIG. 6B, when the occurrence of the intersection entry event EVT_3 has been detected, a third pattern PTN_3 is drawn. The third pattern PTN_3 is also irradiated to the road surface with a light intensity that is brighter than that of the low beam. The third pattern PTN_3 is drawn such that its front end extends up to a portion within the intersection CR. This allows the other vehicles 907 within the intersection to be notified of the intention to enter the intersection.

The occurrence of the intersection entry event EVT_3 may be judged based on information received by a car navigation system. Alternatively, the occurrence of the intersection entry event EVT_3 may be judged based on an image captured by a camera. As shown in FIG. 6C, when the end of the intersection entry event EVT_3 has been judged, the third pattern PTN_3 is turned off. As a condition for judgment of the end of the event EVT_3, a condition in which the user's vehicle actually starts to turn right (turn left) may be employed. Also, as a condition for judgment of the end of the event EVT_3, a condition in which the user's vehicle travels in a state in which the steering wheel is turned to the right (or left) may be employed.

Example 4

Figure 7A:
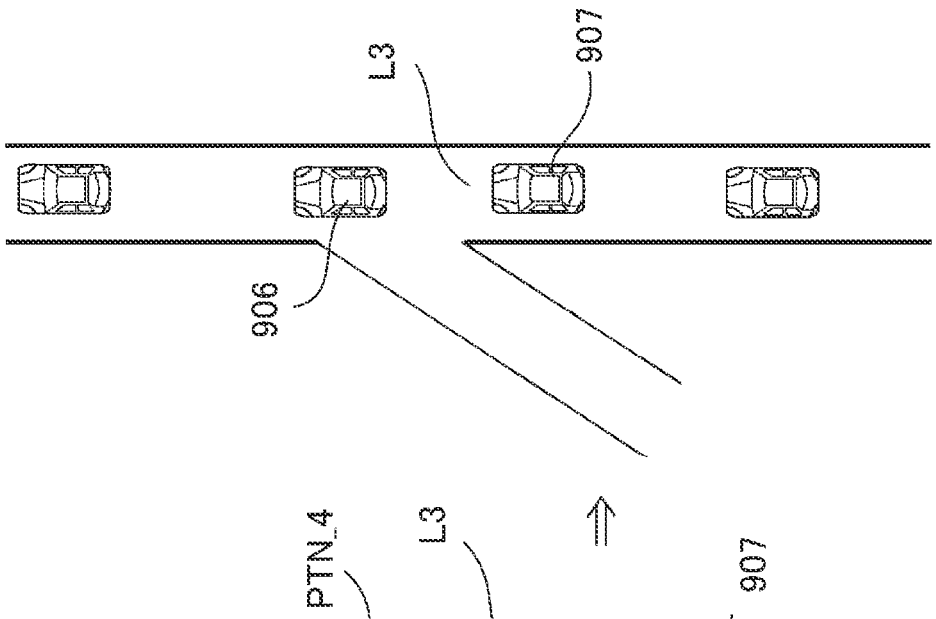
FIGS. 7A through 7C are diagrams for explaining the drawing of a fourth pattern according to one embodiment 4.
Figure 7B:
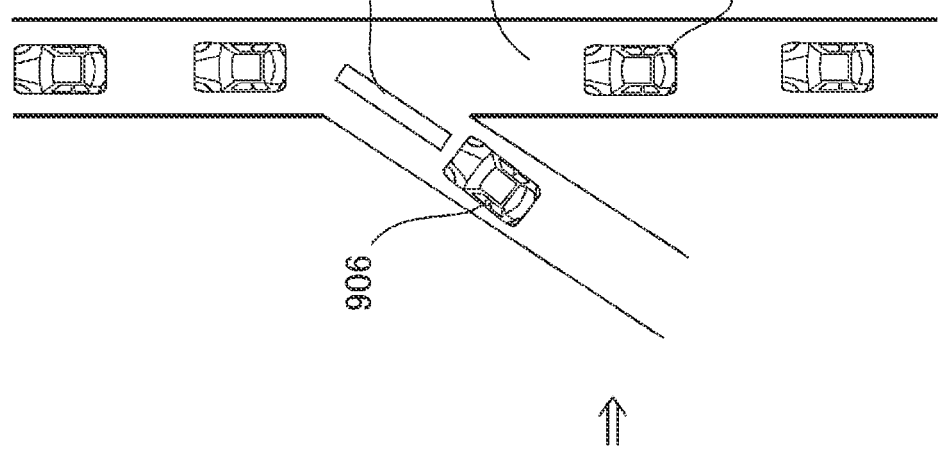
Figure 7C:
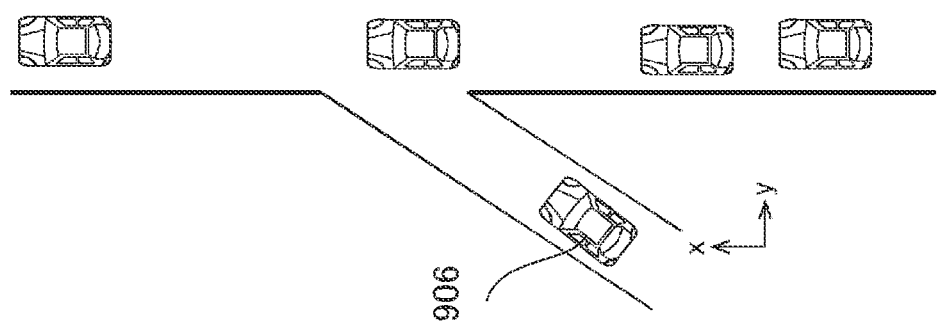

In an example 4, a predetermined event EVT_4 is merging in traffic congestion. When the merging event EVT_4 has occurred, a fourth pattern PTN_4 is drawn on the road surface. FIGS. 7A through 7C are diagrams for explaining the drawing of the fourth pattern (merging notice pattern) PTN_4 according to the example 4. FIGS. 7A through 7C show the situations of merging in traffic congestion in a time series manner.

In FIG. 7A, the vehicle 906 approaches a merging point. In FIG. 7B, when the occurrence of the merging event EVT_4 has been detected, a fourth pattern EVT_4 is drawn. The fourth pattern PTN_4 is also irradiated to the road surface with a light intensity that is brighter than that of the low beam. The fourth pattern PTN_4 is drawn such that its front end extends up to the merging point within the lane L3. This allows the other vehicles 907 in the lane L3 to be notified of the intention to merge.

The occurrence of the merging event EVT_4 may be judged based on information received from a car navigation system. Alternatively, the occurrence of the merging event EVT_4 may be judged based on an image captured by a camera. As shown in FIG. 7C, when the merging ends, judgment is made that the event EVT_4 has ended. In this stage, the fourth pattern PTN_4 is turned off.

Example 5

In an example 5, a predetermined event EVT_5 is "deviation from a lane". When the lane deviation event EVT_5 has occurred, a fifth pattern PTN_5 is drawn on the road surface. FIGS. 8A through 8C are diagrams for explaining the drawing of the fifth pattern (lane deviation warning pattern) PTN_5 according to the example 5. FIGS. 8A through 8C show the situations of the lane deviation in a time series manner.

In FIG. 8A, the vehicle 906 travels in the lane L1. In FIG. 8B, when a predictor of lane deviation has been detected, a fifth pattern PTN_5 is drawn. As a condition for the detection of lane deviation, a condition in which the user's vehicle 906 moves toward the adjacent lane in a state in which the operation of the direction indicator has not been detected may be employed. The movement of the user's vehicle 906 may be detected based on an image captured by a camera.

The fifth pattern PTN_5 is also irradiated to the road surface with a light intensity that is brighter than that of the low beam. The fifth pattern PTN_5 may indicate the vehicle width of the user's vehicle 906. The fifth pattern PTN_5 may be drawn with blinking. This allows the driver of the user's vehicle 906 to be warned.

As shown in FIG. 8C, when the user's vehicle comes to no longer have the potential for lane deviation, judgment is made that the event EVT_5 has ended. In this stage, the fifth pattern PTN_5 is turned off.

Example 6

In an example 6, a predetermined event EVT_6 is approaching the leading vehicle. When the approach event EVT_6 has occurred, a sixth pattern PTN_6 is drawn on the road surface. FIGS. 9A through 9D are diagrams for explaining the drawing of the sixth pattern (approach warning pattern) PTN_6 according to the example 6. FIGS. 9A through 9C show the situations of the approach in a time series manner. In actuality, the vehicle 906 and the leading vehicle 907 are traveling. However, for simplification of description, the leading vehicle 907 is shown at the same position.

In FIG. 9A, the leading vehicle 907 travels in front of the vehicle 906. However, the distance between them is sufficiently large. In FIG. 9B, when the distance between the leading vehicle 907 and the user's vehicle 906 becomes smaller than a predetermined value, the sixth pattern PTN_6 is drawn. This allows the driver of the user's vehicle 906 to be warned. The sixth pattern PTN_6 is preferably drawn with blinking. As a condition for judgment of the approach event EVT_6, a condition in which the distance between the vehicles is equal to or smaller than a predetermined value, and the speed difference between the user's vehicle and the leading vehicle is equal to or larger than a predetermined value, may be employed.

The sixth pattern PTN6 may be changed according to the distance between the vehicles. As shown in FIG. 9C, as the distance between the vehicles becomes further shortened, the sixth pattern PTN6 may be blinked. This allows the driver of the user's vehicle 906 to be provided with a stronger warning.

As shown in FIG. 9D, when the distance between the vehicles becomes larger than a predetermined value due to the deceleration of the user's vehicle 906 or the like, judgment is made that the approach event EVT_6 has ended. In this stage, the sixth pattern PTN_6 is turned off.

Example 7

In an example 7, a predetermined event EVT_7 is a deviation from the minimum legal speed. When the vehicle speed deviation event EVT_7 has occurred, a seventh pattern PTN_7 is drawn on the road surface. FIG. 10A through 10C are diagrams for explaining the drawing of the seventh pattern (vehicle speed deviation warning pattern) PTN_7 according to the example 7. FIGS. 10A through 10C show the situations of the vehicle speed deviation in a time series manner.

Description will be made assuming that the minimum legal speed is 80 km/h. In FIG. 10A, the vehicle 906 travels at a vehicle speed of 80 km/h. In this stage, the seventh pattern PTN_7 is turned off.

In FIG. 10B, the vehicle speed of the user's vehicle 906 decreases to 60 km/h or less. When the difference between the vehicle speed and the minimum legal speed exceeds a predetermined allowed value (e.g., 20 km), the seventh pattern PTN_7 is drawn. This allows the driver to be warned even if the driver has not noticed the deceleration of the user's vehicle. The seventh pattern PTN_7 may be designed to have a shape or to provide an animation so as to prompt the driver to accelerate. Also, the seventh pattern PTN_7 may be designed to have a shape that indicates an uphill slope so as to indirectly prompt the driver to accelerate.

In FIG. 10C, when the difference between the vehicle speed of the vehicle 906 and the minimum legal speed becomes smaller than an allowable value, the seventh pattern PTN_7 is turned off. Description has been made in this example configured to handle the deviation from the minimum legal speed. Also, the same operation may be made for handling deviation from the maximum legal speed (speed limit). In this case, the seventh pattern PTN_7 may be designed to have a shape or to provide an animation so as to prompt the driver to decelerate.

Example 8

Figure 11:
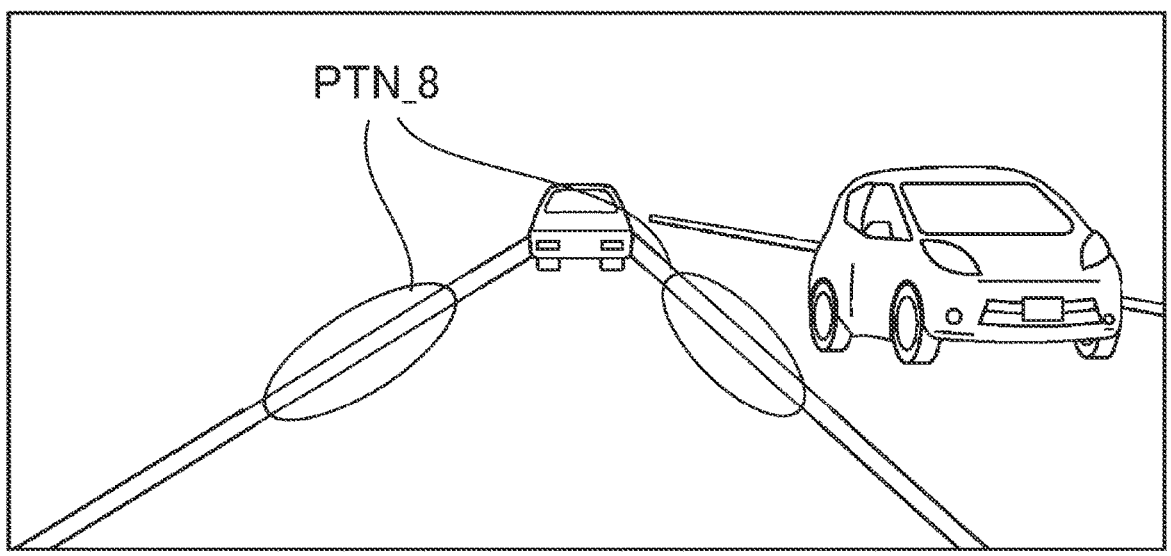
FIG. 11 is a diagram for explaining the irradiation of a pattern in bad weather conditions.

The variable light distribution lamp 110 may be used to highlight and irradiate the white line or the road shoulder in bad weather conditions such as rain or snowfall. FIG. 11 is a diagram for explaining the irradiation of a pattern PTN_8 to be used in bad weather conditions. This provides improved visibility.

Next, description will be made regarding a configuration example of the lamp system 100. FIGS. 12A and 12B are diagrams each showing a configuration example of the lamp system 100. FIG. 12A shows an example in which the variable light distribution lamp 110 is built into a headlamp 300A together with the low-beam lamp 102 and the high-beam lamp 104.

FIG. 12B shows an example in which the variable light distribution lamp 110 is built into a lamp 300B that is independent of the headlamp 230. The lamp 300B is attached to a bumper 240 arranged on a front side of the vehicle 200, for example.

FIGS. 13A and 13B are diagrams each showing a configuration example of a control system of a lamp system. The variable light distribution lamp 110 includes a DMD 112, a driver 114 for the DMD 112, and a projector lens 116. FIG. 13A shows an example in which the light distribution pattern to be provided by the variable light distribution lamp 110 is generated by an ECU 250 arranged on the vehicle side configured as an external component of the lamp 300A (300B). Accordingly, in this example, the functions of the light distribution controller 130 shown in FIG. 1 are supported by the ECU 250.

FIG. 13B shows an example in which the lamp 300A (300B) is provided with a lamp ECU 310. The function of the light distribution controller 130 is supported by the lamp ECU 310. The lamp ECU 310 controls the variable light distribution lamp 110 in cooperation with the ECU 220.

Description will be made regarding modifications relating to the first embodiment.

Modification 1

Figure 14A:
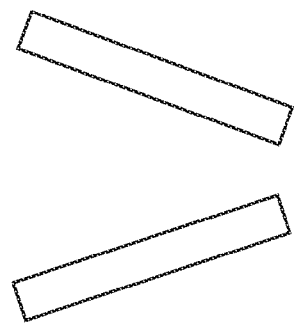
FIGS. 14A through 14F are diagrams each showing a modification of the pattern.
Figure 14B:
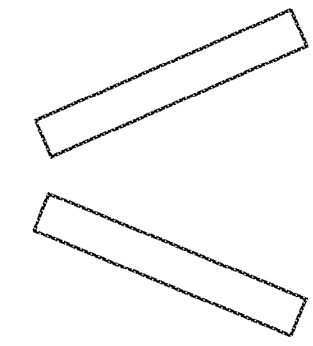
Figure 14C:
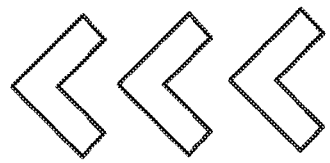
Figure 14D:
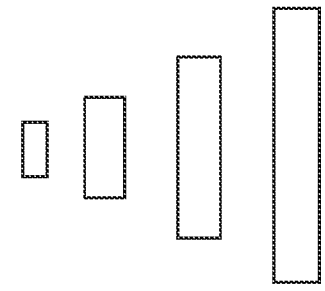
Figure 14E:
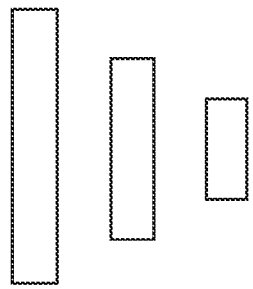
Figure 14F:
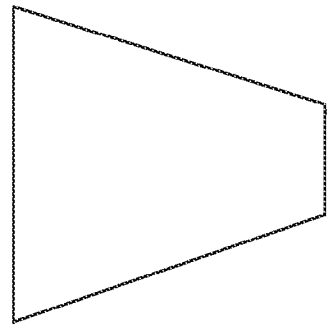

FIGS. 14A through 14F are diagrams each showing a modification of the pattern PTN_#. As shown in FIG. 14A, multiple figures that form the pattern PTN_# are not restricted to rectangles. Also, the pattern PTN_# may be designed to have other figures such as arrows, triangles, circles, etc. As shown in FIG. 14B, the PTN_# may be designed to have a pattern of two inwardly inclined lines. Also, as shown in FIG. 14C, the PTN_# may be designed to have a pattern of two outwardly inclined lines. Also, as shown in FIG. 14D, the PTN_# may be designed to be a trapezoid. Also, as shown in FIG. 14E or 14F, the PTN_# may be designed to have a combination of multiple figures with different lengths.

Modification 2

Figure 15A:
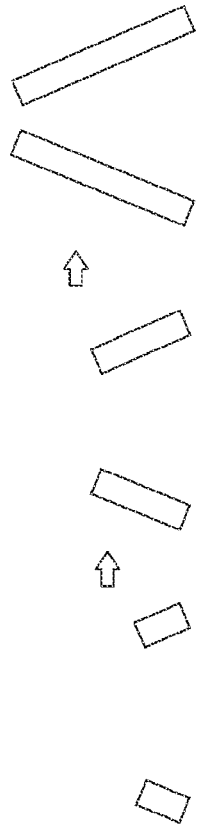
FIGS. 15A through 15D are diagrams for explaining an animated display of the pattern.
Figure 15B:
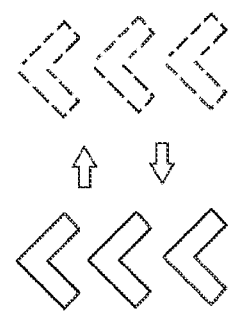
Figure 15C:
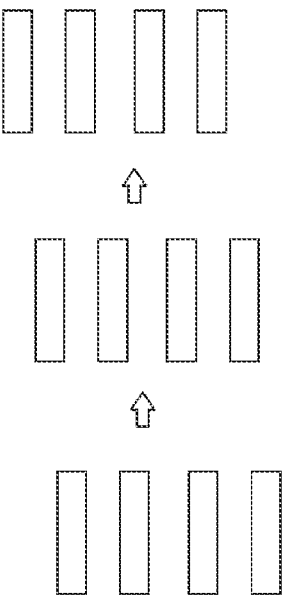
Figure 15D:
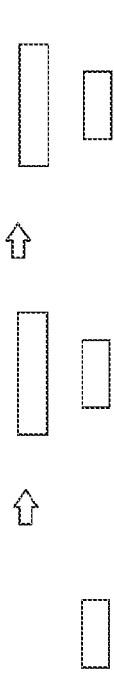

The variable light distribution lamp 110 may draw the pattern PTN_# in an animated manner. FIGS. 15A through 15D are diagrams for explaining the drawing of the pattern PTN_# in an animated display manner. As shown in FIG. 15A, the pattern PTN_# may be displayed with blinking. As shown in FIG. 15B, figure components of the pattern PTN_# may be extended (or shortened) with time. Also, as shown in FIG. 15C, the figure components of the pattern PTN_# may be sequentially turned on. Also, as shown in FIG. 15D, the figure components of the pattern PTN_# may be moved like a horizontal escalator.

Modification 3

The variable light distribution lamp 110 may be built into each of the left and right headlamps 200A. Alternatively, the variable light distribution lamp 110 may be built into the left and right lamps 300B. In this case, the left and right variable right distribution lamps 110 may be configured to provide different irradiation areas. For example, one variable light distribution lamp 110 may irradiate half of the irradiation area 904 shown in FIG. 1. Also, the other variable light distribution lamp 110 may irradiate the other half of the irradiation area 904 shown in FIG. 1.

Modification 4

Description has been made in the embodiment 1 regarding an arrangement in which the variable light distribution lamp 110 is configured as an additional light source with respect to the low-beam lamp 102 and the high-beam lamp 104. Also, the variable light distribution lamp 110 may integrally support a function of at least one from among the low-beam lamp 102 and the high-beam lamp 104.

Second Embodiment

Figure 16:
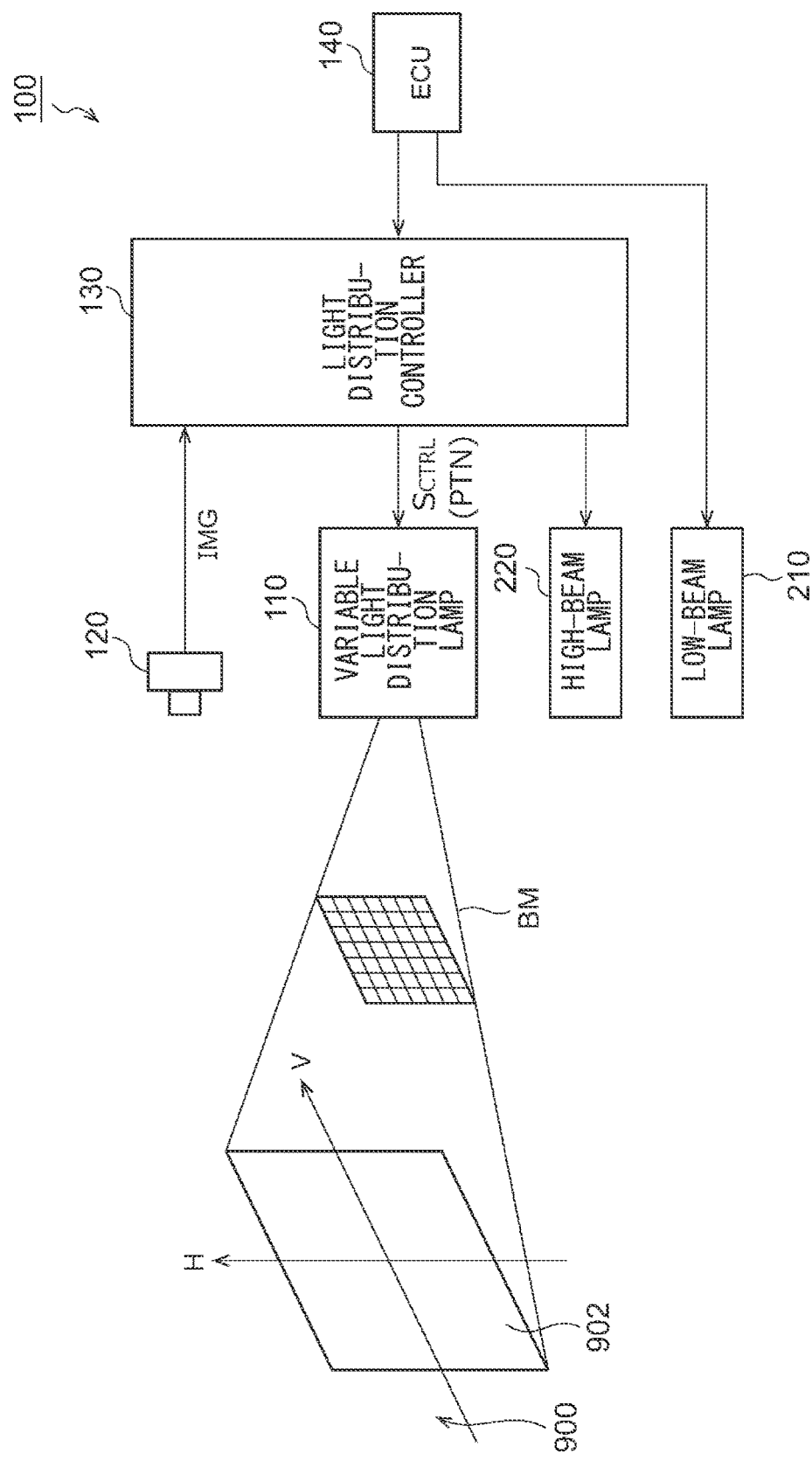
FIG. 16 is a block diagram showing a lamp system (or automotive lamp) according to one embodiment 2.

FIG. 16 is a block diagram showing a lamp system (or automotive lamp) 100 according to one embodiment 2. The lamp system 100 includes a variable light distribution lamp 110, a camera 120, a light distribution controller 130, a low-beam lamp 210, and a high-beam lamp 220. All the components may be built into the same housing. Also, several components may be provided as external components of the housing, i.e., may be provided on the vehicle side.

In the present embodiment, the variable light distribution lamp 110 is provided as an additional component separately from the low-beam lamp 210 and the high-beam lamp 220. Accordingly, the variable light distribution lamp 110 may be referred to as an "additional beam lamp".

The variable light distribution lamp 110 includes a white light source. The variable light distribution lamp 110 is configured to receive a control signal $S_{CTRL}$ that indicates a light distribution pattern PTN from the light distribution controller 130, to emit a beam BM having an intensity distribution that corresponds to the control signal $S_{CTRL}$, and to form a luminance distribution (irradiation pattern) in front of the vehicle. The configuration of the variable light distribution lamp 110 is not restricted in particular. For example, the variable light distribution lamp 110 may include a semiconductor light source such as a laser diode (LD), light-emitting diode (LED), or the like, and a lighting circuit configured to drive the semiconductor light source to emit light. The variable light distribution lamp 110 may include a matrix-type pattern-forming device such as a digital mirror device (DMD), liquid crystal device, or the like. Alternatively, the variable light distribution lamp 110 may be configured as a light-emitting element array (which will also be referred to as a "μ-LED").

The irradiation area to be provided by the variable light distribution lamp 110 is determined so as to cover at least the face (head portion) of a pedestrian and the road surface. Accordingly, with the present embodiment, the irradiation area supported by the variable light distribution lamp 110 overlaps a part of the high-beam irradiation area and a part of the low-beam irradiation area.

The camera 120 captures an image of a region in front of the vehicle. The light distribution controller 130 dynamically and adaptively controls the light distribution pattern PTN to be supplied to the variable light distribution lamp 110 based on the image (which will be referred to as a "camera image IMG" hereafter) captured by the camera 120. The light distribution pattern PTN determines the two-dimensional luminance distribution of the white-light irradiation pattern 902 formed on a virtual vertical screen 900 in front of the user's vehicle. The light distribution controller 130 may be configured as a digital processor. For example, the light distribution controller 130 may be configured as a microcontroller including a CPU and a software program. Also, the light distribution controller 130 may be configured as a field programmable gate array (FPGA), application specified IC (ASIC), or the like.

The high-beam lamp 220 may be configured to provide a variable light distribution as with the variable light distribution lamp 110. In this case, the light distribution controller 130 may control the light distribution to be provided by the high-beam lamp 220 based on the camera image IMG. An electronic control unit (ECU) 140 integrally controls the lamp system 100. Specifically, the ECU 140 generates on/off instructions etc., for the low-beam lamp 210, the high-beam lamp 220, and the variable light distribution lamp 110. Furthermore, the ECU 140 transmits information necessary for the light distribution control.

The light distribution controller 130 processes the camera image IMG so as to detect a pedestrian. Furthermore, the light distribution controller 130 temporarily changes the light intensity for a part of the beam BM irradiated to the face of the pedestrian. In the present specification, this operation will be referred to as "personal flashing").

Also, upon detecting a pedestrian, the light distribution controller 130 may draw a predetermined pattern on the road surface. The pattern may be designed such that it extends toward the pedestrian from the vehicle mounting the lamp system. The drawing of the pattern to the road surface is enabled only when a predetermined condition is satisfied.

For example, a parameter of such a predetermined condition may be defined giving consideration to the vehicle speed. That is to say, when the vehicle speed is higher than a predetermined threshold value (e.g., 30 km/h), such a situation has a high potential to involve heavy damage if a collision occurs. Accordingly, the road drawing is provided as an additional function so as to prompt the driver to drive with a higher level of caution.

Alternatively, a parameter of such a predetermined condition may be defined giving consideration to the distance between the vehicle and the pedestrian. That is to say, when the distance is shorter than a predetermined threshold value, such a situation has a high potential to involve heavy damage if a collision occurs.

Accordingly, the road drawing is provided as an additional function so as to prompt the driver to drive with a higher level of caution.

Also, as a predetermined condition, whether or not a pedestrian is included in a predetermined region with the user's vehicle as a start point may be employed.

Such a predetermined condition may be defined giving consideration to a combination of such situations as described above.

That is to say, the risk level is evaluated based on predetermined criteria. When the risk level is relatively high, the road surface drawing is enabled. Conversely, when the risk level is relatively low, the road surface drawing is disabled.

The above is the basic configuration of the lamp system 100. Next, description will be made regarding the operation thereof.

Figure 17:
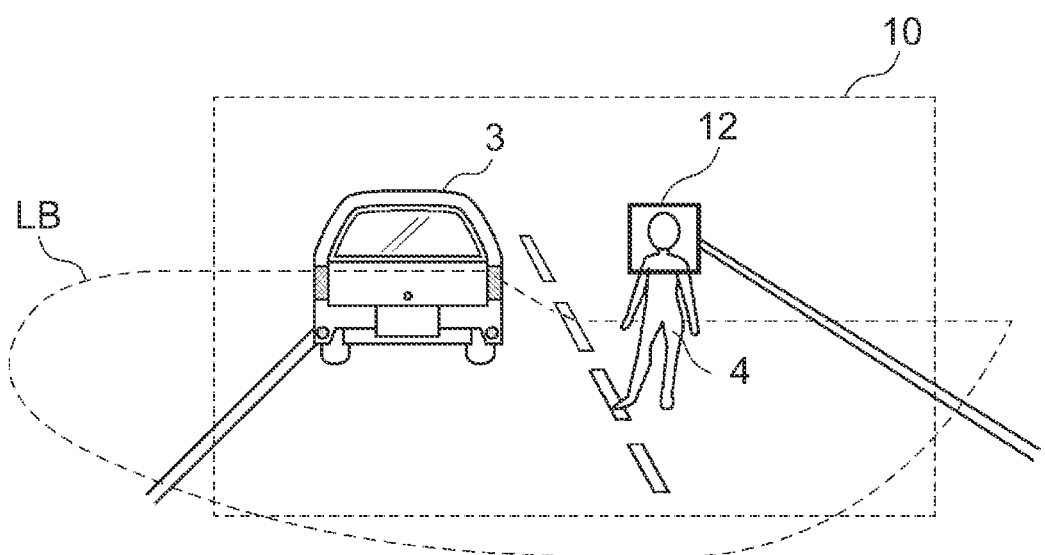
FIG. 17 is a diagram for explaining personal flashing supported by the lamp system shown in FIG. 16.

FIG. 17 is a diagram for explaining a personal flashing operation of the lamp system 100 shown in FIG. 16. In the vehicle traveling situation shown in FIG. 17, a leading vehicle 3 and a pedestrian 4 are present. The vehicle is traveling in a low-beam mode. A region LB that is lower than a cutoff line is illuminated by the low-beam lamp.

The broken line 10 indicates an area to which the beam BM can be irradiated by the variable light distribution lamp 110. In this case, upon detecting the pedestrian 4, the light distribution controller 130 temporarily illuminates a part 12 including the head portion (face) of the pedestrian. In this situation, the other portions are not illuminated by the variable light distribution lamp 110. Such temporary irradiation may be repeated.

With such personal flashing, this arrangement is capable of providing flashing to only the head portion 12 of the pedestrian 4, thereby allowing the pedestrian 4 to notice the presence of the user's vehicle. This prompts the pedestrian 4 to perform avoidance behaviors. Furthermore, this provides a flashing effect to such a local portion 12 in front of the user's vehicle, thereby allowing the driver of the user's vehicle to be warned. This allows the driver to notice the presence of the pedestrian 6.

The frequency of the personal flashing beam may be dynamically changed according to the vehicle traveling situation.

The light distribution controller 130 may adjust the beam intensity such that the light intensity with which the face portion 12 is illuminated approaches a constant value. That is to say, as the distance up to the pedestrian becomes smaller, the beam intensity may be lowered. Conversely, as the distance up to the pedestrian becomes larger, the beam intensity may be raised. This allows the pedestrian to notice the presence of the user's vehicle over a larger distance. Furthermore, this allows glare imparted to the pedestrian to be reduced even if the distance between the user's vehicle and the pedestrian is small.

Figure 18:
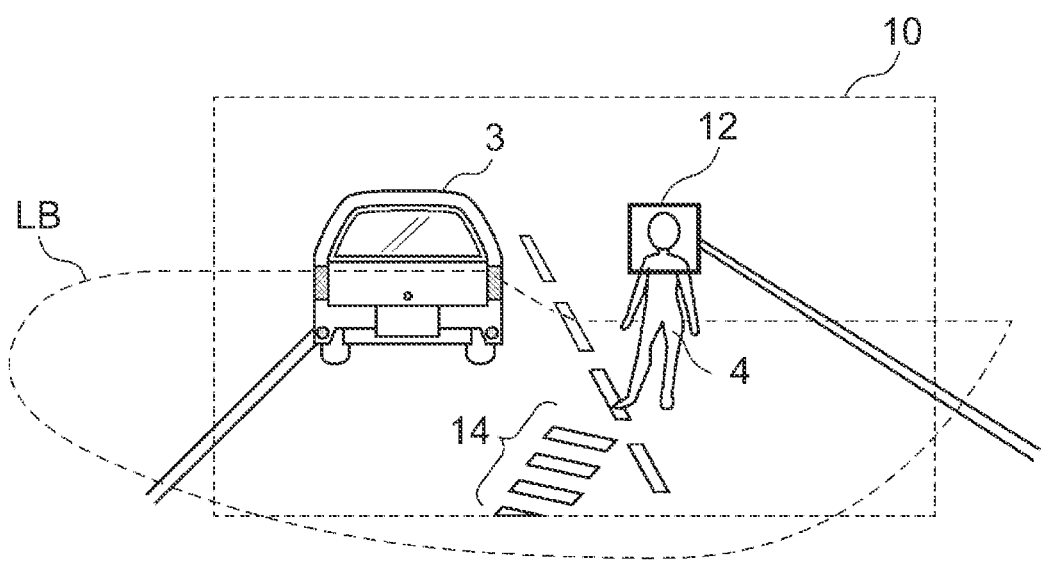
FIG. 18 is a diagram for explaining the road surface drawing supported by the lamp system shown in FIG. 16.

FIG. 18 is a diagram for explaining the road surface drawing operation of the lamp system 100 shown in FIG. 16. When the above-described predetermined condition has been satisfied, the variable light distribution lamp 110 draws the predetermined pattern 14 on the road surface. In this example, the pattern 14 is designed as multiple bar patterns arranged in a direction extending from the user's vehicle to the pedestrian 4. The shape of the pattern 14 is not restricted in particular. Also, an arrow extending toward the pedestrian 4 may be employed. Also, other kinds of shapes may be employed. The pattern 14 may be drawn such that it moves on the road surface like an escalator. Also, the pattern 14 may be drawn with flashing in the same manner as that for the face portion 12.

By providing the road surface drawing as an additional function, when the pedestrian 4 walks while looking down at the ground, the pedestrian 4 is able to notice the pattern 14 drawn on the road surface, thereby allowing the pedestrian 4 to notice the presence of the vehicle 2. Furthermore, the directionality of the pattern 14 allows the pedestrian 4 to intuitively perceive the direction in which the vehicle 2 is located.

Figure 19D:
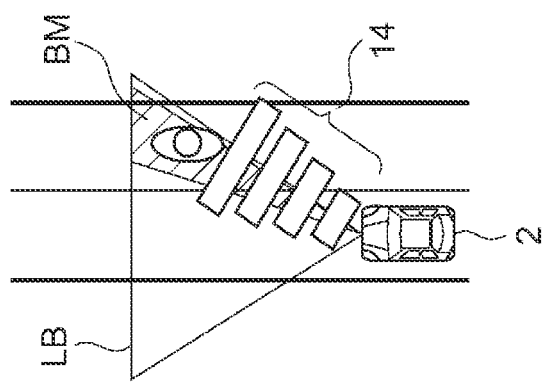
FIGS. 19A through 19D are diagrams for explaining an operation of the lamp system shown in FIG. 16 in a time series manner.
Figure 19C:
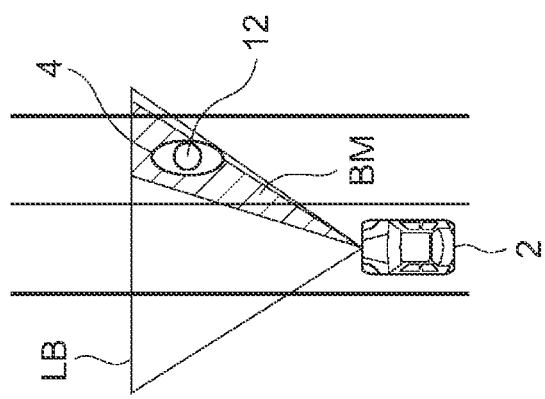
Figure 19B:
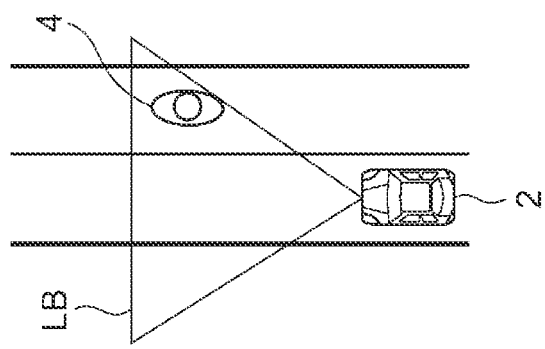
Figure 19A:
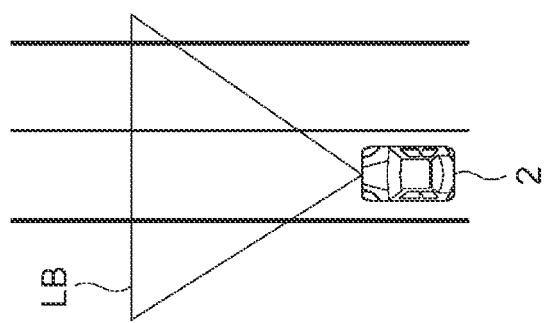

FIGS. 19A through 19D are diagrams for explaining the operation of the lamp system 100 shown in FIG. 16 in a time series manner. In FIG. 19, there is no pedestrian in front of the user's vehicle 2. In this situation, the user's vehicle 2 travels with only an ordinary low beam LB (or high beam). In FIG. 19B, the pedestrian 4 is detected in front of the vehicle. Upon detecting the pedestrian 4, a flashing beam BM is irradiated to the face portion 12 of the pedestrian 4 as shown in FIG. 19C. When the pedestrian remains in an oncoming lane without stopping as shown in FIG. 19D, the pattern 14 is drawn as an additional function. This allows the pedestrian 4 to be further warned.

Figure 20:
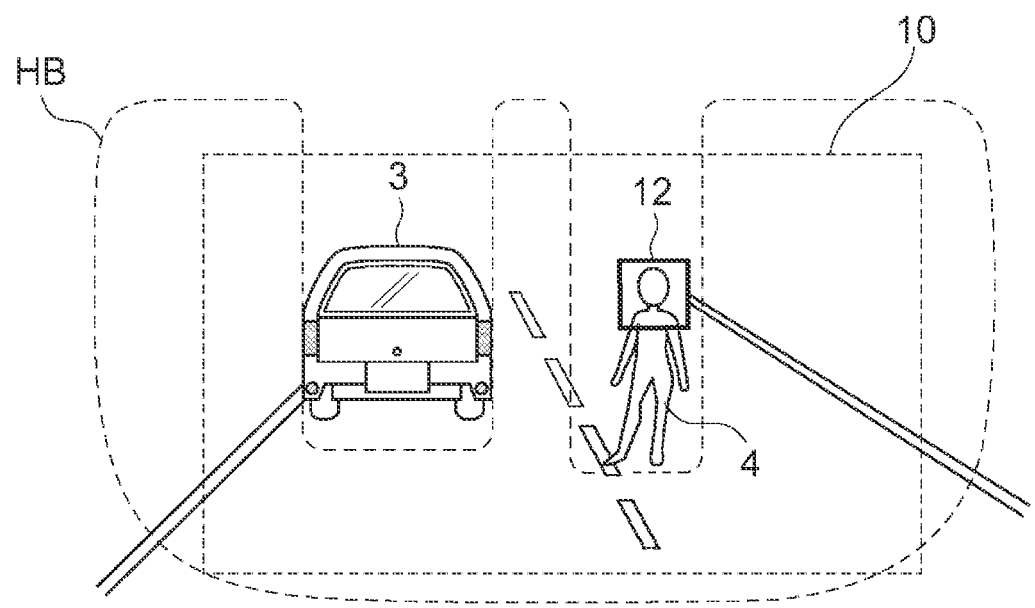
FIG. 20 is a diagram for explaining the personal flashing provided in another traveling situation.

FIG. 20 is a diagram for explaining a personal flashing operation in another traveling situation. FIG. 20 shows a traveling situation in which the vehicle travels in a high-beam mode with an ADB function. An ADB high beam HB is irradiated such that the portions of the pedestrian 4 and the leading vehicle 3 are masked. The beam BM of the variable light distribution lamp 110 is irradiated to the face portion 12 of the pedestrian 4.

Figure 21:
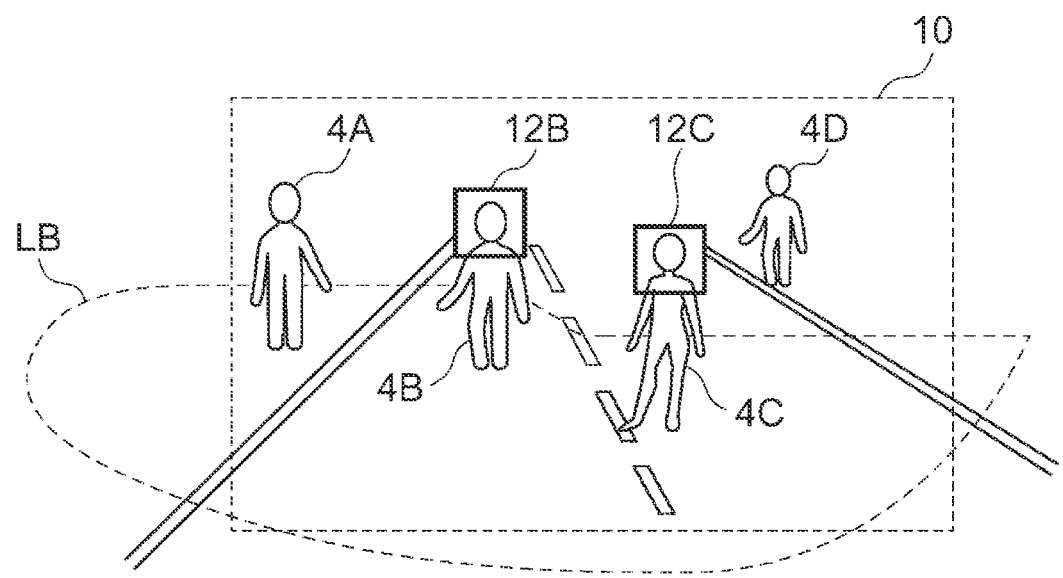
FIG. 21 is a diagram for explaining the personal flashing provided in yet another traveling situation.

FIG. 21 is a diagram for explaining a personal flashing operation in yet another traveling situation. In this situation, multiple pedestrians 4A through 4D are detected. In a case in which the personal flashing is performed for all the pedestrians 4A through 4D, in actuality, such an operation has the potential to confuse the driver. In order to solve such a problem, the light distribution controller 130 selects a predetermined number of people (two, in this example), pedestrians 4B and 4D, judged to have the largest risk as the personal flashing targets. That is to say, the face portions 12B and 12C of the pedestrian 4B and 4C are illuminated with flashing.

Next, description will be made regarding a configuration example of the lamp system 100. FIGS. 22A and 22B are diagrams each showing a configuration example of the lamp system 100. FIG. 22A shows an example in which the variable light distribution lamp 110 is built into the headlamp 200 together with the low-beam lamp 210 and the high-beam lamp 220.

FIG. 22B shows an example in which the variable light distribution lamp 110 is built into a lamp 300 configured independently of the headlamp 200. The lamp 300 is mounted on a bumper 302 arranged on a front side of the vehicle, for example.

FIGS. 23A and 23B are diagrams each showing an example configuration of a control system of a lamp system. FIG. 23A shows an example in which the camera 120 is provided as an external component of the lamp 200 (or 300). The light distribution pattern to be provided by the variable light distribution lamp 110 is generated by the ECU 310 arranged on the vehicle side as an external component of the lamp 200. Accordingly, in this example, the function of the light distribution controller 130 shown in FIG. 16 is supported by the ECU 310. The ECU 310 controls the beam BM to be emitted by the variable light distribution lamp 110 based on the image captured by the camera, vehicle information (vehicle speed and steering angle), distance measurement data, etc. The variable light distribution lamp 110 includes a DMD 112, a driver 114 for the DMD 112, and a projector lens 116.

FIG. 23B shows an example in which the camera 120 is built into the lamp 200. The functions of the light distribution controller 130 are supported by the ECU configured as a lamp-side component.

Modification 5

The left and right headlamps 200 or lamps 300 may each include such a variable light distribution lamp 110 as a built-in component. In this case, the left and right variable light distribution lamps 110 may provide substantially the same irradiation area. That is to say, the beams irradiated by the left and right variable light distribution lamps 110 may be superimposed.

Modification 6

The left and right headlamps 200 or lamps 300 may each include such a variable light distribution lamp 110 as a built-in component. In this case, the left and right variable light distribution lamps 110 may support different irradiation areas. For example, one variable light distribution lamp 110 may illuminate an upper-side region of the irradiation area 10 shown in FIG. 17. Also, the other variable light distribution lamp 110 may illuminate a lower-side region of the irradiation area 10 shown in FIG. 17.

Modification 7

Unlike the embodiment 2 described above, when the vehicle speed is smaller than a predetermined threshold value (e.g., 30 km/h), the road surface drawing may be performed. In this case, the road surface drawing provides information to a pedestrian for a long period of time. Accordingly, this allows the pedestrian to easily recognize the content of the characters or patterns drawn on the road surface.

Modification 8

Description has been made in the embodiment 2 regarding an example in which the variable light distribution lamp 110 is configured as an additional light source with respect to the low-beam lamp 210 and the high-beam lamp 220. Also, the function of at least one of the low-beam lamp 210 and the high-beam lamp 220 may be integrated in the variable light distribution lamp 110.

Third Embodiment

Embodiment 3-1

Figure 26:
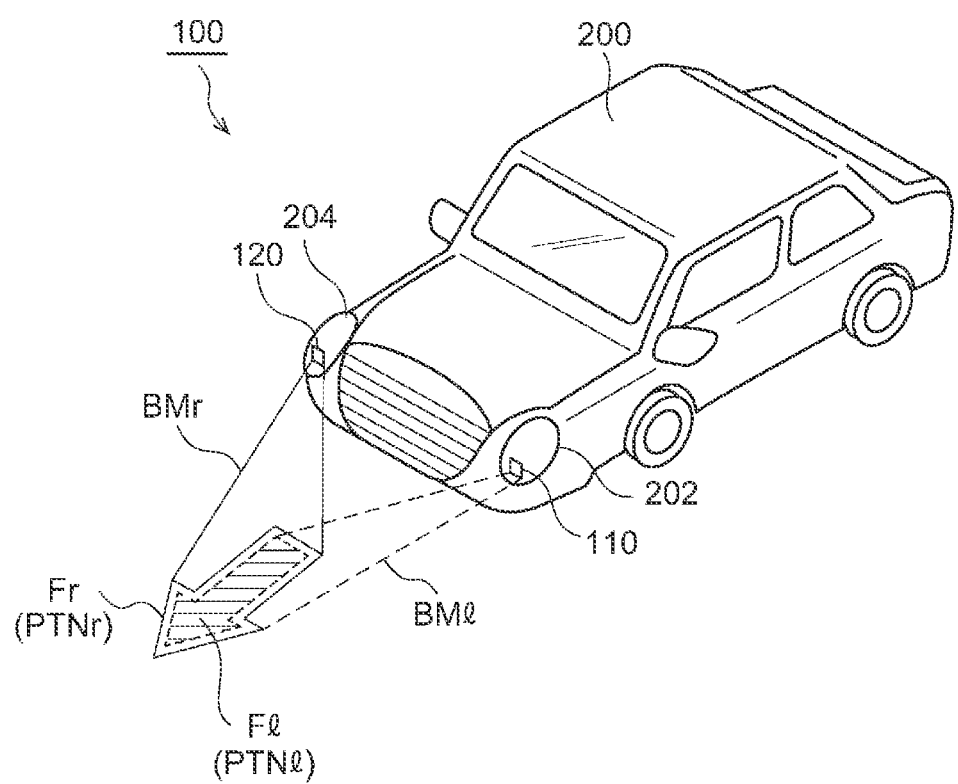
FIG. 26 is a block diagram showing a lamp system according to one embodiment 3-1.

FIG. 26 is a block diagram showing a lamp system 100 according to one embodiment 3-1. The lamp system 100 includes a first variable light distribution lamp 110 and a second variable light distribution lamp 120. The first variable light distribution lamp 110 is provided on the left-front side of the vehicle 200. The first variable light distribution lamp 110 irradiates a first beam BM1 with a variable light intensity distribution to the road surface, so as to draw a first pattern PTN1. The second variable light distribution lamp 120 is provided on the right-front side of the vehicle. The second variable light distribution lamp 120 irradiates a second beam BMr with a variable light intensity distribution to the road surface, so as to draw a second pattern PTNr. For example, the first variable light distribution lamp 110 and the second variable light distribution lamp 120 are built into a left headlamp 202 and a right headlamp 204, respectively. However, the present invention is not restricted to such an arrangement.

The first pattern PTN1 and the second pattern PTNr include a first figure Fl and a second figure Fr that overlap on the road surface. FIG. 26 shows an example in which the two figures Fl and Fr are each configured as an arrow. In a reference state, the first figure Fl and the second figure Rr are generated to have an intentional difference between them. The "reference state" is defined as a most typical state assumed in the design stage. For example, the "reference state" may be designed as an ideal state shown in FIG. 24 in which the vehicle travels with a pitching angle of zero on a perfectly flat road surface.

FIG. 26 shows an example in which one (Fl) from among the first figure Fl and the second figure Fr is generated as an inset with respect to the other figure (Fr). In other words, the second figure Fr is generated as an outset with respect to the first figure Fl.

The above is the configuration of the lamp system 100. Next, description will be made regarding several traveling situation examples.

Figure 27:
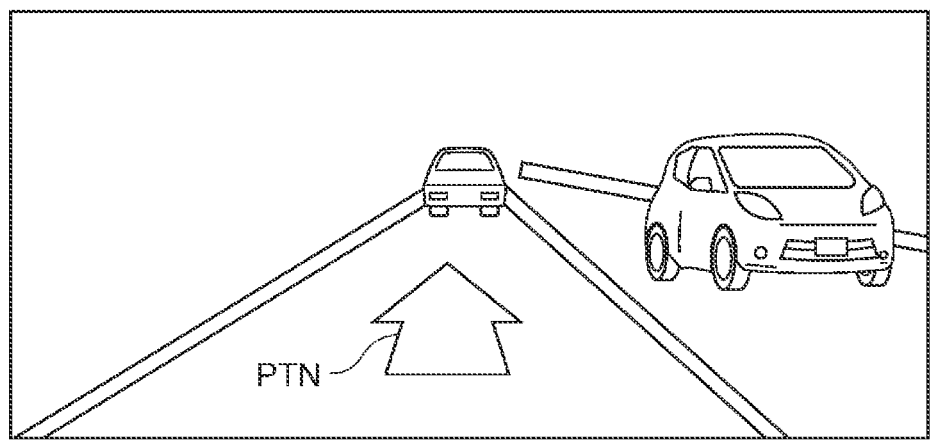
FIG. 27 is a diagram showing an example of a view as viewed from the driver's seat.

FIG. 27 is a diagram showing an example of the field of view from the driver's seat. The lamp system 100 draws an arrow pattern PTN on the road surface in front of the user's vehicle (not shown). For example, the arrow pattern is generated in cooperation with the car navigation system. This indicates a state in which the user's vehicle should go straight (or keep to the lane). The pattern PTN is drawn by superimposing the beams generated by the left and right variable light distribution lamps 110 and 120.

FIGS. 28A and 28B are diagrams for explaining the drawing operation of the lamp system 100 for the pattern PTN in the reference state. In this example, the figure is generated as a simple pattern, i.e., as a rectangular pattern. FIG. 28A is a diagram showing a road surface 900 as viewed from the side. FIG. 28B is a diagram showing the road surface 900 as viewed from above.

The first figure Fl and the second figure Fr are drawn such that they overlap on the road surface. The two figures are drawn such that there is a sufficient distance d between the outlines thereof. The distance d will be referred to as an inset amount (or outset amount). The inset amounts $d_1$ through $d_4$ may be designed to have the same value for all the sides of the figure, or may be designed to have different values.

FIGS. 29A and 29B are diagrams for explaining a drawing operation of the lamp system 100 for drawing the pattern PTN in a realistic state. FIG. 29A is a diagram showing the road surface 900 as viewed from the side. FIG. 29B is a diagram showing the road surface 900 as viewed from above. In such a realistic state, the road surface 900' has a slope as compared with the road surface 900 in the reference state. The slope leads to a change in the shape of each of the figures Fl' and Fr' shown in FIG. 29B with respect to the figures Fl and Fr shown in FIG. 29. Accordingly, the inset amounts $d_1'$ and $d_3'$ on the left side deviate from the original inset amounts $d_1$ and $d_3$ shown in FIG. 29 due to the change in the shapes. However, the deviation $\Delta d$ of the inset amount is sufficiently small with respect to the original inset amount d. Accordingly, in such a realistic state, the figures Fl' and Fr' are drawn such that there is a sufficiently large distance between the outlines thereof. This arrangement is capable of solving a double counter problem and a blurring problem as shown in FIG. 25.

In other words, the inset amount d to be designed in the reference state may preferably be determined so as to provide a sufficient inset amount d' in a realistic state. Giving consideration to the fact that the pitching angle of the vehicle has a larger effect than that of the slope of the road surface defined in the left-right direction, the inset amounts $d_2$ and $d_4$ (or offset amounts) defined in the front-rear direction (y direction) are preferably designed to have a larger value than the inset amounts $d_1$ and $d_3$ (or offset amounts) defined in the horizontal direction (x direction). For example, the inset amounts $d_2$ and $d_4$ (offset amounts) defined in the horizontal direction may be designed to be a value ranging between 5 cm and 50 cm. Also, the inset amounts $d_1$ and $d_3$ defined in the front-rear direction may be designed to be a value on the order of 10 cm to 3 m.

The change in the pitching angle leads to the occurrence of image distortion in the y direction, leading to a change in the inset amounts $d_2$ and $d_4$. However, there is a sufficiently large distance between the outlines of the figures Fl and Fr', thereby solving a double outline problem and a blurring problem.

Figure 30A:
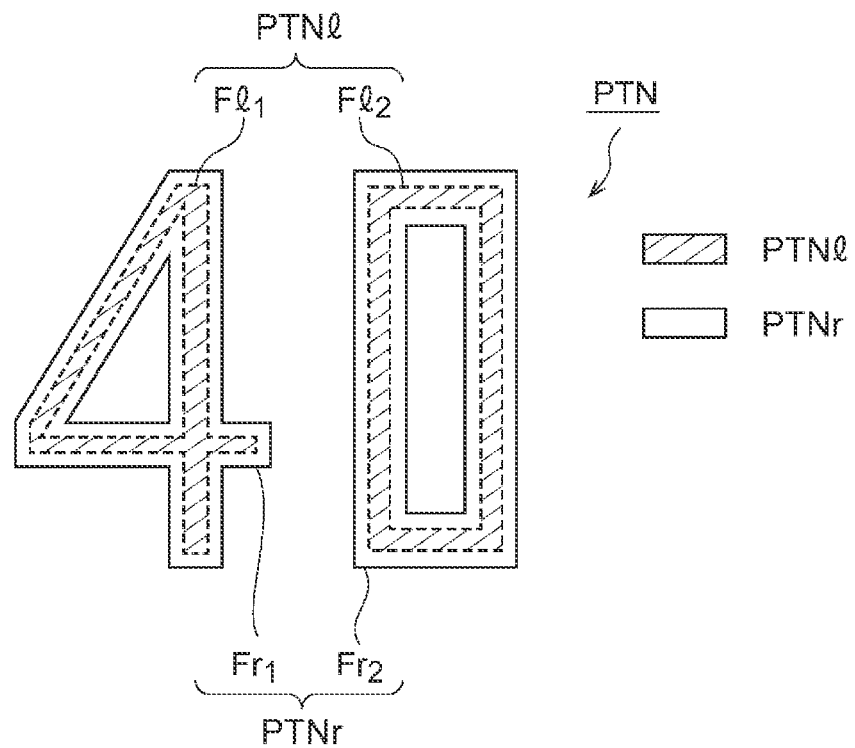
FIGS. 30A and 30B are diagrams for explaining a pattern including multiple figures.
Figure 30B:
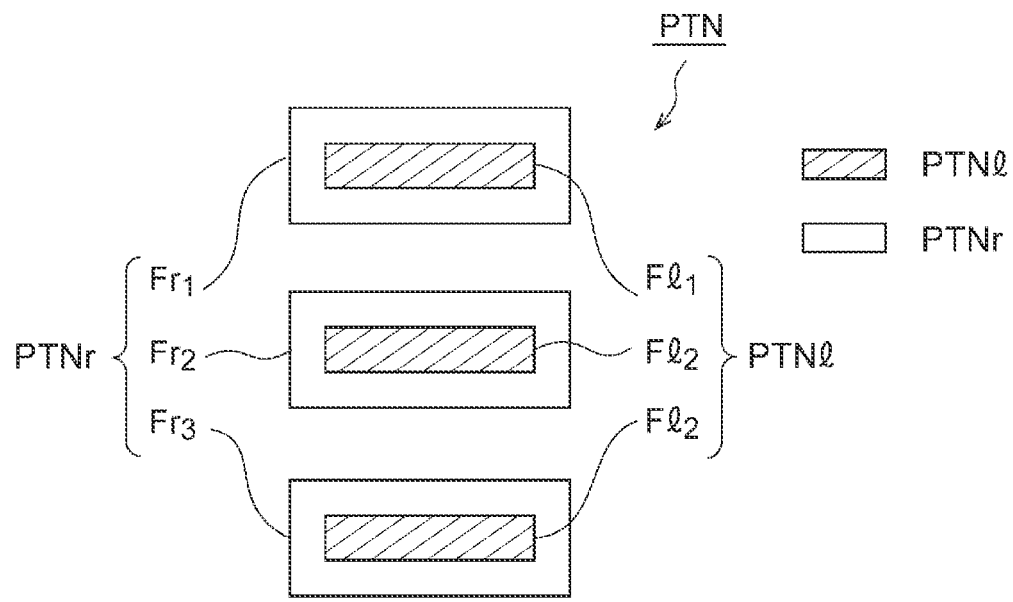

The pattern PTN may include multiple figures. FIGS. 30A and 30B are diagrams for explaining the pattern PTN including multiple figures. FIG. 30A shows an example in which the pattern PTN includes figures $F_1$ and $F_2$ that indicate multiple characters (numeric characters). The figure $F_1$ is designed as a numeric character "4". The figure $F_2$ is designed as a numeric character "0". The first pattern PTN1 includes figures $Fl_1$ and $Fl_2$. The second pattern PTNr includes figures $Fr_1$ and $Fr_2$. The figure $Fl_1$ is designed as an inset with respect to the figure $Fr_1$. The figure $Fl_2$ is designed as an inset with respect to the figure $Fr_2$.

FIG. 30B shows an example in which the pattern PTN includes multiple figures $F_1$ through $F_3$. The figures $F_1$ through $F_3$ are each designed as a rectangular pattern. The first pattern PTN1 includes figures $Fl_1$ through $Fl_3$. The second pattern PTNr includes figures $Fr_1$ through $Fr_3$. The figure $Fl_g$ ("#"="1", "2", "3") is designed as an inset with respect to the corresponding figure Fr #.

Embodiment 3-2

Description has been made in the embodiment 3-1 regarding an arrangement in which there is a difference in the shape (size) between the figures Fl and Fr included in the patterns drawn by the left and right beams. However, the present invention is not restricted to such an example. Description will be made in the embodiment 3-2 regarding an example in which there is a difference in the brightness level between the figures Fl and Fr generated by the left and the right beams. As a simplest configuration, an arrangement may be made in which there is a difference in the beam intensity between the first beam BM1 and the second beam BMr. This allows the lamp to have a simple configuration.

FIGS. 31A and 31B are diagrams for explaining the pattern drawing in the reference state according to the embodiment 3-2. FIG. 31A is a plan view of the pattern as viewed from above. FIG. 31B shows the illumination level distributions (luminance distributions) of the figures Fl and Fr and the figure obtained by overlapping Fl and Fr in this order from the top. For simplification of description, description will be made regarding an example in which the figures Fl and Fr each have a rectangular shape with substantially the same size.

As shown in FIG. 31A, the figures Fl and Fr are designed to have outlines matching each other in the reference state. Furthermore, as shown in the first stage and the second stage in FIG. 31B, the figure Fl is drawn by the left beam with a higher light intensity than that of the figure Fr drawn by the right beam. As shown in the lowest stage in FIG. 31B, the two beams are superimposed so as to raise the illumination level.

Figure 32A:
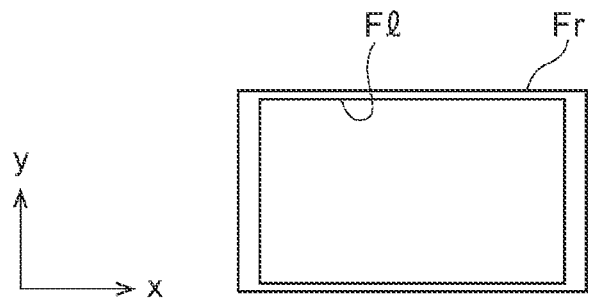
FIGS. 32A and 32B are diagrams for explaining the drawing of a pattern in a realistic state according to one embodiment 3-2.
Figure 32B:
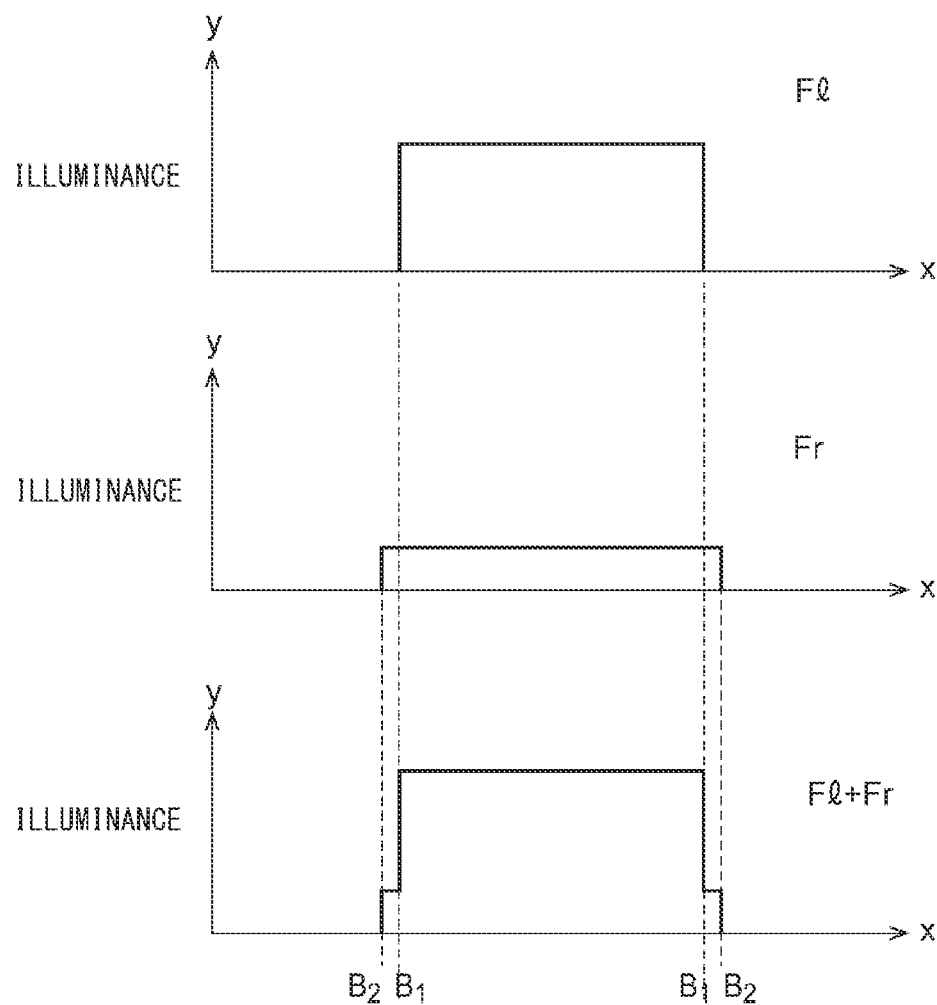

FIGS. 32A and 32B are diagrams for explaining the pattern drawing in a realistic state according to the embodiment 3-2. FIG. 32A is a plan view of the pattern as viewed from above. FIG. 32B shows the illumination level distributions (luminance distributions) of the figures Fl and Fr and the figure obtained by overlapping Fl and Fr in this order from the top.

As shown in FIG. 32A, in such a realistic state, the FIGS. Fl and Fr generated by the left and the right beams are distorted due to the slope of the road surface or the pitching of the vehicle body. The illumination level distribution obtained by superimposing the two beams is shown in the lowest stage in FIG. 31B.

The outline deviation between the two figures Fl and Fr leads to the occurrence of two boundaries B1 and B2. In a case in which the two beams are irradiated with the same light intensity, the difference in the illumination level between the outer outline and the inner outline becomes substantially zero. Accordingly, the two boundaries B1 and B2 are perceived by human vision as the same level, which is perceived as a double outline structure.

With the embodiment 3-2, there is a difference in the brightness level between the two figures. That is to say, the inner-side boundary B1 provides a high illumination difference (or contrast ratio), thereby emphasizing the boundary B1. Accordingly, the boundary B2 is perceived with a lower level by human vision, thereby solving a double outline problem.

Next, description will be made regarding a configuration example of the lamp system 100. FIGS. 33A and 33B are diagrams each showing a configuration example of the lamp system 100. FIG. 33A shows an example in which the variable light distribution lamp 110 (120) is built into the headlamp 202 (204) together with the low-beam lamp 210 and the high-beam lamp 220.

FIG. 33B shows an example in which the variable light distribution lamp 110 (120) is built into the lamp 230 (232) configured independently of the headlamp 202 (204). The lamp 230 (232) is attached to the bumper 240 arranged on a front side of the vehicle, for example.

FIGS. 34A and 34B are diagrams each showing an example configuration of a control system of a lamp system. In the lamp system 100A shown in FIG. 34A, the light distribution pattern to be provided by the variable light distribution lamp 110 (120) is generated by the ECU 310 arranged on the vehicle side as an external component of the lamp 300. The ECU 310 controls the beam BM to be emitted by the variable light distribution lamp 110 based on the image captured by the camera, vehicle information (vehicle speed and steering angle), distance measurement data, etc., so as to draw a pattern on the road surface. The variable light distribution lamp 110 includes a digital micromirror device (DMD) 112, a driver 114 for the DMD 112, and a projector lens 116.

In the lamp system 100B shown in FIG. 34B, the ECU 302 is provided on the lamp side. The ECU 302 controls the beam BM to be emitted by the variable light distribution lamp 110 based on the image captured by the camera, vehicle information (vehicle speed and steering angle), distance measurement data, etc., so as to draw a pattern on the road surface.

Description will be made regarding modifications relating to the third embodiment.

Description has been made in the embodiments 3-1 and 3-2 regarding an arrangement in which the variable light distribution lamp 110 is configured as an additional light source with respect to the low-beam lamp 210 and the high-beam lamp 220. Also, the function of at least one from among the low-beam lamp 210 and the high-beam lamp 220 may be integrated in the variable light distribution lamp 110.

Description has been made in the embodiment 3-1 regarding an arrangement in which there is a difference in the size between the two figures drawn by the left and right beams. Description has been made in the embodiment 3-2 regarding an arrangement in which there is a difference in the brightness level between the two figures. Also, an arrangement may be made as a combination thereof.

The difference between the first figure Fl drawn by one beam and the second figure Fr drawn by the other beam is not restricted to the size or brightness level. That is to say, other kinds of difference may be employed. For example, the first figure Fl and the second figure Fr may be drawn with the same size and the same brightness level at irradiation positions intentionally shifted from each other. Specifically, the first figure Fl and the second figure Fr may be drawn with offsets in the x direction (vehicle width direction) and the y direction (vehicle front-rear direction). The offset employed in this example can be understood as the inset described in the embodiment 3-1, thereby solving the double outline problem.

Fourth Embodiment

Figure 35:
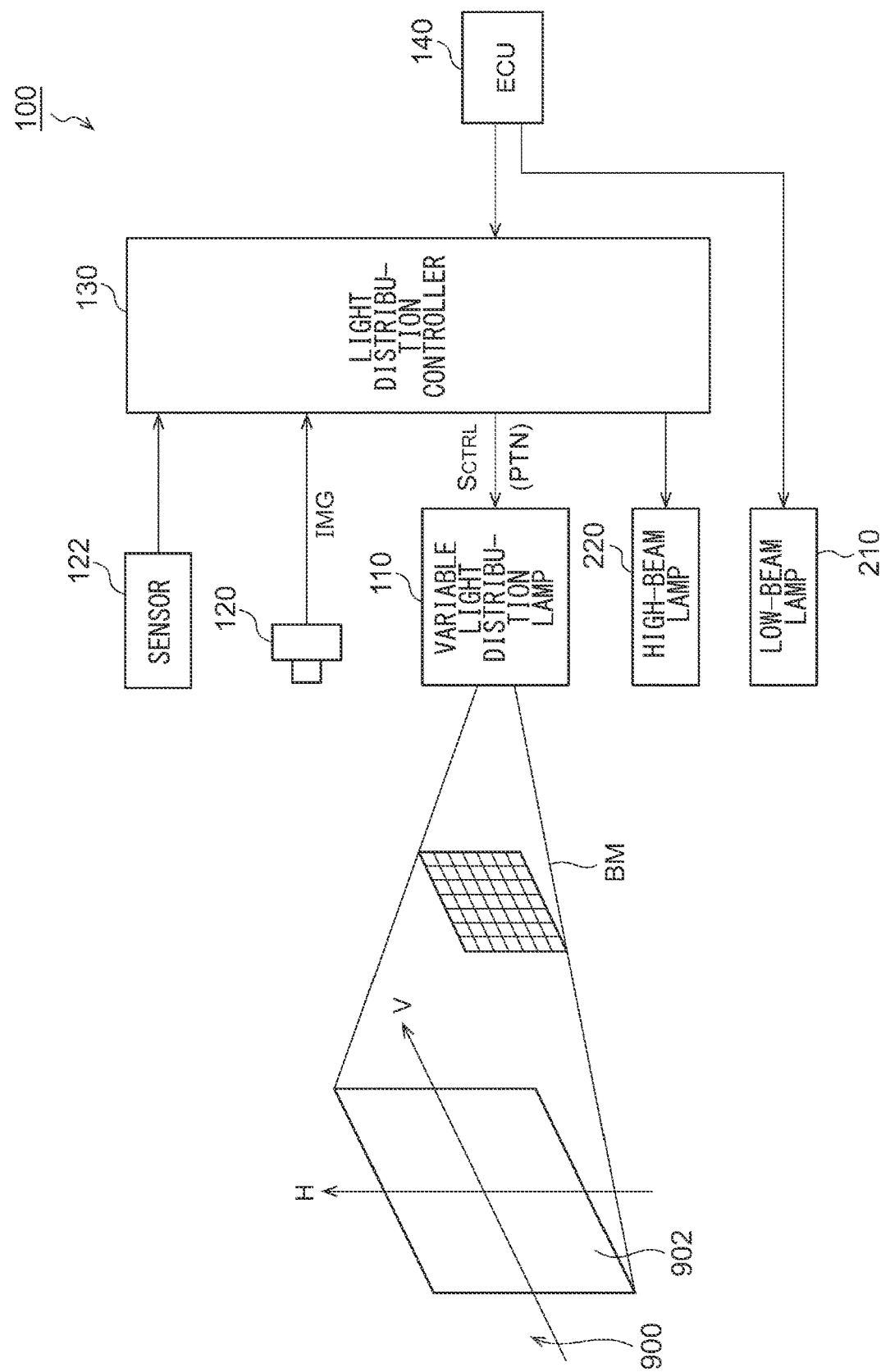
FIG. 35 is a block diagram showing a lamp system according to one embodiment 4.

FIG. 35 is a block diagram showing a lamp system (or automotive lamp) 100 according to one embodiment 4. The lamp system 100 includes a variable light distribution lamp 110, a camera 120, a sensor 122, a light distribution controller 130, a low-beam lamp 210, and a high-beam lamp 220. All the components may be built into the same housing. Also, several components may be provided as external components of the housing, i.e., may be provided on the vehicle side.

In the present embodiment, the variable light distribution lamp 110 is provided as an additional lamp separately from the low-beam lamp 210 and the high-beam lamp 220. Accordingly, the variable light distribution lamp 110 may be referred to as an "additional beam lamp".

The variable light distribution lamp 110 includes a white light source. The variable light distribution lamp 110 receives a control signal $S_{CTRL}$ that indicates a light distribution pattern PTN from the light distribution controller 130, and emits a beam BM having a light intensity distribution that corresponds to the control signal $S_{CTRL}$, so as to generate an illumination level distribution (irradiation pattern) in front of the vehicle according to the control signal $S_{CTRL}$. The configuration of the variable light distribution lamp 110 is not restricted in particular. For example, the variable light distribution lamp 110 may include a semiconductor light source such as a laser diode (LD), a light-emitting diode (LED), or the like, and a lighting circuit configured to drive the semiconductor light source such that it emits light. In order to form the illumination distribution pattern that corresponds to the light distribution pattern PTN, the variable light distribution lamp 110 may include a matrix-type pattern-forming device such as a digital mirror device (DMD), a liquid crystal device, or the like. Also, the variable light distribution lamp 110 may be configured as a light-emitting element array (which will also be referred to as a "μ-LED").

The irradiation area supported by the variable light distribution lamp 110 is determined so as to cover at least the road surface. Accordingly, the irradiation area supported by the variable light distribution lamp 110 is designed such that it overlaps a part of the irradiation area of the low-beam lamp.

The camera 120 captures an image of a region in front of the vehicle. The light distribution controller 130 dynamically and adaptively controls the light distribution pattern PTN to be supplied to the variable light distribution lamp 110 based on the image (which will be referred to a "camera image IMG" hereafter) captured by the camera 120. The light distribution pattern PTN defines a two-dimensional illumination level distribution of a white-light irradiation pattern formed by the variable light distribution lamp 110 on a virtual vertical screen 900 defined in front of the user's vehicle. The light distribution controller 130 may be configured as a digital processor. For example, the light distribution controller 130 may be configured as a combination of a microcontroller including a CPU and a software program. Also, the light distribution controller 130 may be configured as a field programmable gate array (FPGA), application specified IC (ASIC), or the like.

More specifically, when the vehicle mounting the lamp system 100 is traveling, the light distribution controller 130 controls the variable light distribution lamp 110 so as to draw a figure for driving assistance on the road surface using the beam BM. The kind of the figure is not restricted in particular. For example, the light distribution controller 130 may draw a figure that indicates the legal speed information, road signs, or the like, in an easily viewable form for the driver. Also, in order to provide driving assistance to other vehicles, the light distribution controller 130 may draw a figure that indicates the traveling direction of the user's vehicle.

The high-beam lamp 220 may be configured as a variable light distribution lamp as with the variable light distribution lamp 110. In this case, the light distribution controller 130 may control the light distribution to be provided by the high-beam lamp 220 based on the camera image IMG. The electronic control unit (ECU) 140 integrally controls the lamp system 100. Specifically, the ECU 140 generates an on/off instruction etc., for the low-beam lamp 210, the high-beam lamp 220, and the variable light distribution lamp 110. Furthermore, the ECU 140 transmits information necessary for the light distribution control operation to the light distribution controller 130.

When a person who satisfies a predetermined condition approaches the vehicle while it is parked, the light distribution controller 130 controls the variable light distribution lamp 110 so as to draw a predetermined pattern on the ground using the beam BM.

The sensor 122 is provided in order to detect the proximity of a person who satisfies a predetermined condition. Accordingly, the sensor 122 may be designed and selected according to such a predetermined condition. For example, in a case in which the proximity of a person having a vehicle key, smartphone, or the like is employed as such a predetermined condition, the sensor 122 may be configured to be selected as a device that is capable of communicating with such a key or smartphone, or that is capable of receiving a wireless signal emitted from the key or smartphone.

As such a predetermined pattern, a logo relating to the vehicle may be employed, examples of which include a logo or trademark of the automobile manufacturer, and a model name or trademark of the vehicle itself. Also, a character string such as "Hello" or the like may be employed. Also, a figure may be employed.

Figure 36A:
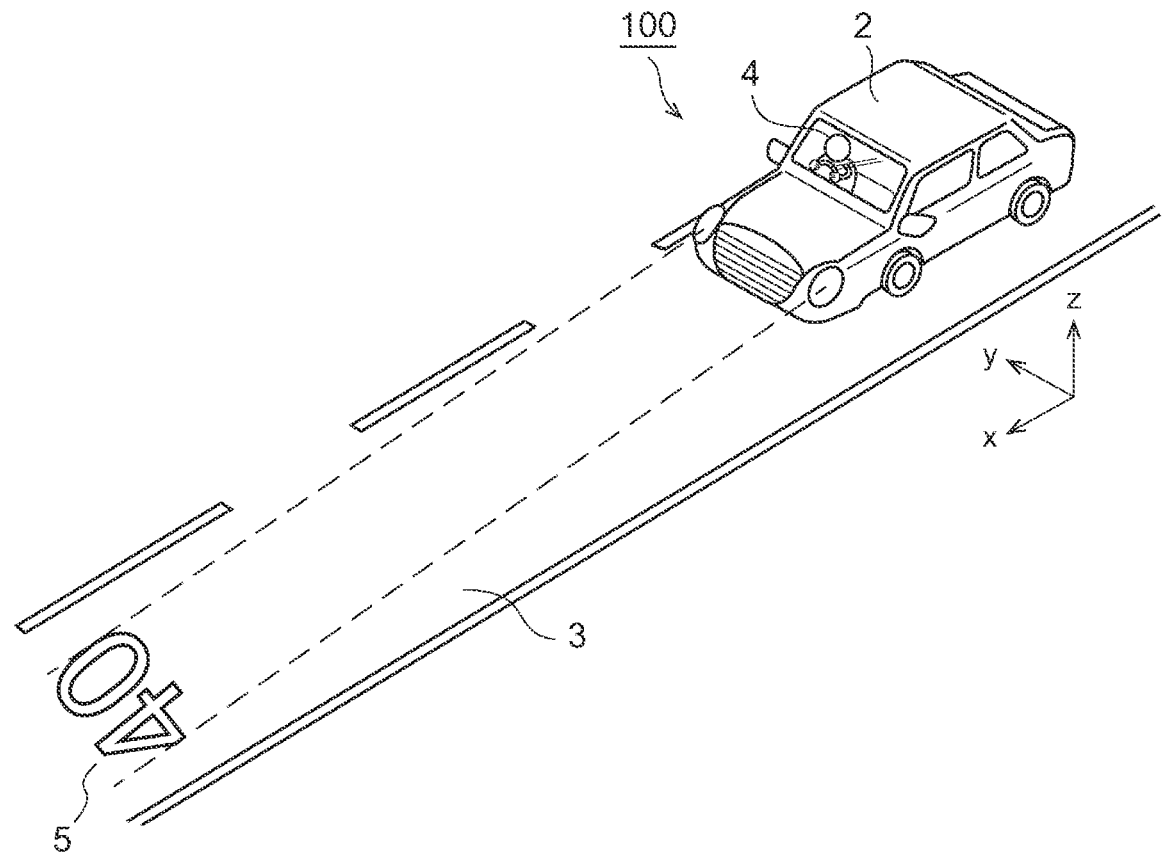
FIGS. 36A and 36B are diagrams for explaining an operation of the lamp system shown in FIG. 35.
Figure 36B:
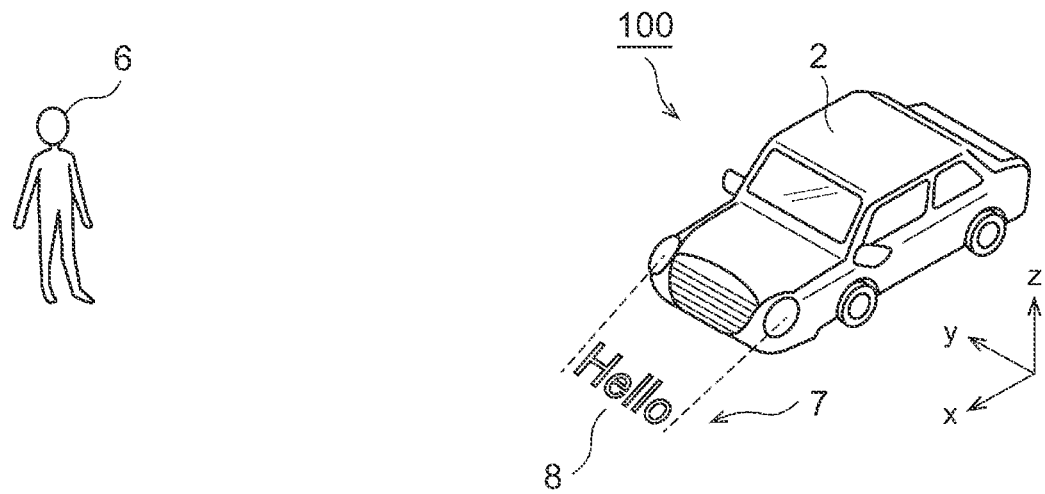

The above is the basic configuration of the lamp system 100. Next, description will be made regarding the operation thereof. FIGS. 36A and 36B are diagrams for explaining the operation of the lamp system 100 shown in FIG. 35. FIG. 36A shows the operation when the vehicle is traveling normally. The lamp system 100 draws a FIG. 5 for driving assistance on the road surface 3 in front of the user's vehicle 2 mounting the lamp system 100 such that it is drawn in a region that is visible to the driver 4. In this example, the legal speed information (40 km/h) is drawn.

FIG. 36B is a diagram for explaining the operation of the lamp system 100 shown in FIG. 35 when the vehicle is parked. When a person 6 who satisfies a predetermined condition approaches the parked vehicle, a predetermined pattern 8 is drawn on a ground 7. Such a person 6 is the driver or a passenger of the user's vehicle 2. In an example shown in FIG. 36B, as the predetermined pattern 8, a character string "Hello" is employed. Such a character string may be changed to "Good Morning" or "Good Evening" according to the time of day.

The predetermined pattern may be extinguished when the door of the vehicle has been unlocked, when the door has been opened or closed, or when the proximity of the person 6 to the vehicle 2 becomes equal to or smaller than a predetermined distance.

When the vehicle is parked, the pattern drawing is not required to be visible from the driver's seat. Rather, the pattern is preferably drawn at a position in the vicinity of the user's vehicle 2. In a case in which the pattern 8 is drawn at a position in the vicinity of the user's vehicle 2, the pattern 8 indicates the position of the user's vehicle 2. Accordingly, this allows the person 6 to view the pattern 8 so as to know the position of the user's vehicle 2.

Figure 37C:
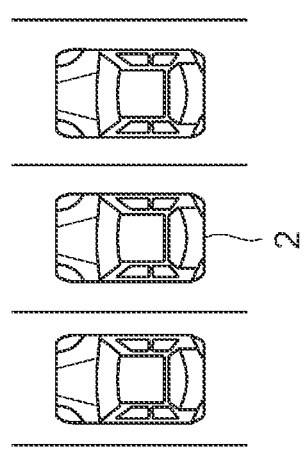
FIGS. 37A through 37C are diagrams for explaining the operation of the lamp system shown in FIG. 35 while the vehicle is parked.
Figure 37B:
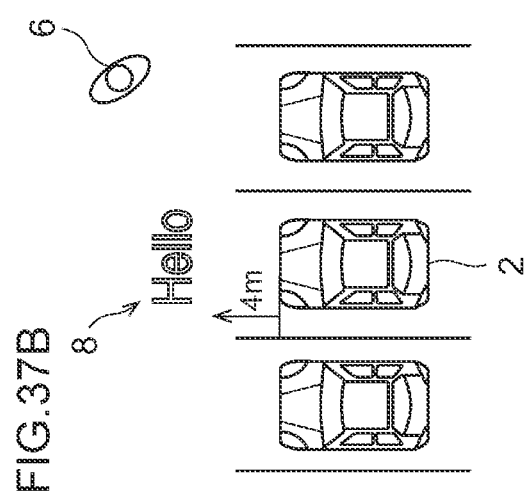
Figure 37A:
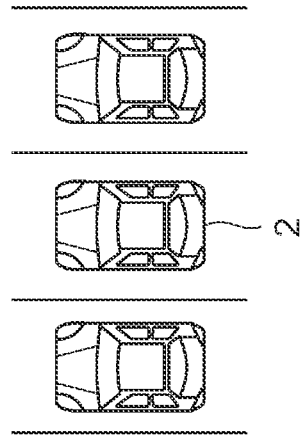

FIGS. 37A through 37C are diagrams for explaining the operation of the lamp system 100 shown in FIG. 35 when the vehicle is parked. FIG. 37A shows a state in which the user's vehicle 2 is parked and the person (driver or passenger) 6 is not present. Subsequently, when the person 6 returns to the user's vehicle 2 as shown in FIG. 37B, the pattern 8 is drawn on the ground in front of the user's vehicle 2.

In many parking lots, there are parking stalls arranged in the width direction of the vehicles. Such a parking stall group is designed such that it faces another parking stall group across a passageway. The passageway is designed to have a width on the order of 5 m to 8 m. Accordingly, the pattern 8 may be preferably irradiated in a range 1 m to 6 m in front of the vehicle (e.g., in a range 4 m ahead of the front edge of the bumper of the vehicle). This allows the pattern to be irradiated to the passageway, thereby allowing the person 6 to notice the pattern even if there is a large distance between the person 6 and the vehicle.

Subsequently, as shown in FIG. 37C, when the person unlocks and gets in the user's vehicle 2, the pattern 8 is extinguished.

The above is the operation of the lamp system 100.

In some cases, the driver (or passenger) loses track of the user's vehicle. Conventionally, in order to search for the user's vehicle 2, the driver operates a remote control key so as to turn on the lamp of the user's vehicle 2. However, with this method, the user's vehicle is unlocked in a state in which the driver has no information with respect to the position of the user's vehicle 2. Accordingly, this method is by no means a correct method from the security viewpoint.

With the lamp system 100 according to the present embodiment, the pattern is automatically drawn on the ground without requiring the person 6 to press a button or the like. This arrangement provides an improved "impression of service" as compared with conventional techniques.

In addition, the door of the user's vehicle 2 is not unlocked when the pattern is drawn on the road surface. This arrangement has an advantage from the security viewpoint.

Furthermore, the light source for drawing the pattern 8 also functions as a light source for drawing a figure on the road surface when the vehicle is traveling normally. This suppresses an increase in costs of the hardware components.

Next, description will be made regarding an example configuration of the lamp system 100. FIGS. 38A and 38B are diagrams each showing an example configuration of the lamp system 100. In FIG. 38A, the variable light distribution lamp 110 is built into the headlamp 200 together with the low-beam lamp 210 and the high-beam lamp 220.

In FIG. 38B, the variable light distribution lamp 110 is built into the lamp 300 configured independently of the headlamp 200. The lamp 300 is attached to the bumper 302 arranged on a front side of the vehicle, for example.

FIGS. 39A and 39B are diagrams each showing an example configuration of a control system of a lamp system. In FIG. 39A, the camera 120 is provided as an external component of the lamp 200 (or 300). The light distribution pattern to be provided by the variable light distribution lamp 110 is generated by the ECU 310 arranged on the vehicle side as an external component of the lamp 200. Accordingly, in this example, the function of the light distribution controller 130 shown in FIG. 35 is supported by the ECU 310. The ECU 310 controls the beam BM to be emitted by the variable light distribution lamp 110 based on the image captured by the camera, vehicle information (vehicle speed and steering angle), distance measurement data, etc. The variable light distribution lamp 110 includes a DMD 112, a driver 114 for the DMD 112, and a projector lens 116.

In FIG. 39B, the camera 120 is built into the lamp 200. The function of the light distribution controller 130 is supported by the ECU arranged on the lamp side.

Description will be made regarding modifications relating to the fourth embodiment.

Modification 9

Description has been made with reference to FIG. 36B regarding an example in which, as the pattern 8, a generic character string "Hello" is drawn. If such an automobile mounting the lamp system 100 becomes widely used in the future, this has the potential to cause a situation in which the same character strings are drawn at different locations on the ground of a parking lot. Accordingly, this arrangement has the potential to involve an adverse effect, i.e., a situation in which the driver 6 loses track of the user's vehicle 2. In order to solve such a problem, as the pattern 8, a figure that is unique to the user's vehicle 2 (or driver 6) may be drawn. This allows the person 6 to distinguish a pattern drawn by the user's vehicle from among the patterns drawn at different locations.

Modification 10

Description has been made in the embodiment 4 regarding an arrangement in which, when the person 6 who satisfies a predetermined condition has approached the user's vehicle, the pattern 8 is automatically drawn. However, the present invention is not restricted to such an arrangement. For example, the remote controller may be provided with an additional button that allows a trigger to be supplied for drawing the pattern 8. Upon pressing the button as a trigger, the lamp system 100 may draw the pattern 8 (without unlocking the door). This arrangement requires the user to perform an additional action, i.e., to press the button, for drawing the pattern. This degrades the impression of service. However, such an arrangement also has an advantage of allowing the user to obtain information with respect to the position of the user's vehicle without a need to unlock the door.

Modification 11

Also, the pattern to be drawn on the road surface when the vehicle is parked may be specified by the user. For example, such an arrangement may allow the user to freely edit the character string. Also, such an arrangement may allow the user to specify the image data.

Modification 12

When the vehicle is parked, the light distribution controller 130 may detect the direction of a person who satisfies the predetermined condition. Also, the light distribution controller 130 may move the pattern toward the direction of the person thus detected. Also, in a case in which a logo or text is drawn, the light distribution controller 130 may rotate or change the shape of the pattern so as to allow the person thus detected to easily read the logo or text. This further improves the impression of service.

Modification 13

The left and right headlamps 200 or lamps 300 may each include such a variable light distribution lamp 110 as a built-in component. In this case, the left and right variable light distribution lamps 110 may provide substantially the same irradiation area. That is to say, the beams irradiated by the left and right variable light distribution lamps 110 may be superimposed.

Modification 14

The left and right headlamps 200 or lamps 300 may each include such a variable light distribution lamp 110 as a built-in component. In this case, the left and right variable light distribution lamps 110 may support different irradiation areas. For example, one variable light distribution lamp 110 may illuminate an upper-side region of the irradiation area 10 shown in FIG. 36. Also, the other variable light distribution lamp 110 may illuminate a lower-side region of the irradiation area 10 shown in FIG. 36.

Modification 15

Description has been made in the embodiment 4 regarding an example in which the variable light distribution lamp 110 is configured as an additional light source with respect to the low-beam lamp 210 and the high-beam lamp 220. Also, the function of at least one of the low-beam lamp 210 and the high-beam lamp 220 may be integrated in the variable light distribution lamp 110.

Fifth Embodiment

Figure 40:
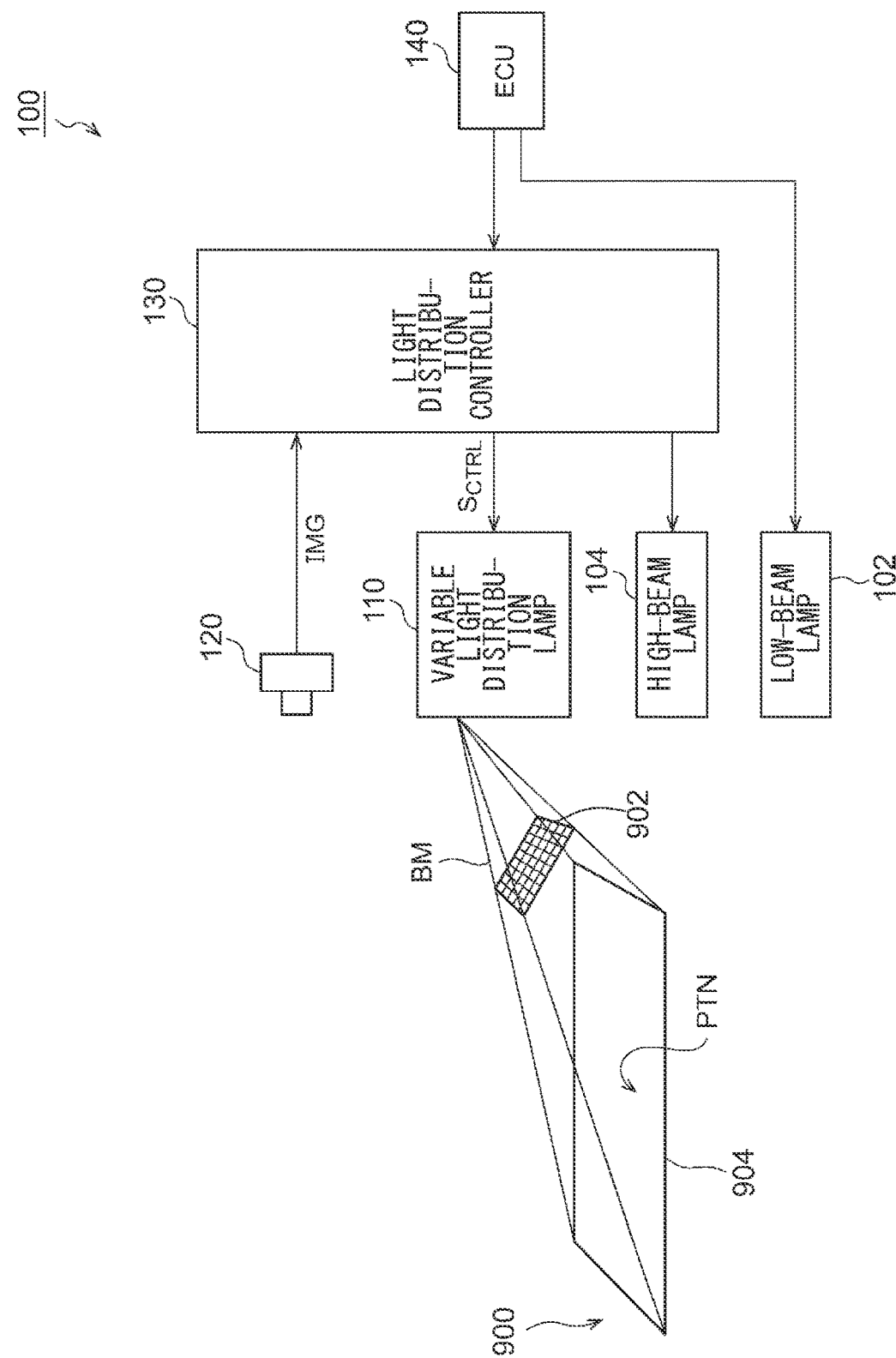
FIG. 40 is a block diagram showing a lamp system (or automotive lamp) according to one embodiment 5.

FIG. 40 is a block diagram showing a lamp system (or automotive lamp) 100 according to one embodiment 5. The lamp system 100 includes a variable light distribution lamp 110, a camera 120, a light distribution controller 130, a low-beam lamp 102, and a high-beam lamp 104. Such components may be built into the same housing. Also, several components may be provided as external components of the housing, i.e., may be provided on the vehicle side.

In the present embodiment, the variable light distribution lamp 110 is provided as an additional lamp in addition to the low-beam lamp 102 and the high-beam lamp 104. Accordingly, the variable light distribution lamp 110 may be referred to as an "additional beam lamp".

The variable light distribution lamp 110 includes a white light source. The variable light distribution lamp 110 receives, from the light distribution controller 130, a control signal $S_{CTRL}$ that indicates a pattern PTN to be drawn on a road surface 900, and irradiates a beam BM having an intensity distribution 902 that corresponds to the control signal $S_{CTRL}$ to the road surface 900 in front of the vehicle, so as to draw the pattern PTN on the road surface 900. The pattern PTN is formed in an irradiation area 904 provided by the beam BM.

The configuration of the variable light distribution lamp 110 is not restricted in particular. For example, the variable light distribution lamp 110 may include a semiconductor light source such as a laser diode (LD), a light-emitting diode (LED), or the like, and a lighting circuit configured to drive and turn on the semiconductor light source. The variable light distribution lamp 110 may include a matrix-type pattern-forming device such as a digital mirror device (DMD), a liquid crystal device, or the like. Also, the variable light distribution lamp 110 may be configured as a light-emitting element array (which will be also referred to as a "μ-LED").

Also, the variable light distribution lamp 110 may provide an irradiation area that overlaps a part of the irradiation area provided by the low-beam lamp.

The camera 120 captures an image of a region in front of the vehicle. The light distribution controller 130 may control the pattern PTN to be drawn on the road surface 900 based on the image captured by the camera 120 (which will be referred to as a "camera image IMG" hereafter).

The high-beam lamp 104 may be configured to support variable light distribution as with the variable light distribution lamp 110. In this case, the light distribution controller 130 may control the light distribution to be provided by the high-beam lamp 104 based on the camera image IMG. An electronic control unit (ECU) 40 integrally controls the lamp system 100. Specifically, the ECU 140 generates commands such as a turn-on command, turn-off command, etc., for the low-beam lamp 102, the high-beam lamp 104, and the variable light distribution lamp 110. Furthermore, the ECU 140 transmits information required for the light distribution control to the light distribution controller 130.

The light distribution controller 130 may be configured as a digital processor. For example, the light distribution controller 130 may be configured as a combination of a microcontroller including a CPU and a software program. Also, the light distribution controller 130 may be configured as a Field Programmable Gate Array (FPGA), Application Specified IC (ASIC), or the like.

More specifically, when the vehicle mounting the lamp system 100 is traveling, the light distribution controller 130 controls the variable light distribution lamp 110, so as to draw a figure on the road surface using the beam BM for driving assistance. The kinds of the figures are not restricted in particular. For example, legal speed information, road signs, or the like, may be drawn so as to allow the driver to easily view such information. Also, in order to assist other drivers in driving their vehicles, this arrangement may draw a figure that indicates the user's vehicle traveling direction.

Figure 41:
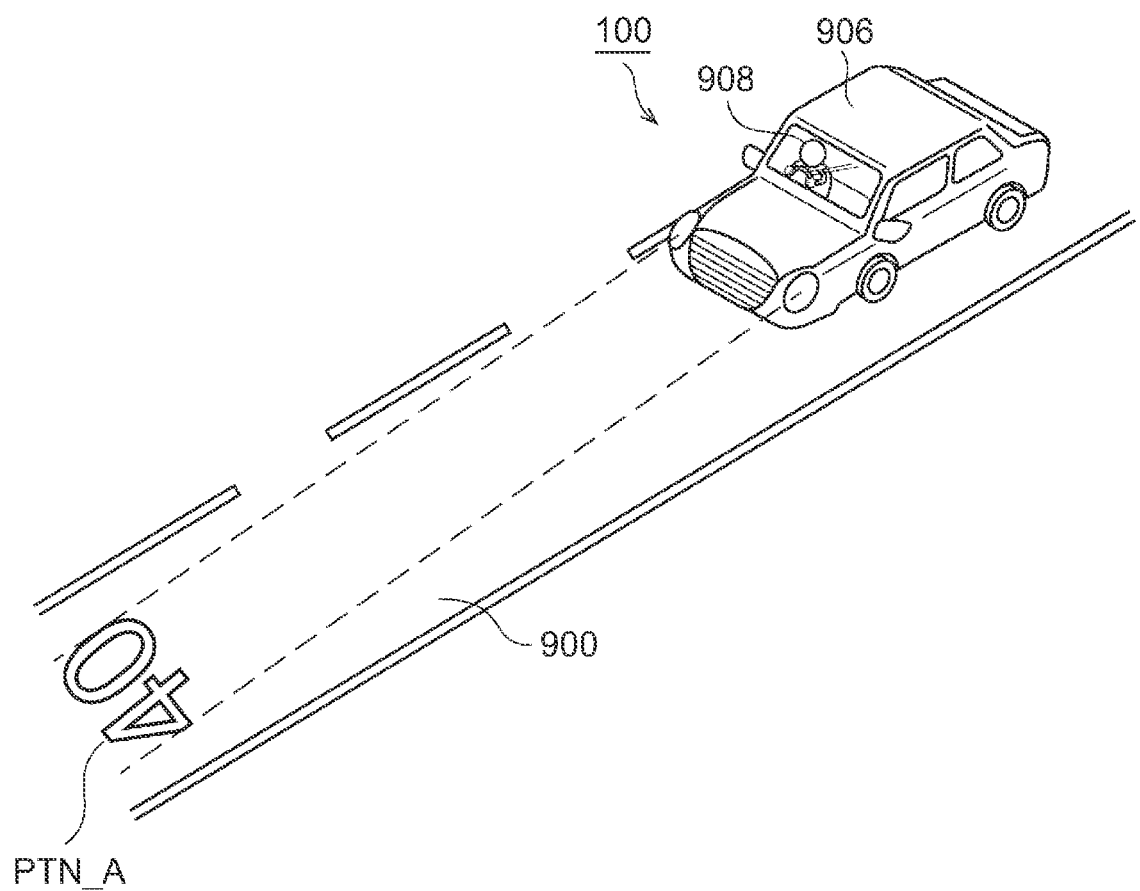
FIG. 41 is a diagram showing an example PTN_A of a pattern PTN drawn on the road surface by the variable light distribution lamp.

FIG. 41 is a diagram showing an example of a pattern PTN (PTN_A) to be drawn on the road surface 900 by means of the variable light distribution lamp 110. Various kinds and shapes of patterns PTN may be employed according to the traveling situation. FIG. 41 shows a given traveling situation. As the pattern PTN_A to be drawn on the road surface 900, a figure (character string) that indicates the speed limit may be employed. Also, examples of such a pattern PTN may include a figure or a character string that indicates information associated with a car navigation system. The pattern PTN is drawn with an appropriate size at a position that allows a driver 908 of a vehicle (which will be also referred to as the "user's vehicle") 906 mounting the lamp system 100 to easily view such information.

Description will be made below with reference to typical patterns PTN_B that can be drawn by the lamp system 100 according to the embodiment 5.

Figure 42:
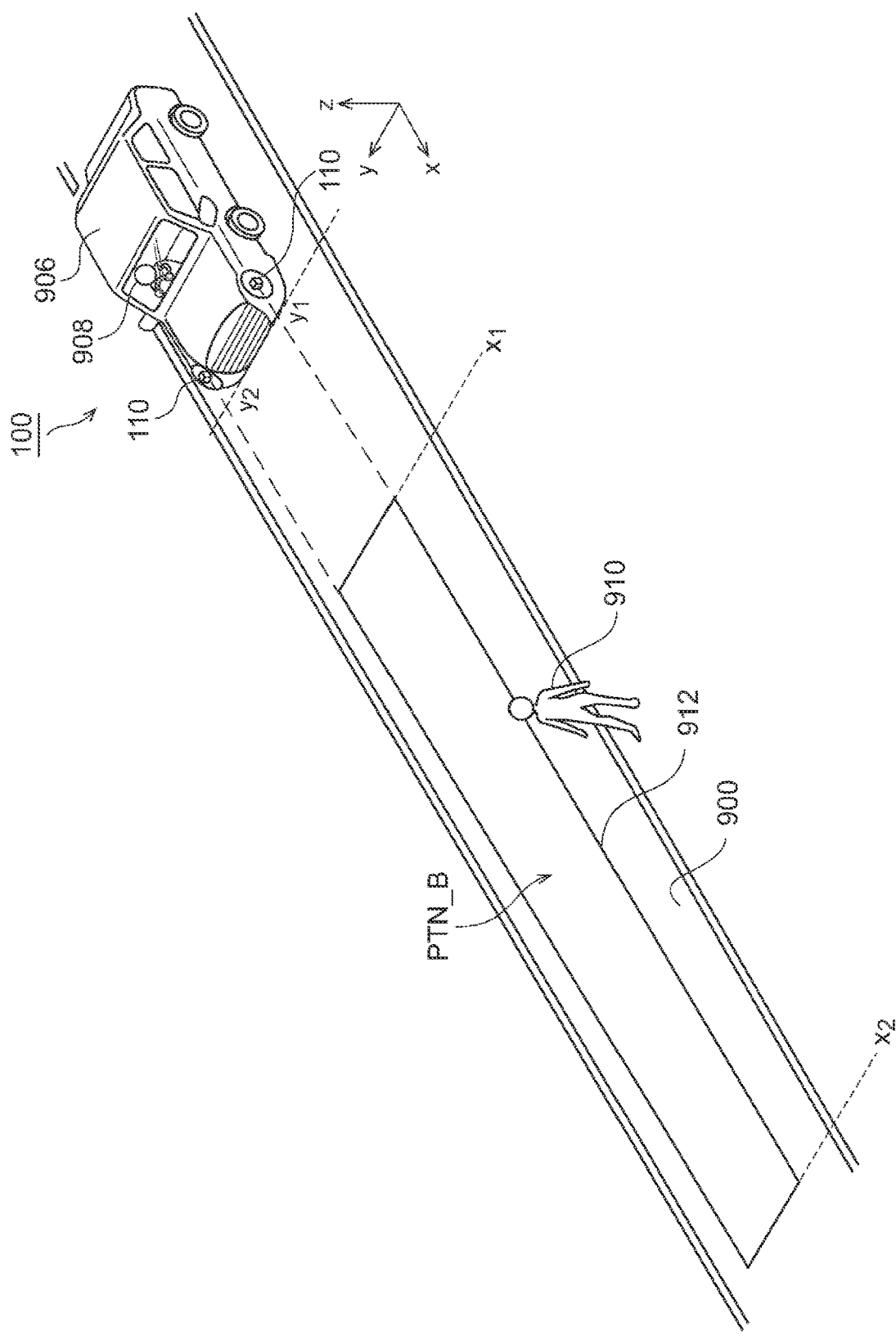
FIG. 42 is a diagram showing a pattern PTN_B drawn on the road surface by the lamp system.

FIG. 42 is a diagram showing a pattern (approach notice pattern) PTN_B to be drawn by the lamp system 100 on the road surface. The low beam can be irradiated to the road surface 900 in addition to the beam irradiated by the variable light distribution lamp 110. The variable light distribution lamp 110 irradiates the pattern PTN_B over a predetermined range 912 ($x_1$ to $x_2$, $y_1$ to $y_2$) with the traveling direction (the x-axis direction) as the longitudinal direction with a light intensity that is brighter than that of the low beam BML. In a case in which the origin of the x axis is defined to be the front edge of the vehicle, the range 912 may be designed with $x_1$=2 m to 10 m and $x_2$=30 m to 60 m. An example may be made in which $x_1$=7 m and $x_2$=45 m. As a simplest example, the pattern PTN_B may be designed as a uniform irradiation pattern. However, as described later, the present invention is not restricted to such an example. The pattern PTN_B is irradiated to the road surface around the pedestrian 910 for a length of time that is to some extent long, i.e., a period from a time point at which the vehicle 906 approaches the pedestrian (traffic participant) 910 in front of the vehicle 906 up to a time point at which the vehicle overtakes the pedestrian 910.

The above is the basic configuration of the lamp system 100. With the lamp system 100, the pattern PTN_B drawn on the road surface passes by the traffic participant before the vehicle overtakes the traffic participant (pedestrian or bicycle). The pattern PTN_B is brighter than the low beam. This allows the traffic participant in front of the vehicle to be notified of the approach of the vehicle from behind. With this, the traffic participant views the beam reflected by the road surface (i.e., the pattern PTN_B drawn on the road surface) instead of directly viewing the beam BM emitted by the variable light distribution lamp 110. Accordingly, this arrangement has an advantage of preventing glare from being imparted to the traffic participant.

The present invention encompasses various kinds of apparatuses and methods that can be derived from FIG. 40 or FIG. 42 or description relating to the drawings. That is to say, the present invention is not restricted to a specific configuration. More specific description will be made below regarding an example configuration or an example for clarification and ease of understanding of the essence of the present invention and the circuit operation. That is to say, the following description will by no means be intended to restrict the technical scope of the present invention.

Next, description will be made regarding a specific example of the pattern PTN_B.

Figure 43:
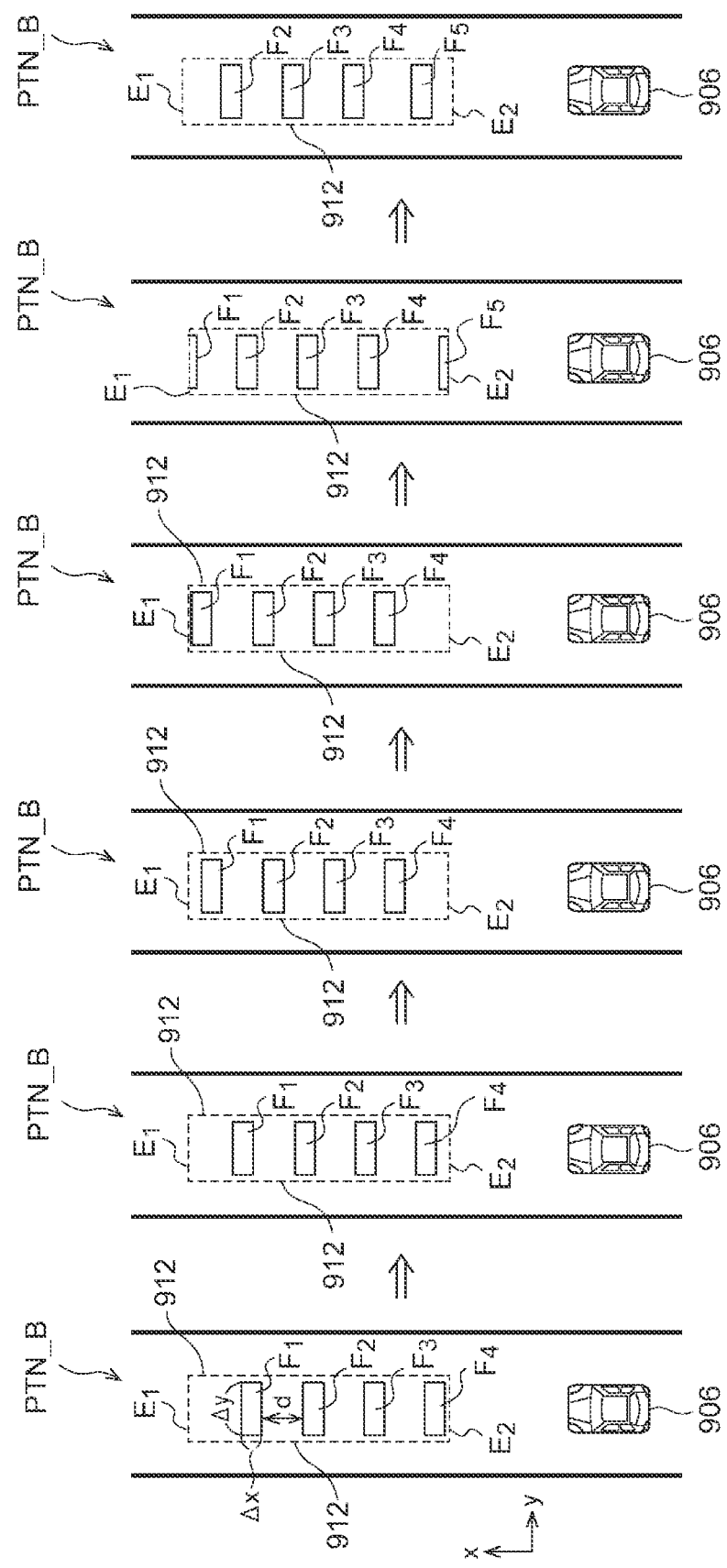
FIG. 43 is a diagram showing an example of the pattern PTN_B as viewed from above.

FIG. 43 is a diagram showing an example of the pattern PTN_B from above. FIG. 43 shows an example of animation of the pattern PTN_B. It should be noted that, in actuality, the vehicle 906 is traveling. However, for simplification of description, the vehicle 906 is shown at the same position. The pattern PTN_B is drawn within a predetermined range 912 indicated by the broken line. The predetermined range 912 may be designed as an inner-side portion of the irradiation area 904.

The pattern PTN_B includes multiple (N, e.g., N=4 in this example) figures $F_i$ through $F_{i+N-1}$ arranged in the traveling direction (x-axis direction). In this case, the figures $F_i$ through $F_{i+N-1}$ are each designed to have the same shape, i.e., a bar shape (rectangular shape) having a long side in the vehicle-width direction (y direction). With such multiple figures, a stripe-shaped pattern is formed.

Each figure (bar) may preferably be designed to have a length Δx in the x direction on the order of 2 m to 5 m. Also, the interval between the adjacent figures may preferably be designed to be on the order of 2 m to 5 m. Also, the width Δy of each of the multiple figures may be designed to be substantially equal to or larger than the vehicle. Specifically, the width Δy may preferably be designed to be on the order of 1.5 m to 2.5 m.

With the multiple figures thus arranged in the traveling direction, when the vehicle is traveling, the multiple figures sequentially pass by the traffic participant. In this state, the road surface around the traffic participant is alternately illuminated in the order of "bright", "dark", "bright", "dark", . . . . This allows the traffic participant to be further warned as compared with an arrangement configured to provide a uniform illumination pattern.

The pattern PTN_B is generated as an animation of the above-described number of figures $F_i$ through $F_{i+N-1}$ that slide in a direction away from the vehicle at the same speed. This animation is provided such that it moves like a horizontal escalator.

Each figure $F_j$ ($i \leq j \leq i+n-1$) is drawn in only the predetermined range 912. Accordingly, after a leading figure ($F_1$ in this example) reaches the front edge E1 of the predetermined range 912, a part of the leading figure is diminished, and finally the entire leading figure is extinguished from the predetermined range 912. Furthermore, a new figure ($F_5$ in this example) is generated such that it emerges from the rear edge E2 of the predetermined range 912. Subsequently, the new figure thus generated slides toward the front edge E1.

This animation allows the traffic participant to be notified in an intuitive manner of the approach of the automobile from behind.

The pattern may be generated as an animation of multiple figures sliding in a direction away from the vehicle at the same speed. This allows the traffic participant to be notified in an intuitive manner of the approach of an automobile from behind.

The relative speed of the multiple figures with respect to the vehicle may be designed in a range between 10 km/h and 165 km/h. This allows the traffic participants to notice the FIGS. with improved performance.

The sliding speed of the multiple figures may be changed according to the distance between the vehicle and the traffic participant in front of the vehicle. This allows the traffic participant to obtain information with respect to the distance up to the vehicle based on the speed of the animation. This allows the traffic participant to obtain information with respect to a timing at which the traffic participant will be overtaken by the vehicle. Furthermore, with such an arrangement in which the speed of the animation is raised according to a reduction of the distance, this further prompts the traffic participant to perform appropriate action.

Also, the pattern PTN_B may preferably be irradiated in only a situation in which there is a traffic participant in the vicinity of the vehicle who is to be notified of the approach of the vehicle from behind. When there is no such traffic participant, the pattern PTN_B may preferably not be drawn. Accordingly, the pattern PTN_B may be drawn when the vehicle speed is equal to or smaller than a predetermined value.

For example, when the vehicle is traveling on a highway or expressway, there is a high probability that there is no traffic participant in the vicinity of the vehicle who is to be provided with the pattern PTN_B. Accordingly, the predetermined value may preferably be defined in a range between 20 km/h and 40 km/h.

When the vehicle is traveling on a road having a large width, there is sufficient clearance between the vehicle and the traffic participant. Accordingly, in this case, it can be said that there is no need to notify the traffic participant of the approach of the vehicle from behind. Accordingly, the pattern PTN_B may be drawn when the vehicle is traveling on a road having a width that is smaller than a predetermined width. The predetermined width may be designed to be 4 m, for example.

Also, the pattern PTN_B may be drawn upon detecting a pedestrian, bicycle, or the like, in front of the vehicle by means of a camera or the like.

Next, description will be made regarding a configuration example of the lamp system 100. FIGS. 44A and 44B are diagrams each showing a configuration example of the lamp system 100. FIG. 44A shows an example in which the variable light distribution lamp 110 is built into a headlamp 300A together with the low-beam lamp 102 and the high-beam lamp 104.

FIG. 44B shows an example in which the variable light distribution lamp 110 is built into a lamp 300B that is independent of the headlamp 230. The lamp 300B is attached to a bumper 240 arranged on a front side of the vehicle 200, for example.

FIGS. 45A and 45B are diagrams each showing a configuration example of a control system of a lamp system. The variable light distribution lamp 110 includes a DMD 112, a driver 114 for the DMD 112, and a projector lens 116. FIG. 45A shows an example in which the light distribution pattern to be provided by the variable light distribution lamp 110 is generated by an ECU 250 arranged on the vehicle side configured as an external component of the lamp 300A (300B). Accordingly, in this example, the functions of the light distribution controller 130 shown in FIG. 40 are supported by the ECU 250.

FIG. 45B shows an example in which the lamp 300A (300B) is provided with a lamp ECU 310. The function of the light distribution controller 130 is supported by the lamp ECU 310. The lamp ECU 310 controls the variable light distribution lamp 110 in cooperation with the ECU 220.

Description will be made regarding modifications relating to the fifth embodiment.

Modification 16

Figure 46A:
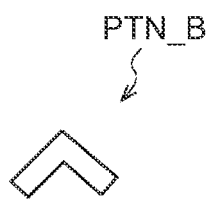
FIGS. 46A through 46C are diagrams each showing the pattern PTN_B according to a modification.
Figure 46B:
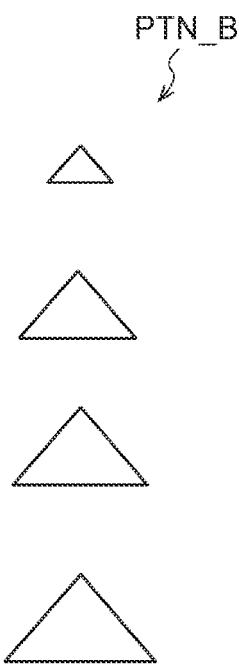
Figure 46C:
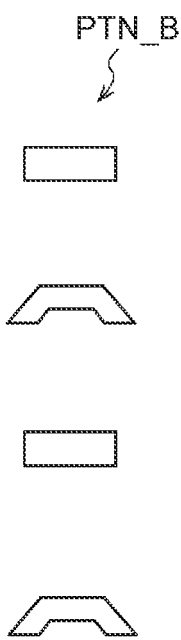

FIGS. 46A through 46C are diagrams each showing the pattern PTN_B according to a modification. As shown in FIG. 46A, multiple figures that form the pattern PTN_B are not restricted to rectangles. Also, the pattern PTN_B may be designed to have other figures such as arrows, triangles, circles, etc. As shown in FIG. 46B, all the multiple figures that form PTN_B are not required to have the same size. Also, as shown in FIG. 46C, the multiple figures that form PTN_B may be designed to have different shapes.

Modification 17

Figure 47:
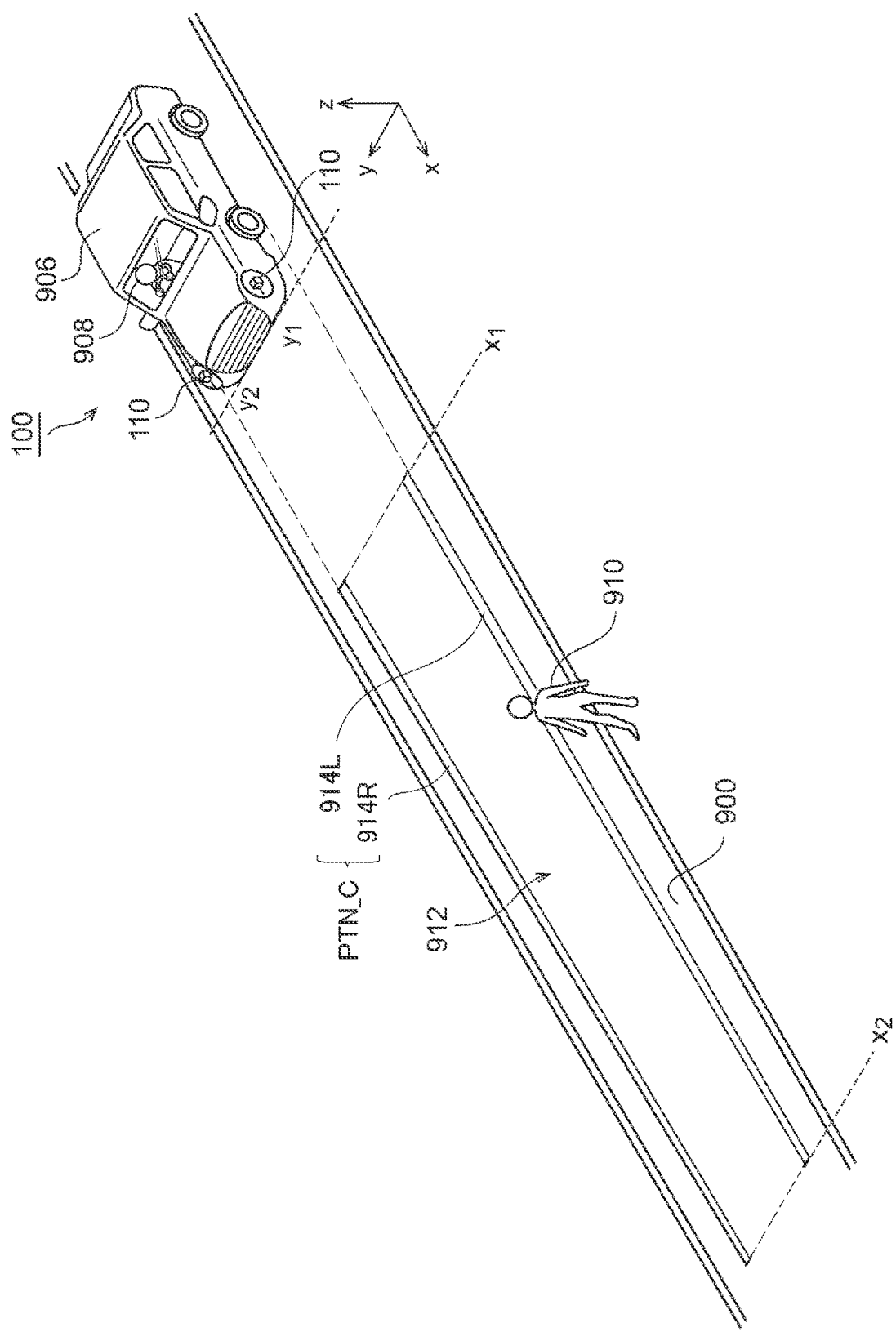
FIG. 47 is a diagram showing a pattern PTN_C according to a modification.

FIG. 47 is a diagram showing a pattern PTN_C according to a modification. The pattern PTN_C includes two lines 914L and 914R that indicate the vehicle width. This allows the pedestrian 910 to retreat away from the line 914L positioned in the vicinity of the pedestrian 910, thereby preventing a collision between the pedestrian 910 and the vehicle 100.

When two vehicle pass each other in a case in which each vehicle draws the pattern as shown in FIG. 47, it is difficult to distinguish which pattern has been drawn by which vehicle. This problem can be solved by the following modification.

Figure 48A:
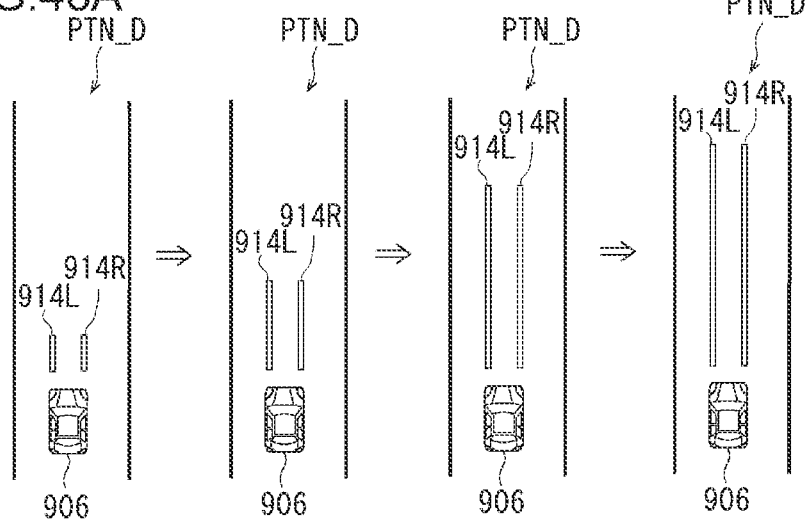
FIGS. 48A through 48C are diagrams each showing a pattern PTN_D according to a modification.
Figure 48B:
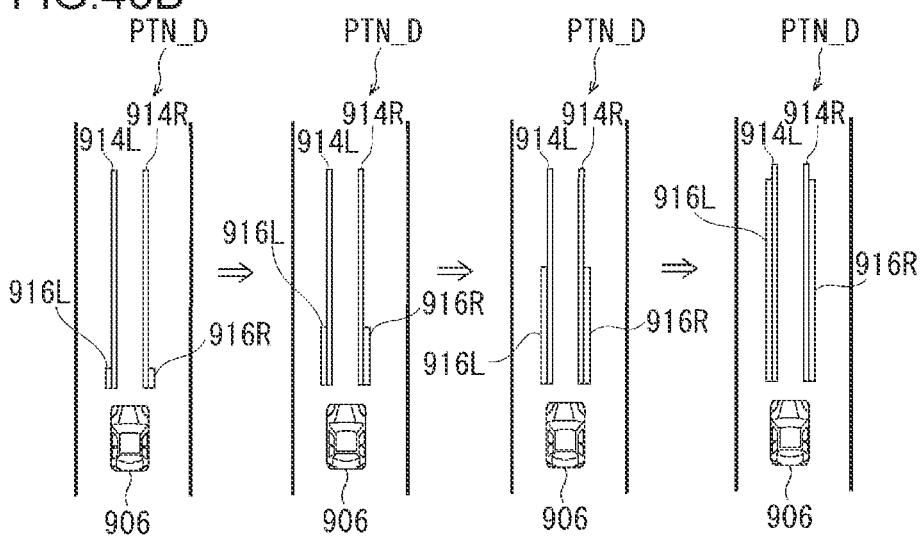
Figure 48C:
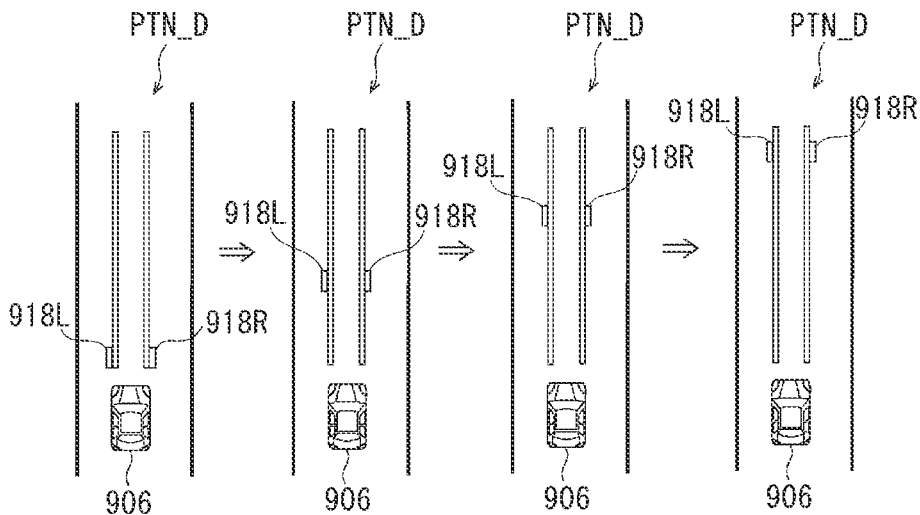

FIGS. 48A through 48C are diagrams each showing a pattern PTN_D according to the modification. The patterns PTN_D shown in FIGS. 48A through 48C are generated by applying an animation effect to the pattern PTN_C shown in FIG. 47. With the pattern PTN_D shown in FIG. 48A, the two lines that indicate the vehicle width are drawn such that they extend in the traveling direction with time. This allows the driver of the vehicle 100, the driver of a different vehicle, or a pedestrian, to be notified of a corresponding vehicle that has drawn the pattern PTN_D.

FIG. 48B shows the pattern PTN_D obtained by further providing the pattern PTN_C shown in FIG. 47 with animation FIGS. 916L and 916R drawn such that they extend with time. In FIG. 48B, the animation FIGS. 916L and 916R are arranged adjacent to the lines 914L and 914R, respectively. The animation FIGS. 916L and 916R are drawn such that their lengths extend toward the traveling direction with time. After the animation FIGS. 916L and 916R extend such that they have the same length as those of the lines 914L and 914R, the animation FIGS. 916L and 916R are returned to the initial length. Subsequently, the animation FIGS. 916L and 916R are drawn again such that their lengths extend with time. It should be noted that one from among the animation FIGS. 916L and 916R may be omitted. That is to say, only one from among the animation FIGS. 916L and 916R may be drawn.

FIG. 48C shows the pattern PTN_D obtained by further providing the pattern PTN_C shown in FIG. 47 with animation FIGS. 918L and 918R drawn such that they slide with time. In FIG. 48C, the animation FIGS. 918L and 918R are arranged adjacent to the lines 914L and 914R, respectively. The animation FIGS. 918L and 918R are drawn such that their positions slide in the traveling direction with time. After the positions of the animation FIGS. 918L and 918R reach the front edges of the lines 914L and 914R, the animation FIGS. 918L and 918R are returned to the initial positions. Subsequently, the animation FIGS. 918L and 918R are drawn again such that they slide with time.

Modification 18

Animation movement is not restricted to such sliding. For example, the multiple figures may be sequentially turned on in an order from the closer side toward the farther side.

Modification 19

Also, the pattern may be drawn on the road surface with blinking. Also, the pattern may be periodically turned on.

Modification 20

The left and right headlamps 300A or lamps 300B may each include such a variable light distribution lamp 110 as a built-in component. In this case, the left and right variable light distribution lamps 110 may provide substantially the same irradiation area. That is to say, the beams irradiated by the left and right variable light distribution lamps 110 may be superimposed.

Modification 21

The variable light distribution lamp 110 may be built into each of the left and right headlamps 200A or lamps 300B. In this case, the left and right variable light distribution lamps 110 may be configured to provide different irradiation areas. For example, one variable light distribution lamp 110 may irradiate half of the irradiation area 904 shown in FIG. 40. Also, the other variable light distribution lamp 110 may irradiate the other half of the irradiation area 904 shown in FIG. 40.

Modification 22

Description has been made in the embodiment 5 regarding an arrangement in which the variable light distribution lamp 110 is configured as an additional light source with respect to the low-beam lamp 102 and the high-beam lamp 104. Also, the variable light distribution lamp 110 may integrally support a function of at least one from among the low-beam lamp 102 and the high-beam lamp 104.

Modification 23

Description has been above regarding an arrangement in which the pattern PTN is drawn when the vehicle overtakes a pedestrian. Also, the pattern PTN may be drawn when the vehicle passes a pedestrian in addition to when the vehicle overtakes a pedestrian.

Also, the above-described pattern may be drawn on the road surface only in a situation in which there is a markedly high probability of the occurrence of a collision. Examples of such a situation in which there is a markedly high probability of the occurrence of a collision include: (i) a situation in which the pedestrian operates an electronic device such as a smartphone; (ii) a situation in which a pedestrian is detected on a road known as a common site of traffic accidents. Such situations may be detected by means of an in-vehicle camera. Also, such situations may be detected based on information obtained from traffic infrastructure such as traffic lights or the like.

Modification 24

Description has been made in the embodiment regarding an arrangement in which the variable light distribution lamp 110 irradiates a pattern to the road surface 900 in front of the vehicle 906 with a light intensity that is brighter than that of the low beam BML. However, the present invention is not restricted to such an arrangement. Also, the pattern may be irradiated with a light intensity that is dimmer than that of the low beam BML.

Description has been made regarding the present invention with reference to the embodiments using specific terms. However, the above-described embodiments show only an aspect of the mechanisms and applications of the present invention. Rather, various modifications and various changes in the layout can be made without departing from the spirit and scope of the present invention defined in appended claims.

What is claimed is:
1. A lamp system comprising:
    a first variable light distribution lamp provided on a front-left side of a vehicle, and structured to irradiate a first beam having a variable light intensity distribution to a road surface so as to draw a first pattern;
    a second variable light distribution lamp provided on a front-right side of the vehicle, and structured to irradiate a second beam having a variable light intensity distribution to the road surface so as to draw a second pattern; and
    a light distribution controller structured to control the first variable light distribution lamp and the second variable light distribution lamp such that a combination of the first pattern and the second pattern forms a figure for driving assistance,
    wherein the first pattern and the second pattern respectively include a first figure and a second figure to be superimposed on the road surface,
    and wherein there is an intentional difference between the first figure and the second figure drawn on the road surface in a reference state.
2. The lamp system according to claim 1, wherein one from among the first figure and the second figure is drawn with an inset with respect to the other.

3. The lamp system according to claim 2, wherein the first figure and the second figure are drawn with an inset amount or an offset amount in a front-rear direction that is larger than that in a left-right direction.

4. The lamp system according to claim 1, wherein one from among the first figure and the second figure is drawn with an offset with respect to the other.

5. The lamp system according to claim 1, wherein the first figure and the second figure are drawn with different brightness levels.

6. The lamp system according to claim 1, wherein the first beam and the second beam are irradiated with different light intensities.

7. A lamp system comprising:
   a variable light distribution lamp structured to irradiate a beam having a variable light intensity distribution to a road surface;
   a light distribution controller structured to control the variable light distribution lamp when a vehicle mounting the lamp system is traveling, and to draw a figure for driving assistance on the road surface using the beam,
   wherein, when a person who satisfies a predetermined condition approaches the vehicle while the vehicle is parked, the light distribution controller draws a predetermined pattern on a ground surface using the beam.

8. The lamp system according to claim 7, wherein the predetermined pattern is irradiated in a range between 1 to 6 m in front of the vehicle.

9. The lamp system according to claim 7, wherein the predetermined pattern is extinguished under a condition of one from among unlocking a door of the vehicle, opening the door, closing the door, and the person being a predetermined distance or less from the vehicle.

10. The lamp system according to claim 7, wherein the predetermined pattern is configured as a logo relating to the vehicle.

11. The lamp system according to claim 7, wherein the predetermined pattern can be specified by a user.

12. An automotive lamp comprising:
   a variable light distribution lamp structured to irradiate a beam having a variable light intensity distribution to a road surface; and
   a light distribution controller structured to control the variable light distribution lamp, such that the variable light distribution lamp draws a pattern over a predetermined range in front of a vehicle with a traveling direction as a longitudinal direction thereof with a light intensity that is brighter or dimmer than that of a low beam, wherein the pattern is drawn as an animation of a plurality of figures that slide in a direction away from the vehicle at the same speed.

13. The automotive lamp according to claim 12, wherein the pattern includes the plurality of figures arranged in the traveling direction.

14. The automotive lamp according to claim 12, wherein the plurality of figures are drawn such that they slide at a speed that is changed according to a distance up to a traffic participant in front of a vehicle.

15. The automotive lamp according to claim 12, wherein the pattern is drawn when a vehicle speed is equal to or smaller than a predetermined value.

16. The automotive lamp according to claim 12, wherein the pattern is drawn in at least one from among: a case in which a vehicle is traveling on a road having a width that is smaller than a predetermined value, a case in which a vehicle is traveling on a road having no guardrail, and a case in which the vehicle is passing an oncoming vehicle.

17. The automotive lamp according to claim 12, wherein the predetermined range has a width that is substantially equal to or larger than that of the vehicle.

18. The automotive lamp according to claim 17, wherein the pattern includes two lines that indicate the vehicle width, and wherein the two lines are drawn such that lengths thereof extend in a traveling direction with time.

19. The automotive lamp according to claim 17, wherein the pattern comprises:
   two lines that indicate the vehicle width; and
   an animation figure drawn such that it extends in a traveling direction with time or such that it moves in the traveling direction with time.

\* \* \* \* \*